(12) United States Patent
Zhou et al.

(10) Patent No.: US 12,016,039 B2
(45) Date of Patent: Jun. 18, 2024

(54) METHOD AND APPARATUS FOR SCHEDULING MULTIPLE TRANSMISSION IN A WIRELESS COMMUNICATION SYSTEM

(71) Applicant: SAMSUNG ELECTRONICS CO., LTD., Suwon-si (KR)

(72) Inventors: Miao Zhou, Beijing (CN); Feifei Sun, Beijing (CN); Min Wu, Beijing (CN); Chen Qian, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/806,649

(22) Filed: Jun. 13, 2022

(65) Prior Publication Data

US 2022/0330312 A1     Oct. 13, 2022

Related U.S. Application Data

(63) Continuation of application No. 17/250,605, filed as application No. PCT/KR2019/010086 on Aug. 9, 2019, now Pat. No. 11,363,626.

(30) Foreign Application Priority Data

Aug. 9, 2018  (CN) .......................... 201810908379.4
Sep. 27, 2018  (CN) .......................... 201811136961.X (Continued)

(51) Int. Cl.
*H04L 5/00*      (2006.01)
*H04L 1/1812*    (2023.01)

(Continued)

(52) U.S. Cl.
CPC .......... *H04W 72/23* (2023.01); *H04L 1/1819* (2013.01); *H04L 1/1896* (2013.01);

(Continued)

(58) Field of Classification Search
None
See application file for complete search history.

(56) References Cited

U.S. PATENT DOCUMENTS 9,860,883 B2   1/2018   Yang et al.
9,877,322 B1   1/2018   Sung et al.
(Continued)

FOREIGN PATENT DOCUMENTS

CN   107347002 A   11/2017
EP   3787362 A1   3/2021
(Continued)

OTHER PUBLICATIONS

International Search Report and Written Opinion of the International Searching Authority in connection with International Application No. PCT/KR2019/010086 dated Nov. 18, 2019, 11 pages.

(Continued)

*Primary Examiner* — Ajit Patel

(57) ABSTRACT

The present disclosure provides a method of transmitting and/or receiving a transport block. The method includes: receiving and/or transmitting a transport block according to information for scheduling multiple transport blocks. The present disclosure also provides a method for downlink transmission, a method of receiving an NRS on a non-anchor carrier, and corresponding UE, base station, and computer readable medium.

21 Claims, 28 Drawing Sheets

(30) Foreign Application Priority Data

| Nov. 1, 2018 | (CN) | 201811294791.8 |
|---|---|---|
| Feb. 14, 2019 | (CN) | 201910116833.7 |
| Apr. 30, 2019 | (CN) | 201910365999.2 |

(51) Int. Cl.

| H04L 1/1867 | (2023.01) |
|---|---|
| H04W 68/00 | (2009.01) |
| H04W 72/0446 | (2023.01) |
| H04W 72/0453 | (2023.01) |
| H04W 72/1273 | (2023.01) |
| H04W 72/23 | (2023.01) |
| H04W 72/50 | (2023.01) |
| H04W 76/27 | (2018.01) |

(52) U.S. Cl.

CPC ..... *H04W 68/005* (2013.01); *H04W 72/0446* (2013.01); *H04W 72/0453* (2013.01); *H04W 72/1273* (2013.01); *H04W 72/535* (2023.01); *H04W 76/27* (2018.02)

(56) References Cited

U.S. PATENT DOCUMENTS

| 11,246,117 | B2 * | 2/2022 | Ying | H04W 72/04 |
|---|---|---|---|---|
| 11,751,204 | B2 * | 9/2023 | Jeon | H04L 5/00 370/329 |
| 2011/0182245 | A1 * | 7/2011 | Malkamaki | H04L 1/1812 370/329 |
| 2011/0300854 | A1 | 12/2011 | Shan et al. | |
| 2012/0057545 | A1 | 3/2012 | Hariharan et al. | |
| 2016/0021651 | A1 | 1/2016 | Ko et al. | |
| 2016/0119948 | A1 | 4/2016 | Damnjanovic et al. | |
| 2016/0157213 | A1 | 6/2016 | Takeda et al. | |
| 2018/0097606 | A1 | 4/2018 | Toledano et al. | |
| 2018/0287745 | A1 * | 10/2018 | Sun | H04L 1/1864 |
| 2018/0302128 | A1 * | 10/2018 | Akkarakaran | H04B 7/0421 |
| 2019/0116005 | A1 | 4/2019 | Harada et al. | |
| 2019/0229847 | A1 | 7/2019 | Koshimura et al. | |
| 2019/0372720 | A1 * | 12/2019 | Lee | H04W 72/23 |
| 2020/0099474 | A1 * | 3/2020 | Wikstrom | H04L 1/0068 |
| 2020/0112416 | A1 * | 4/2020 | Oh | H04L 5/0007 |
| 2020/0146042 | A1 | 5/2020 | Suzuki et al. | |
| 2021/0075558 | A1 * | 3/2021 | Takeda | H04W 72/23 |

FOREIGN PATENT DOCUMENTS

| KR | 20140036006 A | 3/2014 |
|---|---|---|
| KR | 10-2017-0000074 A | 1/2017 |
| KR | 20170074884 A | 6/2017 |
| WO | 2017/170889 A1 | 10/2017 |
| WO | 2017192025 A1 | 11/2017 |

OTHER PUBLICATIONS

Huawei et al., "Scheduling scheme for slot aggregation," R1-1700026, 3GPP TSG RAN WG1 NR Ad-Hoc Meeting, Spokane, USA, Jan. 16-20, 2017, 6 pages.

Oppo, "Discussion on HARQ-ACK transmission," R1-1719993, 3GPP TSG RAN WG1 Meeting #91, Reno, USA, Nov. 27-Dec. 1, 2017, 6 pages.

Sequans Communications, "UE-based HARQ-ACK bundling for NR," R1-1716616, 3GPP TSG RAN WG1 Meeting NR#3, Nagoya, Japan, Sep. 18-21, 2017, 5 pages.

3GPP TSG-RAN WG1 Meeting #92bis, R1-1804587, On blind/HARQ-less POSCH repetition (Year: 2018).

Supplementary European Search Report dated Aug. 18, 2021, in connection with European Patent Application No. 19846624.5, 12 pages.

Zte et al., "Physical layer aspects on SPS in NB-IoT", 3GPP TSG RAN WG1 Meeting #90bis, R1-1717205, Prague, Czechia, Oct. 9-13, 2017, 3 pages.

Notice of Non-Final Rejection dated Nov. 12, 2021, in connection with Korean Application No. 10-2019-0097642, 10 pages.

Communication pursuant to Article 94(3) EPC dated Jan. 3, 2023 in connection with European Patent Application No. 19 846 624.5, 6 pages.

Written Decision on Registration dated Dec. 8, 2022 in connection with Korean Patent Application No. 10-2022-0106357, 6 pages.

Notice of Allowance dated Nov. 2, 2022 in connection with Chinese Patent Application No. 201910365999.2, 4 pages.

China National Intellectual Property Office, "The First Office Action," dated Jun. 2, 2022, in connection with Chinese Patent Application No. 201910365999.2, 18 pages.

European Search Report dated Oct. 17, 2022 in connection with European Patent Application No. 22 19 1144, 14 pages.

Office Action dated Sep. 18, 2022 in connection with Korean Patent Application 10-2022-0106357, 6 pages.

Summons to attend oral proceedings pursuant to Rule 115(1) EPC dated Jan. 25, 2024, in connection with European Patent Application No. 19846624.5, 17 pages.

* cited by examiner

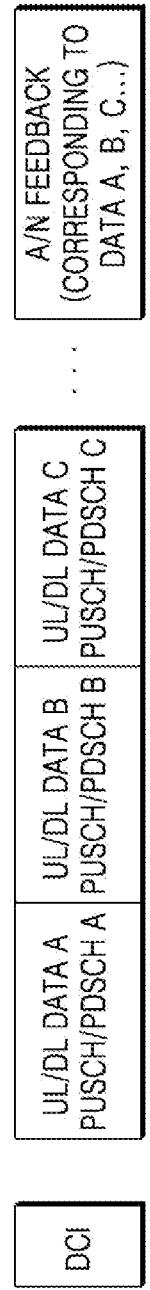

METHOD AND APPARATUS FOR SCHEDULING MULTIPLE TRANSMISSION IN A WIRELESS COMMUNICATION SYSTEM

CROSS-REFERENCE TO RELATED APPLICATIONS

This application is a continuation of application Ser. No. 17/250,605, now U.S. Pat. No. 11,363,626 issued Jun. 14, 2022, which is a National Stage of International Application No. PCT/KR2019/010086, filed Aug. 9, 2019, which claims priority to Chinese Patent Application No. 201810908379.4, filed Aug. 9, 2018, Chinese Patent Application No. 201811136961.X, filed Sep. 27, 2018, Chinese Patent Application No, 201811294791.8, filed Nov. 1, 2018, Chinese Patent Application No. 201910116833.7, filed Feb. 14, 2019, and Chinese Patent Application No. 201910365999.2, filed Apr. 30, 2019, the disclosures of which are herein incorporated by reference in their entirety.

BACKGROUND

1 Field

The present disclosure relates to the field of wireless communication technology, and in particular, to a method of transmitting and/or receiving transport blocks using Downlink Control Information (DCI), a method for downlink transmission, a method of receiving a Narrowband Reference Signal (NRS) on a non-anchor carrier, and corresponding User Equipment (UE), base station, and computer readable medium.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (MANI) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, NEMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

According to an aspect of an exemplary embodiment, there is provided a communication method in a wireless communication.

Aspects of the present disclosure provide an efficient communication methods in a wireless communication system.

BRIEF DESCRIPTION OF THE DRAWINGS

In order to explain the technical solutions in the embodiments of the present disclosure more dearly, drawings needed to be used in description of the embodiments will be briefly described below. Obviously; the drawings in the following description are merely some embodiments of the present disclosure. The skilled in the art may also obtain other drawings based on these drawings without creative labor.

FIG. 2A schematically illustrates a diagram of transmitting/receiving ACK/NACK feedback according to an embodiment of the present disclosure;

DETAILED DESCRIPTION

Figure 1:
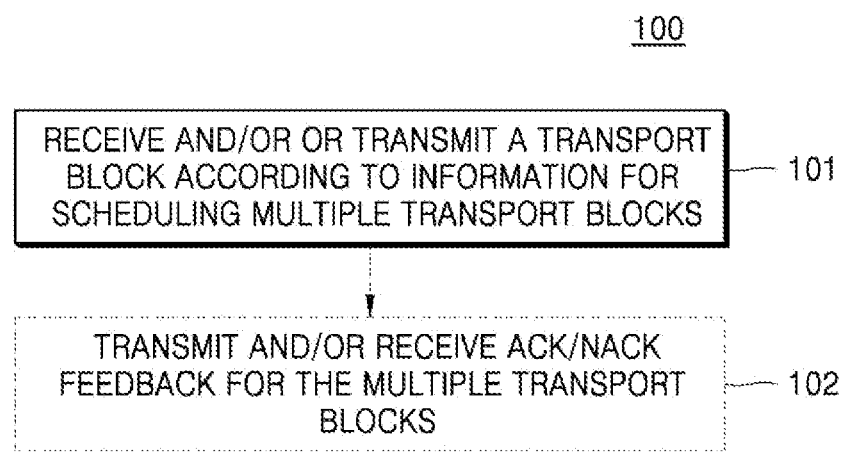
FIG. 1 schematically illustrates a flowchart of a method at a UE of transmitting and/or receiving multiple transport blocks according to an embodiment of the present disclosure.

In view of this, in order to achieve an performance enhancement of the transmission efficiency, e.g., in the main traffic scenarios of the MTC and NB-IoT, and reduce the overhead of scheduling signaling in the dynamic scheduling, the present disclosure provides a method of scheduling multiple transport blocks using DCI. The method may significantly reduce the overhead of scheduling signaling in the dynamic scheduling, and is more flexible and has a shorter scheduling delay than the SPS, thereby improving the transmission efficiency of the system.

According to an embodiment of the present disclosure, there is provided a method at a UE of transmitting and/or receiving a transport block, including: receiving and/or transmitting a transport block according to information for scheduling multiple transport blocks.

According to an embodiment of the present disclosure, there is provided a method at a base station of transmitting and/or receiving a transport block, including: receiving and/or transmitting a transport block according to information for scheduling multiple transport blocks.

According to an embodiment of the present disclosure, the method includes: receiving and/or transmitting a transport block according to information for scheduling one transport block. The information for scheduling one transport block includes information indicating to schedule one transport block in information for scheduling one or more transport blocks.

According to an embodiment of the present disclosure, the transport block includes a transport block for multicast traffic and a transport block for unicast traffic.

According to an embodiment of the present disclosure, the method includes: receiving and/or transmitting a transport block according to information for scheduling more than one transport block.

According to an embodiment of the present disclosure, the method further includes: transmitting and/or receiving ACK/NACK feedback for the multiple transport blocks.

According to an embodiment of the present disclosure, the ACK/NACK feedback includes at least one of:

ACK/NACK feedback corresponding to each of the multiple transport blocks, feedback of ACK/NACK bundling or multiplexing corresponding to at least two of the multiple transport blocks.

According to an embodiment of the present disclosure, the UE generates one or two HARQ-ACK bits for the multiple transport blocks by performing a logic 'and' operation on all individual HARQ-ACKs each corresponding to one codeword of the multiple transport blocks.

According to an embodiment of the present disclosure, the multiple transport blocks include at least one of:

multiple transport blocks corresponding to multiple HARQ processes of one UE, multiple transport blocks corresponding to one HARQ process for an initial transmission and/or for at least one retransmission, multiple transport blocks corresponding to at least one uplink and/or at least one downlink transmission of one UE, or transport blocks corresponding to multiple different UEs.

According to an embodiment of the present disclosure, when the UE needs to transmit other uplink signals/channels and ACK/NACK feedback for the downlink transport block, piggybacked. ACK/NACK feedback information of the downlink transport block is transmitted in transmission resources of the other uplink signals/channels; and when the UE needs to receive ACK/NACK feedback for the uplink transport block and other downlink signals/channels, piggybacked ACK/NACK feedback information of the uplink transport block is received in transmission resources of the other downlink signals/channels.

According to an embodiment of the present disclosure, the information for scheduling the multiple transport blocks is obtained from at least one of: information obtained from DCI, a DCI format; a scrambling sequence of DCI, a search space for detecting DCI, a size of DCI, and Radio Resource Control (RRC) configuration information.

According to an embodiment of the present disclosure, the scrambling sequence of DCI is a Radio Network Temporary Identifier (RNTI).

According to an embodiment of the present disclosure; the information for scheduling the multiple transport blocks includes at least one of:
information for indicating that at least one or all of the multiple transport blocks are uplink transport blocks or downlink transport blocks;
information for indicating that the information for scheduling the multiple transport blocks is used to schedule one or more transport blocks;
information for indicating a number of transport blocks to be scheduled using the information for scheduling the multiple transport blocks, wherein the number is 1 or a positive integer greater than 1;
a first time interval between the multiple transport blocks, wherein the first time intervals between any two adjacent transport blocks of the multiple transport blocks are identical, and resources of the multiple transport blocks are periodic in a time domain; or the first time intervals between any two adjacent transport blocks of the multiple transport blocks are identical or different, and the different first time intervals are indicated sequentially by multiple values of the first time interval; wherein the first time interval is 0 or a positive integer;
a second time interval between at least one of the multiple transport blocks and its corresponding ACK/NACK feedback, wherein the second time intervals corresponding to any one of the multiple transport blocks are identical or different, and the different second time intervals are indicated sequentially by multiple values of the second time intervals;
a third time interval between the at least one of the multiple transport blocks and ACK/NACK feedback corresponding to a transport block previous to the at least one transport block; wherein the third time intervals corresponding to any one of the multiple transport blocks are identical or different, and the different third time intervals are indicated sequentially by multiple values of the third time intervals;
a fourth time interval between ACK/NACK feedback and the last one of the multiple transport blocks;
a period and/or a number of times of validations of resources for transmitting at least one HARQ process of the at least one of the multiple transport blocks; and
a period of resources used by the multiple transport blocks.

According to an embodiment of the present disclosure, time domain resource information of the multiple transport blocks determined by the UE according to the information for scheduling the multiple transport blocks includes at least one of: a time domain resource position for downlink reception, a time domain resource position for uplink transmission, a time domain resource position for transmitting or receiving the ACK/NACK feedback.

According to an embodiment of the present disclosure, resources used by a full duplex UE for transmitting and/or receiving the ACK/NACK feedback for the multiple transport blocks and resources used by the full duplex UE for transmitting and/or receiving the multiple transport blocks are overlapped or partially overlapped or non-overlapped in the time domain in a frequency division duplex scenario.

According to an embodiment of the present disclosure, said transmitting and/or receiving the ACK/NACK feedback for the multiple transport blocks includes at least one of:
after receiving all of downlink transport blocks of the multiple transport blocks, transmitting ACK/NACK feedback corresponding to all of the downlink transport blocks;
after transmitting all of the uplink transport blocks of the multiple transport blocks, receiving ACK/NACK feedback corresponding to all of the uplink transport blocks;
after completing transmitting and/or receiving the multiple transport blocks, transmitting the ACK/NACK feedback corresponding to all of the downlink transport blocks, and/or receiving the ACK/NACK feedback corresponding to all of the uplink transport blocks;
after receiving every M downlink transport blocks of the multiple transport blocks, transmitting ACK/NACK feedback corresponding to the M downlink transport blocks, where M is a positive integer;
after transmitting every M uplink transport blocks of the multiple transport blocks, receiving ACK/NACK feedback corresponding to the M uplink transport blocks, where M is a positive integer.

According to an embodiment of the present disclosure, said transmitting and/or receiving the ACK/NACK feedback for the multiple transport blocks includes at least one of:
after transmitting all of downlink transport blocks of the multiple transport blocks, receiving ACK/NACK feedback corresponding to all of the downlink transport blocks;
after receiving all of the uplink transport blocks of the multiple transport blocks, transmitting ACK/NACK feedback corresponding to all of the uplink transport blocks;
after completing transmitting and/or receiving the multiple transport blocks, receiving the ACK/NACK feedback corresponding to all of the downlink transport blocks, and/or transmitting the ACK/NACK feedback corresponding to all of the uplink transport blocks;
after transmitting every M downlink transport blocks of the multiple transport blocks, receiving ACK/NACK feedback corresponding to the M downlink transport blocks, where M is a positive integer.
after receiving every M uplink transport blocks of the multiple transport blocks, transmitting ACK/NACK feedback corresponding to the M uplink transport blocks, where M is a positive integer.

According to an embodiment of the present disclosure, the ACK/NACK feedback corresponding to the uplink transport block is transmitted over a specific channel, and/or indicated in the DCI.

According to an embodiment of the present disclosure, the ACK/NACK feedback is transmitted/received by at least one of:

carrying the ACK/NACK feedback corresponding to all of the multiple transport blocks in one ACK/NACK feedback message;

carrying the ACK/NACK feedback corresponding to every M of the multiple transport blocks in one ACK/NACK feedback message, where M is a positive integer;

transmitting the ACK/NACK feedback for the downlink transport block(s) together with other uplink signals/channels, and receiving the ACK/NACK feedback for the uplink transport block(s) together with other downlink signals/channels.

According to an embodiment of the present disclosure, the ACK/NACK feedback is transmitted/received by at least one of:

carrying the ACK/NACK feedback corresponding to all of the multiple transport blocks in one ACK/NACK feedback message;

carrying the ACK/NACK feedback corresponding to every M of the multiple transport blocks in one ACK/NACK feedback message, where M is a positive integer;

receiving the ACK/NACK feedback for the downlink transport block(s) together with other uplink signals/channels, and transmitting the ACK/NACK feedback for the uplink transport block(s) together with other downlink signals/channels.

According to an embodiment of the present disclosure, M is:

configured by a base station or a higher layer, or predefined;

determined based on a number of HAM) processes in the information for scheduling the multiple transport blocks, wherein the number of HARQ processes in the information for scheduling the multiple transport blocks is configured by the base station or the higher layer, predefined, or indicated in the DCI;

determined based on a maximum number of HARQ processes supported by the LTE.

According to an embodiment of the present disclosure, the ACK/NACK is indicated by at least one of:

a predefined scrambling sequence;

a higher-layer header added before a corresponding transport block of uplink traffic or downlink traffic;

a newly introduced MAC Control Element (CE) or Radio Link Control (RLC) CE or Packet Data Convergence Protocol (PDCP) CE or RRC CE;

an ACK/NACK feedback field.

According to an embodiment of the present disclosure, the ACK/NACK is transmitted in a specific uplink or downlink signal channel, or carried in the DCI. The ACK/NACK is carried in the DCI, indicated by a New Data Indicator (NDI) field in the DCI, or indicated by the ACK/NACK field, or indicated by a DCI format of the newly introduced DCI. The DCI is DCI dedicated to indicating ACK/NACK feedback for one or more UEs, or existing DCI for data scheduling, or newly introduced DO for scheduling one or more UEs. The DCI is transmitted in at least one of: a newly introduced common search space, a newly introduced UE-specific search space, an existing common search space, and an existing UE-specific search space.

According to an embodiment of the present disclosure, the information indicated in the DCI dedicated to indicating the ACK/NACK feedback for the one or more UEs includes at least one of:

identities of the one or more UEs;

a group identity of a UE group corresponding to the one or more UEs;

an HARQ ID of at least one transport block for each of the one or more UEs;

a transmission resource position of at least one transport block for each of the one or more UEs;

ACK/NACK feedback for at least one transport block for each of the one or more UEs.

According to an embodiment of the present disclosure, said transmitting and/or receiving the ACK/NACK feedback for the multiple transport blocks further includes:

determining a time window or latest time for receiving an ACK/NACK feedback message, according to all time domain resources of the multiple transport blocks, or time domain resources of at least one specific transport block of the multiple transport blocks; and receiving the ACK/NACK feedback message within the time window or before the latest time.

According to an embodiment of the present disclosure, said transmitting and/or receiving the ACK/NACK feedback for the multiple transport blocks further includes at least one of:

transmitting only ACK feedback without transmitting NACK feedback;

transmitting only NACK feedback without transmitting ACK feedback;

assuming that NACK feedback is received if no ACK feedback is received within a given time window or before given latest time;

assuming that ACK feedback is received if no NACK feedback is received within a given time window or before given latest time.

According to an embodiment of the present disclosure, the method further includes: acquiring, by the UE, initial transmission or retransmission indication information for indicating that a transmission of at least one of the multiple transport blocks is an initial transmission or a retransmission, wherein the initial transmission or retransmission indication information is carried by at least one of:

specific ACK/NACK feedback, the transport block, a scrambling code sequence for scrambling the transport block, and a specific signal/channel for indicating initial transmission or retransmission;

wherein the initial transmission or retransmission indication information carried in the transport block is carried by at least one of:

a higher-layer header added before the transport block, a newly introduced MAC CE carried in a MAC Protocol Data Unit (PDU) of the transport block, or a newly introduced RLC CE carried in an RLC PDU, or a newly introduced PDCP CE carried in a PDCP PDU, or an RRC CE, a 1-bit initial transmission/retransmission indication added before the transport block;

wherein the signal/channel dedicated to indicating the initial transmission or retransmission of the transport block includes DCI dedicated to indicating the initial transmission or retransmission of the transport block;

wherein the initial transmission or retransmission indication information carried by the DCI dedicated to indicating the initial transmission or retransmission of the transport block is carried by at least one of: an NDI field in the DCI, an RV field in the DCI.

According to an embodiment of the present disclosure, the specific ACK/NACK feedback is the latest ACK/NACK feedback of an HARQ process corresponding to the at least one transport block.

According to an embodiment of the present disclosure, the specific ACK/NACK feedback includes at least one of:

an ACK/NACK feedback field corresponding to the latest ACK/NACK feedback of the HARQ process corresponding to the transport block, a scrambling sequence of the ACK/NACK feedback message corresponding to the latest ACK/NACK feedback of the HARQ process corresponding to the transport block.

According to an embodiment of the present disclosure, said receiving and/or transmitting the transport block according to the information for scheduling the multiple transport blocks further includes information for initial transmission or retransmission of the at least one of the multiple transport blocks, or information respectively for initial transmission or retransmission of the at least one of the multiple transport blocks.

According to an embodiment of the present disclosure, the information for scheduling the multiple transport blocks further includes an identity of an HARQ process corresponding to the multiple transport blocks, wherein the multiple transport blocks use the same or different HARQ processes.

According to an embodiment of the present disclosure, the DCI includes DCI for activating and/or releasing an SPS process; and wherein the DCI further carries at least one of: a period or a scheduling interval of the SPS, a number of times resources used by the multiple transport blocks are validated.

According to an embodiment of the present disclosure, the DCI for activating and/or releasing the SPS process is scrambled with an RNTI in the SIPS configuration information, or is scrambled with other RNTIs in the existing mechanism; or is scrambled with a newly introduced INTI.

According to an embodiment of the present disclosure, at least one of the period or the scheduling interval of the SPS and the number of times of validations being carried in the DCI for activating and/or releasing the SPS process includes: the at least one of the period or the scheduling interval of the SPS and the number of times of validations being indicated in a used or unused domain or reserved field in the DCI, or indicated in at least one newly added field in the DCI.

In order to avoid a waste of downlink resources in e.g., MTC and NB-IoT in the prior art, the present disclosure provides a method for downlink transmission. In the method, with configuration by the base station, the UE control region in the MTC and NB-IoT systems that is not deployed in the UE frequency band can be used for the downlink transmission, in order to improve the utilization efficiency of the subframes in MTC and NB-IoT, reduce idleness of the downlink resources, reduce the number of repetitions required for the MTC/NB-IoT transmission, or increase the code rate in a case where the number of repetitions is constant, thereby improving the downlink channel capacity, or enhancing reliability of the downlink traffic, and improving the system performance and the transmission efficiency.

According to an embodiment of the present disclosure, there is provided a method at a UE for downlink transmission. The method includes: obtaining indication information of a start position of time domain resource of at least one downlink channel, wherein the indication information indicates that the at least one downlink channel occupies resources starting from the first symbol or the second symbol in each time slot in time-frequency resources allocated for the at least one downlink channel; determining the time-frequency resources occupied by the at least one downlink channel, according to the indication information and time-frequency resource configuration information of the at least one downlink channel; and decoding the at least one downlink channel on the time-frequency resources.

According to an embodiment of the present disclosure, a method at a for downlink transmission is provided. The method includes: obtaining indication information of a start position of time domain resource of a first downlink channel and/or indication information of a start position of time domain resource of a second downlink channel; determining time-frequency, resources occupied by at least one downlink channel, according to the indication information of the start position of time domain resource of the first downlink channel and/or the indication information of the start position of time domain resource of the second downlink channel, and time-frequency resource configuration information of the at least one downlink channel; and decoding the at least one downlink channel on the time-frequency resources.

According to an embodiment of the present disclosure, the indication information of the start position of time domain resource of the first downlink channel and the indication information of the start position of time domain resource of the second downlink channel respectively indicate time domain start position(s) for at least one different downlink channel.

According to an embodiment of the present disclosure, the indication information of the start position of time domain resource of the first downlink channel and the indication information of the start position of time domain resource of the second downlink channel indicate different downlink channel resource start positions.

According to an embodiment of the present disclosure, the indication information is transmitted in one of: an MIB, a SIB1, other SIBs than the SIB1, a UE-specific RRC message.

In an exemplary embodiment, the at least one downlink channel is at least one of: a downlink data channel for transmitting the SIB1, a downlink data channel for transmitting other SIBs than the SIB1, a control channel in a common search space, a control channel in a UE-specific search space, a downlink data channel scheduled by the control channel in the common search space, a downlink data channel scheduled by the control channel in the UE-specific search space.

According to an embodiment of the present disclosure, the UE obtains the indication information of the start position of the time domain resource of the at least one downlink channel, the indication information being transmitted in the MIB; and the UE determines time-frequency resources occupied by all of downlink channels according to the indication information and time-frequency resource configuration information of all of the downlink channels, and decodes all of the downlink channels on the time-frequency resources. The downlink channels include:

a downlink data channel for transmitting the SIB1, a downlink data channel for transmitting other SIBS than the SIB1, a control channel in a common search space, a control channel in a UE-specific search space, a downlink data channel scheduled by the control channel in the common search space, a downlink data channel scheduled by the control channel in the UE-specific search space.

According to an embodiment of the present disclosure, the UE obtains the indication information of the start position of the time domain resource of the at least one downlink channel, the indication information being transmitted in the SIB1; and the UE determines time-frequency resources occupied by all of downlink channels according to the indication information and time-frequency resource configuration information of all of the downlink channels, and decodes all of the downlink channels on the time-frequency resources. The downlink channels include:

a downlink data channel for transmitting other SIBs than the SIB1, a control channel in a common search space, a control channel in a UE-specific search space, a downlink data channel scheduled by the control channel in the common search space, a downlink data channel scheduled by the control channel in the UE-specific search space.

According to an embodiment of the present disclosure, the UE obtains the indication information of the start position of the time domain resource of the at least one downlink channel, the indication information being transmitted in other SIB than the SIB1; and the UE determines time-frequency resources occupied by all of downlink channels according to the indication information and time-frequency resource configuration information of all of the downlink channels, and decodes all of the downlink channels on the time-frequency resources. The downlink channels include:

a control channel in a common search space, a control channel in a UE-specific search space, a downlink data channel scheduled by the control channel in the common search space, a downlink data channel scheduled by the control channel in the LTE-specific search space.

According to an embodiment of the present disclosure, the UE obtains the indication information of the start position of the time domain resource of the at least one downlink channel, the indication information being transmitted in the RRC; and the UE determines time-frequency resources occupied by at least one of downlink channels according to the indication information and time-frequency resource configuration information of the at least one of the downlink channels, and decodes the at least one of the downlink channels on the time-frequency resources. The downlink channels include:

a downlink data channel for transmitting the SIB1, a downlink data channel for transmitting other SIBs than the SIB1, a control channel in a common search space, a control channel in a LTE-specific search space, a downlink data channel scheduled by the control channel in the common search space, a downlink data channel scheduled by the control channel in the 15E-specific search space.

According to an embodiment of the present disclosure, before the indication information of the start position of the time domain resource of the at least one downlink channel is obtained, a capability of the UE supporting receiving the downlink channel occupying resources starting from the first symbol or the second symbol in one time slot is reported to the base station.

In order to avoid the waste of downlink resources in e.g. MTC and NB-IoT existing in the prior art, the present disclosure provides a method at a UE of using a control region in downlink transmission. In the method, with configuration by the base station, the UE control region in the MTC and NB-IoT systems that is not deployed in the UE frequency band can be used for the downlink transmission, in order to improve the utilization efficiency of the subframes in MTC and NB-IoT, reduce idleness of the downlink resources, reduce the number of repetitions required for the MTC/NB-IoT transmission, or increase the code rate in a case where the number of repetitions is constant, thereby improving the downlink channel capacity, or enhancing reliability of the downlink traffic, and improving the system performance and the transmission efficiency.

According to an embodiment of the present disclosure, there is provided a method at a UE for downlink transmission. The method includes: enabling use of a control region for downlink transmission; obtaining configuration information of the control region; and receiving the downlink transmission using the control region according to the obtained configuration information of the control region.

According to an embodiment of the present disclosure, said enabling the use of the control region for the downlink transmission may include: enabling the use of the control region for the downlink transmission by signaling configuration.

According to an embodiment of the present disclosure, the configuration information of the control region may include at least one of:

position information of the control region for receiving the downlink transmission;

different types of methods for using the control region.

According to an embodiment of the present disclosure, said obtaining the configuration information of the control region may include: obtaining, by the UE, predefined configuration information of the control region, and/or obtaining; by the UE, configuration information of the control region indicated by signaling.

The signaling may include at least one of: an NEB; an SIB, which includes SIB1 and other SIBs; and RRC signaling.

According to an embodiment of the present disclosure, said obtaining the configuration information of the control region may further include: obtaining the configuration information of the control region from the MIB; and said receiving the downlink transmission using the control region according to the obtained configuration information of the control region may further include: receiving the RBI and other SIBs, a downlink data channel, and a downlink control channel according to the obtained configuration information of the control region.

According to an embodiment of the present disclosure, the configuration information of the control region is used for a specific downlink signal/channel.

According to an embodiment of the present disclosure, there is provided a method at a base station for downlink transmission. The method includes: generating indication information of a start position of time domain resource of at least one downlink channel, wherein the indication information indicates that the at least one downlink channel occupies resources starting from the first symbol or the second symbol in each time slot in time-frequency resources allocated for the at least one downlink channel; determining the time-frequency resources occupied by the at least one downlink channel, according to the indication information and time-frequency resource configuration information of the at least one downlink channel; and transmitting the indication information and the at least one downlink channel on the time-frequency resources.

According to an embodiment of the present disclosure, the indication information is transmitted in one of: an MIB, a SIB1, other SIBs than the SIB1, a UE-specific RRC message.

According to an embodiment of the present disclosure, the at least one downlink channel is at least one of: a downlink data channel for transmitting the SIB', a downlink data channel for transmitting other SIBs than the SIB1, a control channel in a common search space, a control channel in a UE-specific search space, a downlink data channel scheduled by the control channel in the common search space, a downlink data channel scheduled by the control channel in the UE-specific search space.

According to an embodiment of the present disclosure, before the indication information of the start position of the time domain resource of the at least one downlink channel is transmitted, a capability of the UE supporting receiving the downlink channel occupying resources starting from the first symbol or the second symbol in one time slot is received from the UE.

According to an embodiment of the present disclosure, there is provided a method at a base station of using a control region in downlink transmission. The method includes: configuring a UE to enable use of a control region for downlink transmission; generating configuration information of the control region; and transmitting downlink transmission using the control region according to the configuration information of the control region.

According to an embodiment of the present disclosure, the method further includes: transmitting the configuration information of the control region to the UE.

In order to support more flexible paging on a non-anchor carrier, a method of transmitting an NRS on a non-anchor carrier is provided in the present disclosure.

According to an embodiment of the present disclosure, there is provided a method at a UE for signal reception, including: obtaining configuration information of an NRS, wherein the configuration information of the NRS is used to indicate that the NRS is transmitted at least every N paging occasions, where N is a positive integer; and receiving the NRS at least every N paging occasions based on the obtained configuration information of the NRS.

According to an embodiment of the present disclosure, the NRS being transmitted at least every N paging occasions and said receiving the NRS at least every paging occasions include: the NRS being transmitted in a predetermined number of subframes previous and next to a search space corresponding to a paging occasion for transmission of the NRS and/or a Wake-Up Signal (WUS) corresponding to the paging occasion, and/or in a predetermined range of subframes previous to the search space corresponding to the paging occasion, and/or in subframes occupied by the search space and/or the WUS; and receiving the NRS in at least one subframe of the predetermined number of subframes previous and next to the search space corresponding to the paging occasion and/or the WUS corresponding to the paging occasion, and/or the predetermined range of subframes previous to the search space corresponding to the paging occasion, and/or the subframes occupied by the search space and/or the WUS.

According to an embodiment of the present disclosure, the NRS being transmitted according to the at least every N paging occasions and receiving the NRS at least every N paging occasions further include: the NRS being transmitted in a predetermined number of subframes previous to a search space corresponding to a paging occasion for transmission of the NRS and/or a WUS corresponding to the paging occasion, and/or in a predetermined number of subframes started from a start subframe of the search space and/or the WUS, and/or in a predetermined range of subframes previous to the search space corresponding to the paging occasion; and receiving the NRS in at least one subframe of the predetermined number of subframes previous to the search space corresponding to the paging occasion and/or the WUS corresponding to the paging occasion, and/or the predetermined number of subframes started from the start subframe of the search space and/or the WUS, and/or the predetermined range of subframes previous to the search space corresponding to the paging occasion.

According to an embodiment of the present disclosure, said receiving the NRS at least every N paging occasions based on the obtained configuration information of the NRS includes: if the UE does not detect a downlink control channel in search spaces corresponding to N−1) consecutive paging occasions, assuming that the NRS is transmitted at the N-th paging occasion; or determining a time domain resource position for receiving the NRS every N paging periods based on a predefined or configured System Frame Number (SFN) and/or subframe number.

According to an embodiment of the present disclosure, there is provided a method at a base station of transmitting an NRS on a non-anchor carrier. The method includes: generating configuration information of an NRS, wherein the configuration information of the NRS indicates that the NRS is transmitted at least every N paging occasions, where N is a positive integer; and transmitting the NRS at least every N paging occasions based on the obtained configuration information of the NRS.

According to an embodiment of the present disclosure, the NRS being transmitted at least every N paging occasions and transmitting the NRS at least every N paging occasions include: the NRS being transmitted in at least one subframe of a predetermined number of subframes previous and next to a search space corresponding to a paging occasion for transmission of the NRS, and subframes occupied by the search space; and transmitting the NRS in at least one subframe of the predetermined number of subframes previous and next to the search space corresponding to the paging occasion, and the subframes occupied by the search space.

According to an embodiment of the present disclosure, the method further includes: transmitting the configuration information of the NRS to the UE.

According to an embodiment of the present disclosure, a method at a UE of adjusting a timing advance (TA) is provided. The method includes: receiving a TA command; and in a case of successfully receiving the TA command, adjusting the TA based on the TA command, and transmitting ACK feedback using a new TA; or adjusting the TA based on the TA command, and transmitting ACK feedback using the TA unadjusted; and in a case of unsuccessfully receiving the TA command, not adjusting the TA, and transmitting NACK feedback using the TA unadjusted.

According to an embodiment of the present disclosure, said adjusting the TA based on the TA command includes: determining a resource position for adjusting the TA based on a transmission resource of the TA command and/or a transmission resource of HARQ-ACK feedback corresponding to a PDSCH that carries the TA command; and adjusting the TA at the corresponding resource position; and/or adjusting, based on a type of uplink transmission for adjusting the TA, the TA for the corresponding type of uplink transmission.

According to an embodiment of the present disclosure, the adjusting, based on the type of uplink transmission for adjusting the TA, the TA for the corresponding type of uplink transmission includes: adjusting, based on a type of an uplink channel/signal corresponding to the resource position for adjusting the TA, the TA for the uplink transmission of the corresponding channel/signal, or adjusting the TA on the corresponding type of resource.

According to an embodiment of the present disclosure, the type of uplink transmission for adjusting the TA includes an uplink transmission that carries ACK feedback in HARQ-ACK feedback corresponding to a PDSCH of the TA command; or the type of uplink transmission for adjusting the TA does not include an uplink transmission carrying HARQ-ACK feedback; or the type of uplink transmission for adjusting the TA adjustment includes an uplink transmission carrying HARQ-ACK feedback, but does not include an uplink transmission carrying ACK feedback in HARQ-ACK feedback corresponding to a PDSCH of the TA command.

According to an embodiment of the present disclosure, the uplink transmission is a PUSCH transmission and/or a PUCCH transmission.

According to an embodiment of the present disclosure, said determining the resource position for adjusting the TA based on the transmission resource of the TA command and/or the transmission resource of HARQ-ACK feedback corresponding to a PDSCH that carries the TA command includes: starting to adjust the corresponding uplink transmission time from the first available uplink time slot after Subframe (n'+M) ends, in the case of successfully receiving the TA command, wherein the first available uplink time slot is the first time slot of a PUSCH transmission and/or PUCCH transmission, where Subframe n' is a start subframe or an end subframe of the uplink transmission carrying an ACK response in the HARQ-ACK feedback, and the ACK response corresponds to the PUSCH transmission carrying the TA command, M is 0 or a positive integer, and the uplink transmission carrying the ACK response in the HARQ-ACK feedback includes a PUSCH transmission and/or a PUCCH transmission carrying the ACK response in the HARQ-ACK feedback.

According to an embodiment of the present disclosure, a UE is provided. The UE includes: a processor; and a memory storing computer executable instructions that, when executed by the processor, cause the UE to perform the methods according to the present disclosure.

According to an embodiment of the present disclosure, there is provided a computer readable medium having stored thereon instructions that, when executed by a processor, cause the processor to perform the methods according to the present disclosure.

According to an embodiment of the present disclosure, a base station is provided. The base station includes: a processor; and a memory storing computer executable instructions that, when executed by the processor, cause the base station to perform the methods according to the present disclosure.

According to an embodiment of the present disclosure, there is provided a computer readable medium having stored thereon instructions that, when executed by a processor, cause the processor to perform the methods according to the present disclosure.

According to an embodiment of the present disclosure, a method of scheduling multiple transmission, by a base station, the method comprising: generating DCI (Downlink Control Information) for scheduling multiple transport blocks; transmitting the multiple transport block based on scheduling information included in the DCI; and receiving feedback information corresponding to the multiple transport blocks.

According to an embodiment of the present disclosure, wherein the multiple transport blocks comprises at least one of: multiple transport blocks corresponding to multiple Hybrid Automatic Repeat reQuest (HARQ) processes of one User Equipment (UE), multiple transport blocks corresponding to one HARQ process for an initial transmission and/or for at least one retransmission, or multiple transport blocks corresponding to at least one downlink transmission of one UE, or multiple transport blocks corresponding to multiple different UEs.

According to an embodiment of the present disclosure, wherein the DCI further comprises at least one of: information for indicating that at least one or all of the multiple transport blocks are uplink transport blocks or downlink transport blocks; information for indicating that the information for scheduling the multiple transport blocks is used to schedule one or more transport blocks; information for indicating a number of transport blocks to be scheduled using the information for scheduling the multiple transport blocks; a first time interval between the multiple transport blocks; a second time interval between at least one of the multiple transport blocks and its corresponding ACK/NACK feedback; a third time interval between at least one of the multiple transport blocks and ACK/NACK feedback corresponding to a transport block previous to the at least one transport block; a fourth time interval between ACK/NACK feedback and the last one of the multiple transport blocks; a period and/or a number of times of validations of resources for transmitting at least one HARQ process of the at least one of the multiple transport blocks; or a period of resources used by the multiple transport blocks.

According to an embodiment of the present disclosure, wherein receiving the feedback information corresponding to the multiple transport blocks comprises at least one of: after completing transmitting the multiple transport blocks, receiving the ACK/NACK feedback corresponding to all of the uplink transport blocks; or after transmitting every M uplink transport blocks of the multiple transport blocks, receiving ACK/NACK feedback corresponding to the M uplink transport blocks; wherein M is a positive integer.

According to an embodiment of the present disclosure, wherein the feedback information includes at least one of: ACK/NACK feedback corresponding to each of the multiple transport blocks in one ACK/NACK feedback message or ACK/NACK feedback corresponding to at least two multiple transport blocks.

According to an embodiment of the present disclosure, wherein M is: configured by a base station or a higher layer, or predefined; determined based on a number of HARQ processes in the scheduling information; or determined based on a maximum number of HARQ processes supported by an UE.

According to an embodiment of the present disclosure, a method of scheduling multiple transmission, by an User Equipment (UE), the method comprising: receiving DCI (Downlink Control Information) for scheduling multiple transport blocks; receiving the multiple transport block based on scheduling information included in the DCI; and transmitting feedback information corresponding to the multiple transport blocks.

According to an embodiment of the present disclosure, wherein the multiple transport blocks comprises at least one of: multiple transport blocks corresponding to multiple Hybrid Automatic Repeat reQuest (HARQ) processes of one User Equipment (UE), multiple transport blocks corresponding to one HARQ process for an initial transmission anchor for at least one retransmission, or multiple transport blocks corresponding to at least one downlink transmission of one UE, or multiple transport blocks corresponding to multiple different UEs.

According to an embodiment of the present disclosure, wherein the DCI further comprises at least one of: information for indicating that at least one or all of the multiple transport blocks are uplink transport blocks or downlink transport blocks; information for indicating that the information for scheduling the multiple transport blocks is used to schedule one or more transport blocks; information for indicating a number of transport blocks to be scheduled using the information for scheduling the multiple transport blocks; a first time interval between the multiple transport blocks; a second time interval between at least one of the multiple transport blocks and its corresponding ACK/NACK feedback; a third time interval between at least one of the multiple transport blocks and ACK/NACK feedback corresponding to a transport block previous to the at least one transport block; a fourth time interval between ACK/NACK feedback and the last one of the multiple transport blocks; a period and/or a number of times of validations of resources for transmitting at least one HARQ process of the at least one of the multiple transport blocks; or a period of resources used by the multiple transport blocks.

According to an embodiment of the present disclosure, wherein the transmitting the feedback information corresponding to the multiple transport blocks comprises at least one of: after receiving all of downlink transport blocks of the multiple transport blocks, transmitting feedback information corresponding to all of the downlink transport blocks; after completing receiving the multiple transport blocks, transmitting the feedback information corresponding to all of the downlink transport blocks; after receiving every M downlink transport blocks of the multiple transport blocks, transmitting ACK/NACK feedback corresponding to the M downlink transport blocks; or wherein M is a positive integer.

According to an embodiment of the present disclosure, wherein the feedback information includes at least one of: ACK/NACK feedback corresponding to each of the multiple transport blocks in one ACK/NACK feedback message or ACK/NACK feedback corresponding to at least two multiple transport blocks.

According to an embodiment of the present disclosure wherein M is: configured by a base station or a higher layer, or predefined; determined based on a number of HARQ processes in the scheduling information; or determined based on a maximum number of HARQ processes supported by an UE.

According to an embodiment of the present disclosure, a base station for scheduling multiple transmission, the base station comprising: a transceiver; and at least one controller coupled with the transceiver and configured to generate DCI (Downlink Control Information) for scheduling multiple transport blocks; transmit the multiple transport block based on scheduling information included in the DCI; and receive feedback information corresponding to the multiple transport blocks.

According to an embodiment of the present disclosure, a User equipment (UE) for scheduling multiple transmission, the UE comprising: a transceiver; and at least one controller coupled with the transceiver and configured to receive DCI (Downlink Control Information) for scheduling multiple transport blocks; receive the multiple transport block based on scheduling information included in the DCI; and transmit feedback information corresponding to the multiple transport blocks.

The embodiments of the present application will be described in detail hereinafter, and examples of the embodiments are illustrated in the accompanying drawings, throughout which same or similar reference numerals refer to same or similar elements or elements having same or similar functions. The embodiments described hereinafter with reference to the drawings are illustrative, merely used for explaining the present application and should not be regarded as any limitations thereto.

It should be understood by those skill in the art that singular forms "a", "an", "the", and "said" may be intended to include plural forms as well, unless otherwise stated. It should be further understood that terms "include/comprise" used in this specification specify the presence of the stated features, integers, steps, operations, elements and/or components, but not exclusive of the presence or addition of one or more other features, integers, steps, operations, elements, components, and/or combinations thereof. It should be understood that when a component is referred to as being "connected to" or "coupled to" another component, it may be directly connected or coupled to other elements or provided with intervening elements therebetween. In addition, "connected to" or "coupled to" as used herein may include wireless connection or coupling. As used herein, term "and/or" includes all or any of one or more associated listed items or combinations thereof.

Those skilled in the art will appreciate that all terms including technical terms and scientific terms) used herein have the same meaning as commonly understood by one of ordinary skill in the art to belonging to the field of the present application, unless otherwise defined. It should also be understood that those terms, such as those defined in a general dictionary, should be considered to have a meaning consistent with the meaning in the context of the prior art, and, unless clearly defined herein, should not be understood differently or as having an excessively formal meaning.

Those skilled in the art may understand that the "terminal" and "user equipment" as used herein include both a wireless signal receiver device only having a wireless signal receiver without a transmitting capability, and a receiving and transmitting hardware having a device capable of receiving and transmitting hardware for two-way communication over a two-way communication link. Such device may include: a cellular or oilier communication device having a single line display or a multi-line display, or a cellular or other communication device without a multi-line display; a personal communications service (PCS), which may combine voice, data processing, fax and/or data communication capabilities; a PDA (Personal Digital Assistant), which may include a radio frequency receiver, a pager, Internet/Intranet access, a web browser, a notepad, a calendar, and/or a GPS (Global Positioning System) receiver; a conventional laptop and/or a palmtop computer or other devices having a conventional laptop and/or palmtop computer or other devices and/or having a radio frequency receiver. As used herein, "terminal" and "user equipment" may be portable, transportable, installed in a vehicle (in aviation, sea and/or land), or adapted and/or configured to operate locally, and/or operated in any other location on the earth and/or space in a distributed form. As used herein, "terminal" and "user equipment" may also be a communication terminal, an interact terminal, and a music/video playing terminal, for example, a PDA, a MID (Mobile Internet Device), and/or a mobile phone having a music/video playback function, and may also be a smart TV, a set-top box and other devices.

In the Long Term Evolution (LTE) technology, downlink traffic reception or uplink traffic transmission by a UE is scheduled by a base station. A typical scheduling mode is dynamic scheduling, which allocates downlink transmission resources or uplink transmission resources using DCI in a Physical Downlink Control Channel (PDCCH), each allocation of each piece of DCI being valid to a specific single subframe, or time slot, or Resource Unit (RU).

In the dynamic scheduling-based Transmission Time Interval (TTI) bundling technique in LTE, a single Transport Block (TB) from a Medium Access Control (MAC) layer is transmitted repetitively in multiple consecutive subframes, and only one set of signaling information is required for an entire transmission. In addition, a concept of repetition is introduced in Machine Type Communication (MTC) and Narrow Band Internet of Things (NB-IoT) technologies. Each time the dynamic scheduling-based resource allocation is valid for consecutive one or more subframes (or time slots, or RUs), the one or more subframes are used for repetitive transmission of the same transport block.

In an SPS(Semi-Persistent Scheduling) mechanism, the base station semi-statically configures and allocates radio resources to the UE in a time period longer than one subframe, thereby avoiding the requirement of DCI for scheduling of each subframe. In the SPS mechanism, the base station configures an SPS process for the UE via higher layer signaling, including a Radio Network Temporary identifier (RNTI), a scheduling period, a subframe set, an indirect release and other parameters. The configured SPS process is initially in an inactive state, and the base station transmits an activation DCI for activating the SPS process and a release DCI for releasing the SPS process to control activation and release of the SPS process of the UE. After the SPS process is activated, the UE may use resources corresponding to the SPS process for uplink transmission or downlink reception.

In the UE technology, the PDCCH occupies the first 1/2/3 OFDM symbols of each subframe in the time domain (for a narrowband system, the first 2/3/4 OFDM symbols of each subframe) for downlink transmission, and this region is called a control region. Correspondingly, the remaining OFDM symbols, called a data region, are used for data transmission on a Physical Downlink Shared Channel (PDSCH). In UE Release 11 (Release-11), a concept of Enhanced Physical Downlink Control Channel (EPDCCH) is introduced. The EPDCCH transmits control information using PDSCH resources, i.e., resources of the data region, in order to increase the capacity of the control channel and support scheduling of the control information in the frequency domain.

In MTC, a control channel is an MTC Physical Downlink Control Channel (MPDCCH), which is designed based on EPDCCH, and also uses the PDSCH resources to transmit the control information of the MTC; a data channel reuses the PDSCH in LTE; a Master Information Block (MIB) reuses the MIB transmission mechanism in UE; and other System Information Blocks (SIBs) are transmitted on the PDSCH. Therefore, main downlink transmissions in MTC will not use the UE control region in the time domain.

Similarly, in the NB-IoT system, a NB-PDSCH (NPDCCH) process reuses the UE PDSCH process, while adding the repeating step; the NB-PDCCH (NPDCCH) transmission does not use the control region; and for an in-band operation mode, the size of the control region is indicated in SIB1-NB, while for a guard-band operation mode and a standalone operation mode, the size of the control region is 0. Therefore, at least for the in-band operation mode, main downlink transmissions in NB-IoT will not use the UE control region in the time domain either.

In the NB-IoT system, on a non-anchor carrier, the NBS exists only on a subframe used by the NPDCCH candidate, and 10 consecutive subframes before the NPDCCH candidate and 4 consecutive subframes after the NPDCCH candidate.

In the MTC and NB-IoT technologies, a maximum Transport Block Size (TBS) supported is a small value due to a constraint of performance of a low-cost UE. For some main MTC and NB-IoT traffic scenarios, such as software update, application data reporting, etc., an amount of information of uplink and downlink traffic requires to be carried over multiple transport blocks, each requiring a piece of DCI for resource scheduling, and thus the overhead of scheduling signaling is relatively high, and a transmission efficiency is relatively low.

A disadvantage of applying the existing SPS mechanism to the traffic scenarios of the MTC and the NB-IoT consists in that the existing SPS mechanism is configured by the higher layer signaling, and thus lacks flexibility, is valid consecutively once configured, and is more suitable for the traffic of Voice-over-IP (VoIP) type which consecutively has periodic small datagrams to be transmitted over a long period of time. The number of transport blocks in the main traffic scenarios of the MTC and NB-IoT is relatively limited, and the traffic usually does not last for a relatively long time. When the SPS mechanism is used in the MTC and NB-IoT scenarios, it is not a suitable technique due to such disadvantages as the configuration by the higher layer signaling or the relatively slower configuration update rate and lack of flexibility in scheduling etc.

In the MTC and NB-IoT technologies, the initial design of reusing the EPDCCH and PDSCH processes in UE was intended to simplify the design and reduce workload on standardization. However, at least for the MTC and NB-IoT systems which are not deployed on the UE band, the UE control region can be used for the downlink transmission. In the prior art, the design of not using the UE control region in the time domain for the downlink transmission actually leads to a waste of downlink resources.

On the non-anchor carrier, a subframe in which no NRS exists is difficult to be used for downlink measurement, which is disadvantageous for transmission of downlink or uplink signal/channel, such as paging on the non-anchor carrier.

Several particular embodiments are given below. The PDCCH (Physical Downlink Control Channel) in the following embodiments may be an EPDCCH (Enhanced PDCCH), MPDCCH (Machine type communication (MTC) PDCCH), NPDCCH (Narrowband PDCCH); the PDSCH (Physical Downlink Shared Channel) may be an EPDSCH (Enhanced PDSCH), MPDSCH (MTC PDSCH), NPDSCH (Narrowband PDSCH); and the Physical Uplink Shared Channel (PUSCH) in the following embodiments may be an EPUSCH (Enhanced PUSCH), MPUSCH (MTC PUSCH), NPUSCH (Narrowband PUSCH). The PDSCH/PUSCH in the following embodiments may be a PDSCH/PUSCH for unicast traffic, or may be a PDSCH/PUSCH carrying multicast traffic, for example, a PDSCH carrying a Single Cell Multicast Control Channel (SC-MCCH), or a Single Cell Multicast Traffic Channel (SC-MTCH).

The subframes in the following embodiments may be a BL/CE (Bandwidth-reduced Low-complexity or Coverage Enhanced) subframe, BL/CE downlink subframe, BL/CE valid subframe, BL/CE downlink valid subframe, NB-IoT subframe, NB-IoT downlink subframe, NB-IoT valid subframe, NB-IoT downlink valid subframe, time slot, NB-IoT time slot, TTI.

In the following embodiments, the configuration information may be configured by the base station, indicated by signaling, configured by the higher layer, or pre-configured. The configuration information may include a set of configuration information or multiple sets of configuration information. The UE may select a set of configuration information to be used from the multiple sets of configuration information according to a predefined condition. A set of configuration information may include multiple subsets, and the UE may also select a subset to be used from a set of configuration information or a set of configuration information among the multiple sets of configuration information according to a predefined condition.

Hereinafter, a flowchart of a method at a UE of scheduling multiple transport blocks using DCI according to an exemplary embodiment of the present disclosure will be described in detail with reference to FIG. 1.

FIG. 1 schematically illustrates a flowchart of a method 100 at a UE of scheduling multiple transport blocks using DCI according to an exemplary embodiment of the present disclosure, wherein the multiple transport blocks include multiple transport blocks for uplink and/or downlink traffic, and the method 100 may be used for unicast or multicast.

As shown in FIG. 1, the method 100 includes a step 101 in which a UE receives and/or transmits a transport block(s) according to information for scheduling multiple transport blocks.

According to an embodiment of the present disclosure, the information for scheduling the multiple transport blocks may include information for scheduling more than one transport block, and may also include information for scheduling one transport block.

The multiple transport blocks may include at least one of multiple transport blocks corresponding to multiple HARQ processes of one UE, multiple transport blocks corresponding to one HARQ process for an initial transmission and/or for at least one retransmission, multiple transport blocks corresponding to at least one uplink and/or at least one downlink transmission of one UE, or transport blocks corresponding to multiple different UEs.

According to an embodiment of the present disclosure, the information for scheduling the multiple transport blocks is obtained from at least one of information obtained from DCI, a DCI format, a scrambling sequence of DCI, a search space for detecting DCI, a size of DCI, or RRC configuration information.

According to an embodiment of the present disclosure, the scrambling sequence of DCI is an RNTI.

The information for scheduling the multiple transport blocks may include at least one of information for indicating that at least one or all of the multiple transport blocks are uplink transport blocks or downlink transport blocks;

information for indicating that the information for scheduling the multiple transport blocks is used to schedule one or more transport blocks;

a first time interval between the multiple transport blocks;

a second time interval between the at least one of the multiple transport blocks and its corresponding ACK/NACK feedback;

a third time interval between the at least one of the multiple transport blocks and ACK/NACK feedback corresponding to a transport block previous to the at least one transport block;

a fourth time interval between ACK/NACK feedback and the last one of the multiple transport blocks;

a period and/or a number of times of validations of resources for transmitting at least one HARQ process of the at least one of the multiple transport blocks; and a period of resources used by the multiple transport blocks.

According to an embodiment of the present disclosure, the method 100 may, further include a step 102, in which the UE transmits/receives ACK/NACK feedback corresponding to the multiple transport blocks.

The ACK/NACK feedback may include at least one of ACK/NACK feedback corresponding to each of the multiple transport blocks, feedback of ACK/NACK bundling or multiplexing corresponding to at least two of the multiple transport blocks.

According to an embodiment of the present disclosure, the UE may generate one or two HARQ-ACK bits of the multiple transport blocks by performing a logic 'and' operation on all individual HARQ-ACKs each corresponding to one codeword of the multiple transport blocks.

According to an embodiment of the present disclosure, the transmitting and/or receiving the ACK/NACK feedback for the multiple transport blocks may include at least one of:

after receiving all of downlink transport blocks of the multiple transport blocks, transmitting ACK/NACK feedback corresponding to all of the downlink transport blocks;

after transmitting all of the uplink transport blocks of the multiple transport blocks, receiving ACK/NACK feedback corresponding to all of the uplink transport blocks;

after completing transmitting and/or receiving the multiple transport blocks, transmitting the ACK/NACK feedback corresponding to all of the downlink transport blocks, and/or receiving the ACK/NACK feedback corresponding to all of the uplink transport blocks;

after receiving every M downlink transport, blocks of the multiple transport blocks, transmitting ACK/NACK feedback corresponding to the M downlink transport blocks, where M is a positive integer;

after transmitting every M uplink transport blocks of the multiple transport blocks, receiving ACK/NACK feedback corresponding to the M uplink transport, blocks, where Nil is a positive integer.

According to an embodiment of the present disclosure, the ACK/NACK feedback corresponding to the uplink transport block is transmitted over a specific channel; and/or indicated in the DCI.

According to an embodiment of the present disclosure, the ACK/NACK feedback is transmitted/received by at least one of:

carrying the ACK/NACK feedback corresponding to all of the multiple transport blocks in one ACK/NACK feedback message;

carrying the ACK/NACK feedback corresponding to every M of the multiple transport blocks in one ACK/NACK feedback message, where M is a positive integer;

transmitting the ACK/NACK feedback for the downlink transport block(s) together with other uplink signals/channels, and receiving the ACK/NACK feedback for the uplink transport block(s) together with other downlink signals/channels.

According to an embodiment of the present disclosure, M may be:

configured by the base station or the higher layer, or predefined;

determined based on the number of HARQ processes in the information for scheduling the multiple transport blocks;

determined based on a maximum number of HARQ processes supported by the According to an embodiment of the present disclosure, when ACK/NACK feedback corresponding to more than one transport block is carried in one ACK/NACK feedback message, feedback of ACK/NACK bundling or feedback of ACK/NACK multiplexing is used (for example, space division multiplexing), or a bitmap of a length N may be carried, where N is the number of the more than one transport block, each bit in the bitmap indicating that an HARQ process corresponding to one transport block corresponds to the HARQ processes of the multiple transport blocks according to a predetermined mapping relationship.

According to an embodiment of the present disclosure, the ACK/NACK is indicated by at least one of:
 a predefined scrambling sequence;
 a higher-layer header added before a corresponding transport block for uplink traffic or downlink traffic;
 a newly introduced MAC CE;
 an ACK/NACK feedback field; or
 DCI for indicating ACK/NACK.

According to an embodiment of the present disclosure, the scheduling information carried in the DCI includes scheduling information of each transport block and other scheduling information, and may include at least one of the number of transport blocks scheduled in DCI, frequency domain resources, time domain resources, a scheduling delay, a Modulation and Coding Scheme (MCS), a redundancy version (RV), the number of repetitions, a new data indicator (NIDI), the DCI subframe repetition number, the number of HARQ processes, HARQ HARQ-ACK time domain and/or frequency domain resources, power control information, or Single Cell Multicast Control Channel (SC-MCCH) change notification.

Any of the above is specific to each transport block, or is common to all of the transport blocks scheduled in the DCI. For example, one MCS field is carried in the DCI, and all of the transport blocks scheduled in the DCI use the MCS value indicated by this field. For example, when the number of transport blocks scheduled in the DCI is m, the DCI carries m NDI fields with each length of 1 bit. That is, the carried NDI fields constitute a bitmap with length of m, in which each of the bits sequentially indicates an NDI value of one transport block.

The UE acquiring the scheduling information in the DCI includes: acquiring, by the UE, the scheduling information that is explicitly indicated in the DCI; and also includes: determining, by the UE, the scheduling information according to a predefined parameter or configuration relationship and/or information implicitly indicated in the DCI.

According to an embodiment of the present disclosure, the time domain resource(s) carried in the DCI as the scheduling information may include at least one of:
 a time interval between transport blocks scheduled in the DCI;
 a time interval between a transport block scheduled in the DCI and its corresponding ACK/NACK feedback;
 a time interval between a transport block scheduled in the DCI and ACK/NACK feedback corresponding to a transport block previous to the transport block; or
 a period of resource(s) used by a transport block.

According to an embodiment of the present disclosure, any of the above three time intervals may be indicated by the scheduling delay field carried in the DCI, or may be predefined.

Multi-TB Scheduled Time Domain Resources

With respect to the DCI for scheduling the multiple transport blocks, the process of the LI decoding multiple physical downlink shared channels transmitted by the base station according to the scheduling information carried in the DCI, and/or transmitting the multiple physical uplink shared channels to the base station includes: determining time domain resource information of the multiple transport blocks according to the scheduling information carried in the DCI.

According to an embodiment of the present disclosure, the time domain resource information includes a time domain position for performing PDSCH decoding and/or a time domain position for transmitting ACK/NACK feedback, and/or a time domain position for PUSCH transmission.

According to an embodiment of the present disclosure, the scheduling information carried in the DCI includes at least one of:
 a) one or more scheduling delays for indicating a time interval between the DCI and a start subframe of the first PDSCH/PUSCH scheduled by the DCI, and/or a time interval between two adjacent PDSCHs/PUSCHs, and/or a time interval between a PDSCH/PUSCH and corresponding ACK/NACK feedback, and/or a time interval between a PDSCH/PUSCH and the previous ACK/NACK feedback, and/or a time interval between ACK/NACK feedback and the last PDSCH/PUSCH;
 wherein the time interval between any two adjacent PDSCHs/PUSCHs is a time interval between two PDSCHs, or a time interval between two PUSCHs, or a time interval between one PDSCH and one PUSCH;
 wherein the time intervals between any two adjacent PDSCHs/PUSCHs are identical, that is, the resources of the PDSCH/PUSCH are periodic in the time domain, or the time intervals between any two adjacent PDSCHs/PUSCHs are identical or different, the different tune intervals being sequentially indicated by multiple scheduling delay values;
 b) a resource period for indicating a period of PDSCH/PUSCH resources when the DCI is used to schedule multiple periodic PDSCH/PUSCH resources.

With regard to the DCI for scheduling the multiple transport blocks, the resources used by the multiple transport blocks scheduled in the DCI can be consecutive or inconsecutive in the time domain, as shown in FIG. 1. For example, when the scheduling delay between the two adjacent PDSCHs/PUSCHs is 0, resources of the multiple transport blocks are consecutive in the time domain; otherwise, they are inconsecutive. For example, when the length of the resource period is equal to a length of PDSCH/PUSCH transmission in the time domain, or equal to the number of PDSCH/PUSCH repetitions, the resources of the multiple transport blocks are consecutive in the time domain; otherwise, they are inconsecutive.

According to an embodiment of the present disclosure, in step 102, after all of downlink transport blocks in the multiple transport blocks are received, ACK/NACK feedback(s) corresponding to all of the downlink transport blocks may be transmitted. Similarly, after all of uplink transport blocks in the multiple transport blocks are transmitted, ACK/NACK feedback(s) corresponding to all of the uplink transport blocks is received. Alternatively, in step 102, after transmitting and/or receiving of the multiple transport blocks are completed, the ACK/NACK feedback(s) corresponding to all of the downlink transport blocks are transmitted, and/or the ACK/NACK feedback(s) corresponding to all of the uplink transport blocks are received.

FIG. 2*a* schematically illustrates a diagram of transmitting/receiving ACK/NACK feedback according to the present exemplary embodiment. As shown in FIG. 2*a*, for the for scheduling the multiple transport blocks, the ACK/NACK feedbacks corresponding to the transport blocks scheduled by the DCI are transmitted/received after all the PDSCH/

PUSCH transmissions are completed. In conjunction with the example of FIG. 2a, the ACK/NACK feedback for the downlink traffic is transmitted after all PDSCH decodings are completed, and the ACK/NACK feedback for the uplink traffic (including a specific ACK/NACK feedback signal/ channel, or DCI implicitly indicating ACK/NACK feedback) is received after all PUSCH transmissions are decoded.

According to an embodiment of the present disclosure, in step 102, after every M downlink transport blocks of the multiple transport blocks are received, ACK/NACK feedback corresponding to the M downlink transport blocks is transmitted, where M is a positive integer. Similarly, after every M uplink transport blocks of the multiple transport blocks are transmitted, ACK/NACK feedback corresponding to the M uplink transport blocks are received, where M is a positive integer.

Figure 2B:
FIG. 2B schematically illustrates a diagram of transmitting/receiving ACK/NACK feedback according to an embodiment of the present disclosure.

FIG. 1b schematically illustrates a diagram of transmitting/receiving ACK/NACK feedback According to an embodiment of the present disclosure. As shown in FIG. 2b, for the DCI for scheduling the multiple transport blocks, the ACK/NACK feedbacks corresponding to every M transport blocks scheduled by the DCI are transmitted/received after the M PDSCH/PUSCH transmissions are completed. In conjunction with the example of FIG. 2b, the ACK/NACK feedback for the downlink traffic is transmitted after every M PDSCH decodings are completed, and the ACK/NACK feedback for the uplink traffic (including the specific ACK/NACK feedback signal/channel, or the DCI implicitly indicating the ACK/NACK feedback) is received after the M PUSCH transmissions are decoded; or the ACK/NACK feedback is transmitted/received after the PDSCH decodings and the PUSCH transmissions are performed every M times in total.

According to an embodiment of the present disclosure, M may be:
  configured by the base station or the higher layer, or predefined;
  determined based on the number of HARQ processes scheduled by the DCI; or
  determined based on the maximum number of HARQ processes supported by the UE, which will be described in detail later.

According to an embodiment of the present disclosure, the ACK/NACK feedback corresponding to the uplink transport block is transmitted over a specific channel, and/or indicated in the DCI.

According to an embodiment of the present disclosure, the ACK/NACK feedback is transmitted/received by at least one of:
  carrying the ACK/NACK feedback corresponding to all of the multiple transport blocks in one ACK/NACK feedback message;
  carrying the ACK/NACK feedback corresponding to every M of the multiple transport blocks in one ACK/NACK feedback message, where M is a positive integer; or
  transmitting the ACK/NACK feedback for the downlink transport block(s) together with other uplink signals/channels, and receiving the ACK/NACK feedback for the uplink transport block(s) together with other downlink signals/channels.

According to an embodiment of the present disclosure, the ACK/NACK is indicated by at least one of:
  a predefined scrambling sequence;
  a higher-layer header added before a corresponding transport block for uplink traffic or downlink traffic;
  a newly introduced MAC CE;
  an ACK/NACK feedback field; or
  DCI for indicating ACK/NACK According to an embodiment of the present disclosure, the ACK/NACK is transmitted in a specific uplink or downlink signal/channel, or carried in the DCI. The ACK/NACK is carried in the DCI, indicated by an NUI field in the DCI, or indicated by the ACK/NACK field, or indicated by a DCI format of the newly introduced DCI. The DCI is DCI dedicated to indicating ACK/NACK feedback for one or more UEs, or existing DCI for data scheduling, or newly introduced DCI for scheduling one or more UEs. The DCI is transmitted in at least one: a newly introduced common search space, a newly introduced UE-specific search space, an existing common search space, or an existing UE-specific search space.

According to an embodiment of the present disclosure, the information indicated in the DCI dedicated to indicating the ACK/NACK feedback for the one or more UEs includes at least one of:
  identities of the one or more UEs;
  a group identity of a UE group corresponding to the one or more Us;
  an HARQ ID of at least one transport block for each of the one or more UEs;
  a transmission resource position of at least one transport block for each of the one or more UEs; or
  ACK/NACK feedback for at least one transport block for each of the one or more UEs, According to an embodiment of the present disclosure, said transmitting and/or receiving the ACK/NACK feedback for the multiple transport blocks further includes:
  determining a time window or latest time for receiving an ACK/NACK feedback message, according to all time domain resources of the multiple transport blocks, or time domain resources of at least one specific transport block of the multiple transport blocks; and receiving the ACK/NACK feedback message within the time window or before the latest time.

According to an embodiment of the present disclosure, said transmitting and/or receiving the ACK/NACK feedback for the multiple transport blocks further includes at least one of:
  transmitting only ACK feedback without transmitting NACK feedback;
  transmitting only NACK feedback without transmitting ACK feedback;
  assuming that NACK feedback is received if no ACK feedback is received within a given time window or before a give latest time; or
  assuming that ACK feedback is received if no NACK feedback is received within a given time window or before a give latest time.

ACK/NACK Feedback for Downlink Traffic

According to an embodiment of the present disclosure, the ACK/NACK feedback for the transport block may include: HARQ-ACK feedback for the transport block, ACK/NACK feedback or HARQ-ACK feedback for decoding the transport block, or ACK/NACK feedback or HARQ-ACK feedback corresponding to the HARQ process corresponding to the transport block.

For the DCI for scheduling the multiple transport blocks, when there is at least one transport block of downlink traffic among the multiple transport blocks, the ACK/NACK feedback is transmitted in accordance with any of the following methods.

Method 1

According to an embodiment of the present disclosure, after decoding data of all the multiple transport blocks indicated by the DCI, the UE transmits ACK/NACK feedback for all the multiple transport blocks to the base station, as shown in FIG. 2a.

The ACK/NACK feedback for all the multiple transport blocks is carried in one ACK/NACK feedback message; or carried in multiple ACK/NACK feedback messages, each ACK/NACK feedback message carrying ACK/NACK feedback for one or more transport blocks.

Content of ACK/NACK Feedback Message (1) When the ACK/NACK feedback for all the multiple transport blocks is carried in one ACK/NACK feedback message, the ACK/NACK feedback message is a bitmap of a length N, where N is the number of all of the transport blocks, each bit in the bitmap indicating that an HARQ process corresponding to one transport block corresponds to the HARQ processes of the multiple transport blocks according to a predetermined mapping relationship.

For example, in an order of the HARQ processes sequentially in the time domain, the n-th bit in the bitmap indicates feedback information of an HARQ process of the n-th transport block in the time domain.

According to an embodiment of the present disclosure, it can be dependent on the HARQ II) of the HARQ process. In an example of corresponding in an ascending order, the first bit in the bitmap corresponds to an HARQ process with the smallest HARQ ID in the multiple transport blocks, and the second bit corresponds to an HARQ ID with the second smallest HARQ ID in the multiple transport blocks, and so on, and the last bit in the bitmap corresponds to an HARQ process with the largest HARQ II) in the multiple transport blocks. Similarly in an example of corresponding in a descending order, the first bit in the bitmap corresponds to an HARQ process with the largest HARQ ID in the multiple transport blocks, and so on, and the last bit in the bitmap corresponds to an HARQ process with the smallest HARQ ID in the multiple transport blocks.

(2) When the ACK/NACK feedback for all the multiple transport blocks is carried in multiple ACK/NACK feedback messages, each ACK/NACK feedback message corresponds to an HARQ process of one or more transport blocks according to a fixed mapping relationship.

For example, in an order of HARQ processes sequentially in the time domain:

a) when each ACK/NACK feedback message carries ACK/NACK feedback for one transport block, the n-th ACK/NACK feedback message carries feedback information of an HARQ process of the n-th transport block in the time domain;

b) When each ACK/NACK feedback message carries ACK/NACK feedback for m transport blocks, the first ACK/NACK feedback message carries feedback information of an HARQ process of the first to m-th transport blocks in the time domain, and so on, and the n-th ACK/NACK feedback message carries feedback information of an HARQ process of the $((n-1)*m+1)$-th~$(n*m)$-th transport blocks in the time domain; and when the total number of the HARQ processes cannot be divisible by m, the last ACK/NACK feedback message carries the remaining less than m ACK/NACK feedback messages with or without padding bits.

For the ACK/NACK feedback message carrying ACK/NACK feedback for the multiple transport blocks, that is, m>1, a bitmap with a length m is carried in one ACK/NACK feedback message, and each bit in the bitmap indicates that feedback information of an HARQ process corresponding to one transport block corresponds to the HARQ processes of the multiple transport blocks according to a fixed mapping relationship. For example, in an order of the HARQ processes sequentially in the time domain, the n1-th bit in the bitmap indicates feedback information of an HARQ process of the $((n-1)*m+n1)$-th transport block in the time domain. For example, depending on the HARQ ID of the HARQ process, the particular method is the same as the method for the case where the ACK/NACK feedback for all the multiple transport blocks is carried in one ACK/NACK feedback message, except that the multiple transport blocks refer to the transport block indicated in the ACK/NACK feedback message.

(3) For (1) and (2), there is also a method of using ACK/NACK bundling when HARQ-ACK feedback for more than one transport block is indicated in one ACK/NACK feedback message. The ACK/NACK feedback message carries 1 bit indicating HARQ-ACK feedback for the more than one transport block. Alternatively, ACK/NACK multiplexing is used.

For example, when the HARQ-ACK feedback for the more than one transport block is all ACK, ACK is indicated in the ACK/NACK feedback message with 1 bit; otherwise, NACK is indicated in the ACK/NACK feedback message with 1 bit.

Resource Position of ACK/NACK Feedback Message (1) When ACK/NACK feedback of all the multiple transport blocks is carried in one ACK/NACK feedback message, the frequency domain position of the feedback message is explicitly or implicitly indicated by the DCI for scheduling all the multiple corresponding transport blocks; and/or, is calculated from all the multiple corresponding transport blocks, including all the multiple corresponding transport blocks or a predefined one or some of all the multiple corresponding transport blocks, according to a predefined mapping relationship; and/or the frequency domain position of the feedback message is predefined. Any of the above methods determines a part or all of the information of the frequency domain position of the feedback message. For example, the narrowband or the PRBs used by the feedback message are identical to the narrowband or the PRBs used by all the multiple corresponding transport blocks; or the frequency domain positions of the narrowband or PRBs on the uplink frequency band used by the feedback message are obtained according to the frequency domain configuration mapping of the narrowband or PRBs on the downlink frequency band used by all the multiple transport blocks. For example, the position of the PRBs in the narrowband or the position of the subcarrier in the PRB used by the feedback message is predefined or is indicated by the Del.

According to an embodiment of the present disclosure, the time domain position of the feedback message is explicitly or implicitly indicated by the DCI for scheduling all of the multiple corresponding transport blocks; and/or the time domain position of the feedback message is predefined. For example, the time domain position of the feedback message is indicated by the scheduling delay domain carried in the DCI, or the value of the scheduling delay of the feedback message is predefined; wherein the scheduling delay is a time domain interval between the feedback message and the DCI, which is particularly a time domain interval between the start subframe of the feedback message and the end subframe of the DCI for scheduling the last transport block; or a time domain interval between the feedback message and the last transport block scheduled in the DCI, which is particularly a time domain interval between the start subframe of the feedback message and the end subframe of the last transport block scheduled in the DCI; or a time domain interval between the feedback message and the n-th transport block scheduled in the DCI, which is particularly a time domain interval between the start subframe of the feedback message and the end subframe of the n-th transport block scheduled in the DCI, where n is a predefined value.

(2) When the ACK/NACK feedback for all the multiple transport blocks is carried in multiple ACK/NACK feedback messages, the method for determining the time-frequency position of the first ACK/NACK feedback message is the same as in (1); the frequency domain position(s) of the subsequent ACK/NACK feedback message(s) is predefined and/or determined based on the first feedback message, for example, to be the same as the frequency domain position of the first feedback message, or determined based on the frequency domain position of the first feedback message and a predefined frequency hopping type.

According to an embodiment of the present disclosure, the time domain position of the subsequent ACK/NACK feedback message is explicitly or implicitly indicated by the DCI for scheduling all the multiple corresponding transport blocks; and/or based on the time domain position of the first ACK/NACK feedback message; and/or predefined. For example, the time domain interval between every two adjacent ACK/NACK feedback messages is indicated by the scheduling delay, and the time domain position of each ACK/NACK feedback message is determined by the time domain position and the scheduling delay of the first ACK/NACK feedback message. Here, the value of the scheduling delay is predefined, or indicated by the DCI for scheduling all the multiple corresponding transport blocks. Here, the time domain interval between every two adjacent ACK/NACK feedback messages is a time domain interval between the start subframe of the latter ACK/NACK feedback message and the start subframe or the end subframe of the former ACK/NACK feedback message.

Method 2

According to an embodiment of the present disclosure, the UE transmits ACK/NACK feedback to the base station after each decoding process in which data of one transport block indicated by the DCI is decoded, or after every M (not necessarily all) decoding processes (also referred to as 'decodings'), in each of which data of one transport block indicated by the DCI is decoded. FIG. 2b shows an example, in which the UE transmits the ACK/NACK to the base station after each decoding process in which data of one transport block indicated by the DCI is decoded.

According to an embodiment of the present disclosure, the ACK/NACK feedback transmitted by the UE is the ACK/NACK feedback for the transport block which is decoded last time, or the ACK/NACK feedback for the transport blocks which are decoded in the previous M decoding processes, or the ACK/NACK feedback for all the transport blocks which are decoded after the last ACK/NACK feedback is transmitted. Furthermore, the ACK/NACK feedback transmitted by the UE is carried in one ACK/NACK feedback message; or carried in multiple ACK/NACK feedback messages, each ACK/NACK feedback message carrying ACK/NACK feedback for one or more transport blocks.

(1) When the ACK/NACK feedback transmitted by the UE is the ACK/NACK feedback for the transport block which is decoded last time, the existing UE mechanism is reused. However, in the scenario where the DCI schedules the multiple transport blocks, the scheduling delay between data and ACK/NACK feedback of different transport blocks is carried in the same piece of DCI. The scheduling delay is common to the multiple transport blocks, that is, the multiple transport blocks scheduled in the DCI use the same scheduling delay field; or the scheduling delay is transport block-specific, that is, each transport block scheduled by the DO uses one scheduling delay field.

(2) When the ACK/NACK feedback transmitted by the UE is the ACK/NACK feedback for the transport blocks which are decoded in the previous N decoding processes, the ACK/NACK feedback message carries a bitmap with a length N, each bit in the bitmap indicating that an HARQ process corresponding to one transport block corresponds to the HARQ processes of the multiple transport blocks according to a fixed mapping relationship. The mapping method is the same as that in Method 1. Here, N is a fixed value or the number of transport block decoding processes performed after the last ACK/NACK feedback is transmitted.

According to an embodiment of the present disclosure, when the interval between the time domain resources used by the multiple transport blocks scheduled by the DCI is greater than 0, the UE transmits to the base station the ACK/NACK feedback message according to the scheduling information of ACK/NACK in each interval or an interval partly configured or scheduled by the base station, the ACK/NACK feedback message carrying the feedback for the downlink transport blocks) which is decoded in the previous one or N PDSCH decoding processes, or the feedback for all of downlink transport blocks decoded after the last ACK/NACK feedback message is transmitted. This is applicable to half duplex UEs and full duplex UEs.

When the interval between the time domain resources used by the multiple transport blocks scheduled by the DCI is equal to 0, the UE transmits to the base station the ACK/NACK feedback message according to the scheduling information of ACK/NACK while the LTE is performing the downlink PDSCH reception, the ACK/NACK feedback message carrying the feedback for the downlink transport block(s) which is decoded in the previous one or N PDSCH decoding processes, or the feedback for all of downlink transport blocks decoded after the last ACK/NACK feedback message is transmitted. This is applicable to full duplex UEs.

Method 3

According to an embodiment of the present disclosure, when the UE needs to transmit the uplink traffic and the ACK/NACK feedback for the downlink traffic, the ACK/NACK feedback information of the downlink traffic is carried in the transmission resource of the uplink traffic, that is, the piggybacked ACK/NACK feedback is used.

When the UE transmits the piggybacked. ACK/NACK feedback, the feedback information is indicated as ACK or NACK by at least one of:

a predefined scrambling sequence; for example, when the carried ACK/NACK feedback information is feedback information of 1 bit or 1 transport block, at least 2 predefined scrambling sequences being used to indicate ACK and NACK respectively; when the carried ACK/NACK feedback information is feedback information of m bits or m transport blocks, at least $2^m$ predefined scrambling sequences being used to indicate ACK and NACK respectively;

a higher-layer header added before the transport block of the uplink traffic, including a MAC header/RIX header/PDCP Header;

a newly introduced MAC CE;

an ACK/NACK feedback field; a) this field being added before or after the transport block of the uplink traffic, for example, when the carried ACK/NACK feedback information is feedback information of m bits or m transport blocks, an m-bit ACK/NACK feedback field is added before the transport block of the uplink traffic; b) this field and the transport block of the uplink traffic being transmitted in frequency division on the same time domain resources and different frequency domain resources, and the frequency domain resources of the field and the transport block of the uplink traffic being adjacent or not adjacent. For a) and b), at least one of scrambling, modulation, transmission coding, mapping to physical resources, adding CRC check, rate matching, repetition is performed on the ACK/NACK feedback field independently or in conjunction with the content of the transport block; or a predefined ACK/NACK state or a predefined ACK/NACK transmission criterion; for example, assuming that only ACK feedback is transmitted while NACK feedback is not transmitted, and NACK feedback is received if no ACK feedback is received within a given time window or before given latest time; or assuming that only NACK feedback is transmitted while ACK feedback is not transmitted, and ACK feedback is received if no NACK feedback is received within a given time window or before given latest time.

Selection of Different Methods

The main difference between Method 1 and Method 2 consists in that, the numbers of decodings of the transport block indicated by the DCI are different before each time the HARQ-ACK feedback is transmitted. The number of times is configured by the base station or the higher layer or predefined, or the number of times is determined according to the number of HARQ processes scheduled by the DCI or the maximum number of HARQ processes supported by the UE.

According to an embodiment of the present disclosure, the number of times of decodings of the transport block indicated by the DCI before each time the UE transmits the HARQ-ACK feedback is the number of HARQ processes scheduled by the DCI which is indicated in the DCI, or the maximum number of HARQ processes supported by the UE.

For example, for a single-HARQ capable UE, only Method 2 can be used, with N=1, that is, the UE transmits ACK/NACK feedback to the base station after each time data of one transport block indicated by the DCI is decoded.

For example, for a 2-HARQ capable UE, Method 2 may be used, with N=2, that is, the UE transmits ACK/NACK feedback to the base station after performing every two decoding processes, in each of which one transport block indicated by the DCI is decoded. Alternatively, Method 2 may be used, with N=1.

For example, for a UE that can support at most in parallel HARQs, if the number of HARQ processes scheduled in the DCI is n, and n<m, Method 1 may be used.

For Method 3, similarly, the number of transport blocks corresponding to the piggybacked ACK/NACK feedback does not exceed the maximum number of HARQ processes supported by the UE, and does not exceed the number of HARQs indicated in the DCI or configured by the higher layer when the number of scheduled HARQs is indicated in the DCI or the number of HARQs is configured by the higher layer.

Another scenario is that the system supports several fixed methods. For example, the UE transmits ACK/NACK feedback to the base station after performing each decoding process of decoding data of one transport block indicated by the DCI, or the UE transmits ACK/NACK feedback to the base station after performing every two such decoding processes, or the UE transmits ACK/NACK feedback for all the multiple transport blocks to the base station after decoding data of all the multiple transport blocks indicated by the DCI. The method actually, used is configured by the base station or the higher layer from several fixed methods.

For example, the base station configures the single-HARQ capable UE to transmit ACK/NACK feedback to the base station after the UE performs each decoding process of decoding data of one transport block indicated by the DCI; configures the 2-HARQ capable UE to transmit ACK/NACK feedback to the base station after the UE performs every two such decoding processes, and configures the UE capable of supporting at most 8 parallel HARQ processes to transmit ACK/NACK feedback for all the multiple transport blocks to the base station, after the UE decodes data of all the multiple transport blocks indicated by the DCI.

ACK/NACK Feedback for Uplink Traffic

According to an embodiment of the present disclosure, the ACK/NACK feedback for the transport block may include: HARQ-ACK feedback for the transport block, ACK/NACK feedback or HARQ-ACK feedback for decoding the transport block, or ACK/NACK feedback or HARQ-ACK feedback corresponding to the HARQ process corresponding to the transport block.

For the DCI for scheduling the multiple transport blocks, when there are at least one transport block of downlink traffic among the multiple transport blocks, the ACK/NACK feedback is transmitted in accordance with any of the following methods.

Method 1

According to an embodiment of the present disclosure, in the existing MTC and NB-IoT mechanisms, the ACK/NACK feedback for the uplink traffic does not use a dedicated signal or channel for transmission, but implicitly indicates reception success or reception failure of the last uplink transmission in the next uplink scheduling information by the NDI field carried in the DCI which indicates an initial transmission or retransmission.

For the DCI for scheduling multiple transport blocks, a similar mechanism is used. In the DCI for scheduling the multiple transport blocks, the initial transmission or retransmission of the multiple transport blocks is indicated by the NIDI, which implicitly indicates reception success or reception failed of one or more uplink transport blocks in the previous transmission. For some uplink transport block scheduled by the DCI, when the corresponding NDI indicates an initial transmission, the latest transmission of the uplink transport block is successfully received; and when the corresponding NDI indicates a retransmission, the latest transmission of the uplink transport block is not successfully received.

The mechanism in which the NDI indicates that the transmission of the transport block or its corresponding HARQ process is an initial transmission or a retransmission may refer to HARQ Processing Section.

Method 2

According to an embodiment of the present disclosure, another method is newly defining a group feedback message for indicating ACK/NACK feedback for multiple transport blocks in the MTC and NB-IoT systems.

Content of ACK/NACK Feedback Message (1) The group feedback message carries ACK/NACK feedback for uplink transmission of one UE, including ACK/NACK feedback for one or more uplink transport blocks of the UE.

The channel of the group feedback message is a dedicated channel similar to a Physical Hybrid ARQ Indicator Channel (PHICH), or a Physical Downlink Control Channel (PDCCH) of an existing DCI size, or a PDCCH of a shorter/longer DCI size. When the channel of the group feedback message is the PDCCH of the existing DCI size, the ACK or NACK is indicated by an unused state in the existing DCI format, or the ACK or NACK is indicated by a new DCI format. When the channel of the group feedback message is the PDCCH of the shorter/longer DCI size, the ACK or NACK is indicated by the new DCI format.

The content of the ACK/NACK feedback message and the mapping relationship between the content and the transport block are the same as in the ACK/NACK feedback mechanism for the downlink traffic.

(2) Alternatively, the group feedback message carries ACK/NACK feedback for uplink transmission of one or more UEs, including ACK/NACK feedback of one or more uplink transport blocks of each UE. The group feedback message implicitly or explicitly carries at least one of:

identities of the one or more UEs;

a group ID of a UE group corresponding to the one or more UEs;

an HARQ II) of one or more uplink transport blocks of each of the UEs;

a uplink transmission resource position of one or more uplink transport blocks of each of the UEs; or ACK/NACK feedback information of one or more uplink transport blocks of each of the UEs.

For example, the group feedback message carries ACK/NACK feedback information of the multiple uplink transport blocks, and the UE ID and HARQ ID of the uplink transport block corresponding to each ACK/NACK feedback information a carried in the group feedback message. The UE decodes it successfully, finds that the DCI carries its own UE ID, and determines ACK/NACK feedback content of its own uplink transmission according to the corresponding HARQ ID.

For example, the group feedback message carries ACK/NACK feedback information of the multiple uplink transport blocks, the uplink transmission resource position of the uplink transport block corresponding to each ACK/NACK feedback information is carried in the group feedback message, and the group ID of the UE group corresponding to the group feedback message is carried in the group feedback message. The UE decodes it successfully according to the group ID of the group to which it belongs, finds that the DCI carries the resource position of its own uplink transmission, and determines ACK/NACK feedback content of its own uplink transmission according to the ACK/NACK feedback information corresponding to the resource position.

(3) For (1) and (2), similar to the ACK/NACK feedback for the downlink traffic, there is also a method of using ACK/NACK bundling when HARQ-ACK feedback for more than one transport block is indicated in one ACK/NACK feedback message. The ACK/NACK feedback message carries 1 bit indicating HARQ-ACK feedback for the more than one transport block.

For Method 2, a special case is to newly define a feedback message for indicating ACK/NACK feedback for an uplink transport block. The design method of the feedback message reuses Method 2, but the number of indicated uplink transport block is 1.

Resource Position of ACK/NACK Feedback Message

According to an embodiment of the present disclosure, for (1) and (2), the UE needs to determine to listen/detect the frequency domain resource/frequency domain position and the time domain resource/time domain position of the group feedback message indicating the ACK/NACK feedback for the multiple transport blocks.

According to an embodiment of the present disclosure, a method for determining the frequency domain resource of the group feedback message indicating the ACK/NACK feedback for the multiple transport blocks, includes a method in an ACK/NACK feedback mechanism for downlink traffic, and further includes:

listening by the UE to the search space of the corresponding group feedback message, and detecting the group feedback message indicating ACK/NACK feedback for the multiple transport blocks. The search space of the corresponding group feedback message is a newly introduced search space or an existing search space. The frequency domain resource and/or time domain resource of the search space of the corresponding group feedback message is configured by the base station or configured by the higher layer or pre-configured.

According to an embodiment of the present disclosure, a method for determining the time domain resource of the ACK/NACK feedback message, including the method in the ACK/NACK feedback mechanism of the downlink traffic, and further includes:

determining, by the UE, to monitor/detect a time window of an ACK/NACK feedback message according to time domain resources of all of one or more uplink transport blocks, or time domain resources of some one or more of the uplink transport blocks, and monitoring/detecting the ACK/NACK feedback message transmitted by the base station in the monitored time window, and/or monitoring the search space of the corresponding group feedback message and detecting a group feedback message indicating the ACK/NACK feedback for the multiple transport blocks in the monitored time window.

For example, the UE starts a timer according to the predefined configuration information and the time domain resource of the last uplink transport block of the one or more uplink transport blocks of the UE; and monitors the search space on the PDCCH corresponding to the group feedback message before the timer expires, or monitors a group feedback message dedicated channel, such as PHICH, transmitted by the base station and detects/decodes the ACK/NACK feedback message.

Method 3

According to an embodiment of the present disclosure, similar to the ACK/NACK feedback for the downlink traffic, for the piggybacked ACK/NACK feedback, the UE decodes it to obtain the carried ACK/NACK feedback information for the uplink traffic in the transmission resources of the downlink traffic when the UE needs to receive the downlink traffic and the ACK/NACK feedback for the uplink traffic. Here, the transmission resources of the downlink traffic include the PDSCH used by the downlink data and the PDCCH used by the DCI.

When the UE decodes the piggybacked ACK/NACK feedback, the feedback information is distinguished as ACK or NACK by at least one of:

a predefined scrambling sequence; for example, when the carried ACK/NACK feedback information is feedback information of 1 bit or 1 transport block, at least 2 predefined scrambling sequences being used to indicate ACK and NACK respectively; when the carried ACK/NACK feedback information is feedback information of m bits or in transport blocks, at least $2^m$ predefined scrambling sequences being used to indicate ACK and NACK respectively;

a higher-layer header added before the transport block of the downlink traffic, including a MAC header/MX header/PDCP Header;

a newly introduced MAC CE; or an ACK/NACK feedback field; a) this field being added before or after the transport block of the downlink traffic, for example, when the carried ACK/NACK feedback information is feedback information of in bits or m transport blocks, an in-bit ACK/NACK feedback field is added before the transport block of the downlink traffic; b) this field and the transport block of the downlink traffic being transmitted in frequency division on the same time domain resources and different frequency domain resources, and the frequency domain resources of the field and the transport block of the uplink traffic being adjacent or not adjacent; c) when the transmission resource of the downlink traffic being PDCCH and this field being carried in the DCI, a message field in the DCI being used, which may be a reserved field in the existing DCI, or a field in an unused state, or a newly defined field. For a) and b), at least one of scrambling, modulation, transmission coding, mapping to physical resources, adding CRC check, rate matching, repetition is performed on the ACK/NACK feedback field independently or in conjunction with the content of the transport block.

HARQ Processing

According to an embodiment of the present disclosure, for the DCI for scheduling multiple transport blocks, the transport blocks may be transport blocks of uplink traffic or transport blocks of downlink traffic. Each transport block corresponds to one HARQ process, which may be an initial transmission of a HARQ process or a retransmission of a HARQ process. Different transport blocks may correspond to different HARQ processes, or the same HARQ process. The multiple transport blocks scheduled in the DCI may be initial transmissions and/or retransmissions of different HARQ processes, or initial transmission and/or retransmission of the same HARQ process.

According to an embodiment of the present disclosure, the method 100 further includes: acquiring, by the UE, initial transmission or retransmission indication information for indicating that a transmission of at least one of the multiple transport blocks is an initial transmission or a retransmission, wherein the initial transmission or retransmission indication information is carried by at least one of: specific ACK/NACK feedback, the transport block, a scrambling code sequence for scrambling the transport block, and a specific signal/channel for indicating initial transmission or retransmission of the transport block;

wherein the initial transmission or retransmission indication information carried in the transport block is carried by at least one of:

a higher-layer header added before the transport block, a newly introduced MAC CE carried in a MAC Protocol Data Unit 'PDU' of the transport block, or a 1-bit initial transmission/retransmission indication added before the transport block.

According to an embodiment of the present disclosure, the specific ACK/NACK feedback is the latest ACK/NACK feedback of an HARQ process corresponding to the at least one transport block.

According to an embodiment of the present disclosure, the ACK/NACK feedback includes at least one of:

an ACK/NACK feedback field corresponding to the latest ACK/NACK feedback of the HARQ process corresponding to the transport block, or a scrambling sequence of the ACK/NACK feedback message corresponding to the latest ACK/NACK feedback of the HARQ process corresponding to the transport block.

For the DCI for scheduling the multiple transport blocks; multiple HARQ processes or one HARQ process is scheduled in one DCI. When m HARQ processes are scheduled in one DCI (m>=1), after performing the PDSCH decoding/PUSCH transmission m times, the UE transmits/receives HARQ-ACK feedback or monitors the PDCCH and detects DCI.

According to an embodiment of the present disclosure, the m PDSCH decodings/PUSCH transmissions are calculated separately for uplink and downlink, that is, after performing the PDSCH decoding m times, the UE transmits HARQ-ACK feedback, and after performing the PDSCH transmission in times, the UE receives HARQ-ACK feedback or monitors the PDCCH and detects DCI. According to an embodiment of the present disclosure, the m PDSCH decodings/PUSCH transmissions are calculated for uplink and downlink in combination, that is, when the UE performs the PDSCH decoding and the PUSCH transmission m times in total, the UE transmits/receives HARQ-ACK feedback or monitors the PDCCH and detects DCI.

According to an embodiment of the present disclosure, the HARQ process may be a synchronous HARQ process or an asynchronous HARQ process.

HARQ ID

Figure 3:
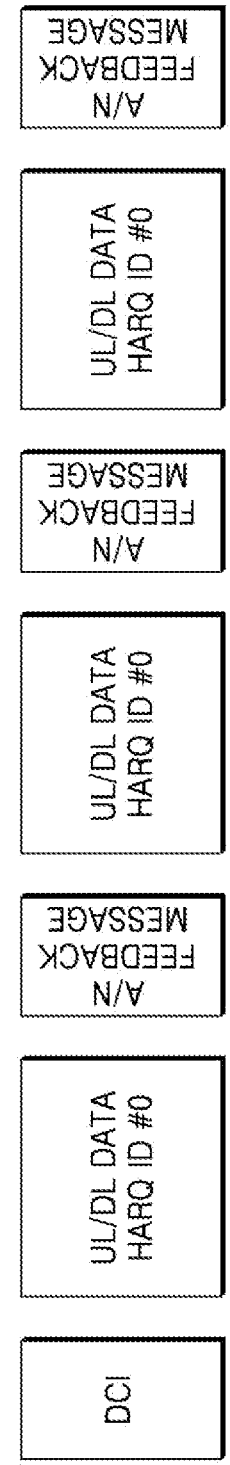
FIG. 3 schematically illustrates a diagram of scheduling one HARQ process by one DCI according to an embodiment of the present disclose e.

According to an embodiment of the present disclosure, for a scenario where one DCI schedules one HARQ process, the existing UE mechanism is reused, in which the HARQ ID is explicitly indicated in the DCI. The multiple HARQ IDs of the multiple transport blocks scheduled by the DCI are the same. FIG. 3 shows an example in which the HARQ II) carried by the DCI is #0.

Figure 4:
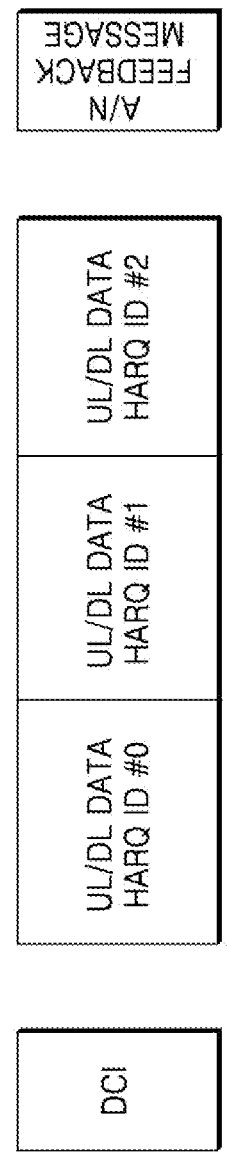
FIG. 4 schematically illustrates a diagram of scheduling multiple HARQ processes by one DCI according to an embodiment of the present disclosure.

According to an embodiment of the present disclosure, for a scenario where one DCI schedules multiple HARQ process, the HARQ process information is explicitly or implicitly carried in the DCI. For example, a reference HARQ ID is indicated in the DCI for scheduling multiple transport blocks, and the HARQ IDs corresponding to the transport blocks scheduled by the DCI are derived based on the reference HARQ ID. For example, the HARQ ID of the first transport block scheduled by the DCI is the reference HARQ ID, and the HARQ IDs corresponding to the subsequent transport blocks are sequentially incremented by 1. FIG. 4 shows an example in which a reference HARQ ID carried by DCI is #0.

According to an embodiment of the present disclosure, the HARQ process information is determined according to predefined configuration information. For example, in the DCI for scheduling m transport blocks, the HARQ IDs of the multiple transport blocks are sequentially 0, 1, . . . , m−1.

According to an embodiment of the present disclosure, the HARQ process information is explicitly carried in the DCI. For example, when the DCI schedules n HARQ processes, the identities of the n HARQ processes are indicated in n HARQ ID fields.

According to an embodiment of the present disclosure, the HARQ IDs scheduled by the DCI for scheduling multiple transport blocks are predefined. For example, when m HARQ processes are scheduled in the DCI, their HARQ IDs are #0, #1, . . . , #m−1 sequentially.

Initial Transmission/Retransmission of HARQ Process

According to an embodiment of the present disclosure, in the existing LTE mechanism, the NDI field carried in the DCI indicates that data transmission of the HARQ process is an initial transmission or a retransmission. For a scenario where the DCI schedules multiple transport blocks, similarly, an NDI field corresponding to the multiple transport blocks is carried in the DCI.

For example, for the DCI for scheduling N transport blocks, the content of the NDI field carried in the DCI is a bitmap of a length N, each bit in the bitmap indicating the initial transmission/retransmission state corresponding to one transport block. In this way, the initial transmission/retransmission states of the multiple transport blocks scheduled in one DCI is independently configured for each transport block, and any of combination manners can be configured.

For example, for the DCI for scheduling N transport blocks, a 1-bit NDI field is carried in the DCI, and the initial transmission/retransmission states of all the multiple transport blocks scheduled by the DCI are all determined by the 1-bit NDI field. In this way, all the multiple transport blocks scheduled in one DCI perform initial transmissions, or all perform retransmissions.

According to an embodiment of the present disclosure, another method for indicating that the data transmission of the HARQ process is an initial transmission or a retransmission includes: carrying the NUI field corresponding to the first n transport blocks in the DCI, and determining initial transmission/retransmission states of other transport blocks after the n-th transport block by the content of the ACK/NACK feedback message and/or the content carried in the respective transport blocks.

For example, a 1-bit NDI field carried in the DCI indicates that the transmission of the first transport block is an initial transmission or a retransmission, and the transmission of the m-th transport block being an initial transmission or a retransmission is determined according to at least one of:

an ACK/NACK feedback state of the (m−1)-th transport block; for example, the transmission of the m-th transport block being an initial transmission when the feedback of the (m−1)-th transport block is ACK; and the transmission of the m-th transport block being a retransmission when the feedback of the (m−1)-th transport block is NACK;

a scrambling sequence of the ACK/NACK feedback message for the (m−1)-th transport block; for example, ACK/NACK using two predefined scrambling sequences to indicate that the transmission of the next transport block is an initial transmission and a retransmission, respectively; or information carried in the m-th transport block implicitly or explicitly; for example, a higher-layer header added before the m-th transport block including a MAC header/RLC header/PDCP header; for example, a newly introduced MAC CE carried in a MAC PDU of the m-th transport block; for example, a 1-bit initial transmission/retransmission indication added before the m-th transport block, the initial transmission/retransmission indication performing at least one of scrambling, modulation, transmission coding, mapping to physical resources, adding CRC check, rate matching, repetition independently or in conjunction with the content of the m-th transport block; for example, a scrambling sequence of the m-th transport block.

Scheduling in Formation of HARQ Initial Transmission/Retransmission

According to an embodiment of the present disclosure, the UE acquires scheduling information of the initial transmission and the retransmission of the HARQ process according to scheduling information carried in the DCI for scheduling the multiple transport blocks, and/or scheduling information configured by the higher layer or pre-configured.

One method is using the same scheduling information for the initial transmission and the retransmission of the HARQ process. The UE acquires the scheduling information of multiple transport blocks according to the scheduling information carried in the DCI for scheduling the multiple transport blocks, and/or the scheduling information configured by the higher layer/pre-configured, and uses the scheduling information for the initial transmission and the retransmission.

Another method is using different scheduling information for the initial transmission and the retransmission of the HARQ process. The UE acquires scheduling information of the initial transmission and the retransmission of multiple transport blocks respectively according to scheduling information carried in the DCI for scheduling the multiple transport blocks, and/or scheduling information configured by the higher layer or pre-configured.

For example, the scheduling information of the initial transmission and the retransmission are respectively indicated in the DCI; and/or, the UE determines the scheduling information of the initial transmission and the retransmission according to different higher-layer configured information/pre-configured information.

Hereinafter, it will be illustrated in conjunction with an example. In this example, the scheduling information includes the number of repetitions of the transport block. The DCI indicates two numbers of repetitions, which are used for the initial transmission and the retransmission respectively; or the DCI indicates the number of repetitions of the initial transmission, and the UE determines the number of repetitions of the retransmission according to the predefined configuration information; or the UE acquires the numbers of repetitions of the initial transmission and the retransmission according to the predefined configuration information.

The method has advantages that the number of repetitions R1 of the initial transmission may be set as a larger value, and the number of repetitions of the retransmission R2 may be set to a smaller value, so that if the initial transmission of the HARQ process fails, and retransmission is required, the retransmission requires only a few repetitions, so as to avoid wasting resources by using a smaller R2. For example, in a traffic scenario, the required number of repetitions is about 1300 according to the link quality, and R1 may be configured as 1024 and R2 may be configured as 128. After one initial transmission and one or two retransmissions, the transport block is received successfully.

Single HARQ/Multi-HARQ Capability

In the following description, the number of HARQ processes supported by the HE is calculated for uplink and downlink respectively. For example, a single-HARQ capable UE supports at most one uplink HARQ process and one downlink HARQ process simultaneously, and a 2-HARQ capable UE supports at most two uplink HARQ processes and two downlink HARQ processes simultaneously; or the total number of HARQ processes supported by the UE is considered, for example, the 2-HARQ capable UE supports at most two uplink HARQ processes simultaneously, or two downlink HARQ processes simultaneously, or one uplink HARQ process and one downlink HARQ process simultaneously.

1. DCI for Scheduling One HARQ Process

For the DCI for scheduling multiple transport blocks, in a scenario of scheduling one HARQ process in one DCI, the HARQ process and the existing HARQ process(es) are all counted up when the number of HARQ processes is counted; or the HARQ process is treated as an independent HARQ configuration, and is not counted when the number of HARQ processes is counted.

(1) In a scenario of counting the HARQ process scheduled by the DCI for scheduling multiple transport blocks when the number of HARQ processes is counted:

a) For a single-HARQ capable UE, after the multiple transport blocks for which one HARQ process is scheduled by the DCI, other HARQ processes cannot be scheduled, and the UE does not need to monitor various types of physical downlink search space (PDCCH) or physical downlink search space candidates in any subframe between the end subframe of the DCI and the end subframe of the last transport block scheduled by the DCI. The PDCCH herein may also be an EPDCCH, an MPDCCH, or an NPDCCH.

For example, for a UE-specific PDCCH, if the UE detects the DCI format of the NPDCCH ending at Subframe n, and the DCI format is used to schedule: the multiple transport blocks using one HARQ process, at least one of the following is used for TDD, and/or for an FDD half-duplex UE, and/or for an FDD full-duplex LTE, and/or for all UEs:

if the last PDSCH/PUSCH transmission ends at Subframe (n+m), the UE not needing to monitor the PDCCH or PDCCH candidates in any subframe between Subframe (n+1) and Subframe (n+m−1);

if the first PDSCH/PUSCH starts at Subframe (n+k), the UE not needing to monitor the PDCCH or PDCCH candidates in any subframe between Subframe (n+1) and Subframe (n+k−1);

if one of the PDSCH/PUSCH transmissions starts at Subframe (n+k) and ends at Subframe (n+m), the UE not needing to monitor the PDCCH or PDCCH candidates in any subframe between Subframe (n+k) and Subframe (n+m−1);

if the first or last PDSCH/PUSCH starts at Subframe (n+k), and if the corresponding last ACK/NACK feedback transmission starts at Subframe (n+m), or if the corresponding last ACK/NACK feedback transmission ends at Subframe (n+m), the UE not needing to monitor the PDCCH or PDCCH candidates in any subframe between Subframe (n+k+1) or (n+k) and Subframe (n+m−1), or the UE not needing to monitor the PDCCH or PDCCH candidates in any subframe between Subframe (n+1) and Subframe (n+m−1).

b) For a 2-HARQ capable UE, after the multiple transport blocks for which one HARQ process is scheduled by the DCI, other HARQ processes may also be scheduled, and the UE needs to monitor various types of physical downlink search space (PDCCH) or physical downlink search space candidates in any subframe between the end subframe of the DCI and the end subframe of the last transport block scheduled by the DCI when the UE does not receive the PDSCH or transmit the PUSCH, The PDCCH herein may also be an EPDCCH, an MPDCCH, or an NPDCCH.

For example, for a UE-specific PDCCH, if the UE detects the DCI format of the NPDCCH ending at Subframe n, and the DCI format is used to schedule the multiple transport blocks using one HARQ process, at least one of the following is used for TDD, and/or for an FDD half-duplex UE, and/or for an FDD full-duplex UE, and/or for all UEs:

if one of PDSCH/PUSCH transmissions starts at Subframe (n+k), the UE not needing to monitor the PDCCH or PDCCH candidates in any subframe between Subframe (n+k−2) and Subframe (n+k−1);

if one of the PDSCH/PUSCH transmissions starts at Subframe (n+k) and ends at Subframe (n+m), the UE not needing to monitor the PDCCH or PDCCH candidates in any subframe between Subframe (n+k) and Subframe (n+m−1);

if one of the PDSCH/PUSCH transmissions ends at Subframe (n+m), and the corresponding ACK/NACK feedback transmission starts at Subframe (n+k) or ends at Subframe (n+k), the UE not needing to monitor the PDCCH or PDCCH candidates in any subframe between Subframe (n+m) or (n+m+1) and Subframe (n+k−a), where a is a predefined non-negative integer;

if one of the ACK/NACK transmissions starts at Subframe (n+k) and ends at Subframe (n+m), the UE not needing to monitor the PDCCH or PDCCH candidates in any subframe between Subframe (n+k) and Subframe (n+m−1);

if one of the ACK/NACK transmissions ends at Subframe (n+m), and the next PDSCH/PUSCH transmission starts at Subframe (n+k), the UE not needing to monitor the PDCCH or PDCCH candidate in any subframe between Subframe (n+m) and Subframe (n+k-a), where a is a predefined non-negative integer;

if the first PDSCH/PUSCH transmission starts at Subframe (n+k), and if the corresponding last PDSCH/PUSCH transmission ends at Subframe (n+m), the UE not needing to monitor the PDCCH or PDCCH candidates in any subframe between Subframe (n+k) or (n+k−1) and Subframe (n+m−1);

if the first PDSCH/PUSCH starts at Subframe (n+k), and if the corresponding last ACK/NACK feedback transmission starts at Subframe (n+m), or if the corresponding last ACK/NACK feedback transmission ends at Subframe (n+m), the UE not needing to monitor the PDCCH or PDCCH candidates in any subframe between Subframe (n+k+1) or (n+k) or (n+k-a) and Subframe (n+m−1) or (n+m), where a is a predefined non-negative integer.

In the above examples, the one of the PDSCHs/PUSCHs is the PDSCH/PUSCH of any one of the transport blocks scheduled in the DCI format.

c) For the UE supporting more HARQ processes, the processing method of monitoring the PDCCH in UE behaviors is the same as that of the 2-HARQ capable UE.

As described the above, for the UE in a)~c), a broader example is that the PDCCH monitoring in the UE behaviors in the existing UE mechanism is applied in the above examples, and one PUSCH/PDSCH in the prior art s replaced with the first and/or last and/or any one of PUSCHs/PDSCHs scheduled in the DCI format.

(2) In a scenario of not counting the HARQ process scheduled by the DCI for scheduling multiple transport blocks when the number of HARQ processes is counted, the PDCCH monitoring in the UE behaviors in the existing mechanism is not affected by the DCI for scheduling the multiple transport blocks.

2. DCI for Scheduling Multiple HARQ Processes

According to an embodiment of the present disclosure, for the DCI for scheduling multiple transport blocks, in a scenario of scheduling multiple HARQ processes in one DCI, the multiple HARQ processes and the existing HARQ process(es) are all counted up when the number of HARQ processes is counted; or the multiple HARQ processes are counted up as one HARQ process, or the HARQ process is treated as an independent HARQ configuration, and is not counted when the number of HARQ processes is counted.

(1) In a scenario of counting the multiple HARQ processes scheduled by the DCI for scheduling multiple transport blocks when the number of HARQ processes is counted:

the maximum number of HARQ processes scheduled by the DCI does not exceed the UE capability. For example, for a single-HARQ capable UE, the DCI for scheduling multiple HARQ processes is not supported. For a 2-HARQ capable UE, the DCI for scheduling at most 2 HARQ processes is supported. For a UE capable of configuring at most n HARQ processes, the DCI for scheduling no more than n HARQ processes is supported.

For the UE capable of configuring at most n HARQ processes, when the number of HARQ processes scheduled in the DCI is m, and m<n, other HARQ processes may be scheduled for the UE, for example, other (n−m) HARQ processes may be dynamically scheduled, and the PDCCH monitoring in the UE behaviors is the same as (2) of the scenario where one HARQ process is scheduled by the DCI; otherwise, other HARQ processes cannot be scheduled for the UE, and the PDCCH monitoring in the UE behaviors is the same as (1) of the scenario where one HARQ process is scheduled by the DCI.

(2) In a scenario of counting the multiple HARQ processes as one HARQ process when the number of HARQ processes is counted:

For the UE capable of configuring at most n HARQ processes, other HARQ processes may be scheduled for the UE, and the PDCCH monitoring in the UE behaviors is the same as (2) of the scenario where one HARQ process is scheduled by the DCI; otherwise, other HARQ processes cannot be scheduled for the UE, and the PDCCH monitoring in the UE behaviors is the same as (1) of the scenario where one HARQ process is scheduled by the DCI.

(3) In a scenario of treating the HARQ process as an independent HARQ configuration when the number of HARQ processes is counted, the PDCCH monitoring in the UE behaviors in the existing mechanism is not affected by the DCI for scheduling the multiple transport blocks.

The number of repetitions of the uplink PUSCH transmission scheduled by the base station for the UE is a set of given values, while the number of repetitions required by the base station for actually decoding the PUSCH may be a value between two values in the set, which is more obvious especially when the number of repetitions is larger. Therefore, the existing mechanism supports early termination of the PUSCH transmission. The UE may monitor the downlink control channel PDCCH in the process of transmitting the PUSCH, so as to determine whether the base station indicates the UE to early terminate the PUSCH transmission after the PUSCH is decoded successfully. If the UE acquires early termination information indicated by the base station in the DCI, the UE terminates the PUSCH transmission. This mechanism may reduce UE power consumption and save uplink resources. Similarly, this mechanism may also be applied to features of scheduling the multiple transport blocks to achieve the same purpose.

In addition, for the UE supporting the early termination, it monitors the PDCCH during the PUSCH transmission. For any HARQ process for transmitting the PUSCH by the UE supporting the early termination, the PDCCH monitoring behavior of the UE reuses the existing mechanism.

SPS-Based Method

According to an embodiment of the present disclosure, the DCI includes DCI for activating and/or releasing an SPS process; and wherein the DCI further carries at least one of: a period or a scheduling interval of the SPS, a number of times resources used by the multiple transport blocks are validated.

According to an embodiment of the present disclosure, a method of scheduling multiple transport blocks in DCI is combined with the existing SPS mechanism in the LTE.

The method is enhanced based on the existing SPS mechanism in the LTE system, and uses DCI to schedule multiple SPS-based resources, including at least one of:

carrying an SPS period or SPS scheduling interval in the DCI for an uplink and/or downlink transmission, that is, the SPS period or the SPS scheduling interval being indicated by the DCI; wherein the DCI is DCI for scheduling multiple transport blocks, and the SPS period or SPS scheduling interval is a newly defined parameter, or is semiPersistSchedIntervalDL/semiPersistSchedIntervalUL in the existing SPS configuration parameters; or carrying the number of times the resources used for the multiple transport blocks are validated in the DCI for an uplink and/or downlink transmission, including: a) the number of times the resources are validated being carried in the DCI, for example, the DCI for scheduling multiple transport blocks of the downlink traffic indicating that the number of times one SPS process is validated is 4, then the UE releasing the SPS process after receiving 4 SPS-based transport blocks transmitted by the base station; and/or b) an SPS indirect release delay being carried in the DCI, for example; the DCI for scheduling multiple transport blocks of the uplink traffic indicating that the indirect release delay of one SPS process is 2, then the UE transmitting several transport blocks of the uplink traffic based on the SPS, and releasing the SPS process after 2 SPS periods since the UE stops the uplink transmission; and the base station releasing the SPS process after not detecting the uplink transmission of the UE in two consecutive SPS periods. The indirect release delay is a newly defined parameter, or implicitReleaseAfter in the existing uplink SPS configuration parameters.

When the DCI is used for scheduling multiple SPS-based resources, one or more new fields are added to the DCI for indicating the above information, or one or more fields in the unused state or one or more reserved fields in the existing DCI are used for indicating the above information. The DCI is scrambled with the RNTI in the SPS configuration, or the DCI is scrambled with other RNTIs in the existing mechanism, or the DCI is scrambled with the newly introduced RNTI.

Other DCI Scheduling Methods

Resource-Based DCI Scheduling Method

According to an embodiment of the present disclosure, a method of scheduling multiple transport blocks in DCI introduces a new DCI format that schedules the multiple transport blocks based on resource positions used by the transport blocks.

According to an embodiment of the present disclosure, the main application scenario of other methods is that the base station schedules a single UE in one DCI, and implements a mapping relationship between scheduling information and the corresponding transport block by indicating the HARQ ID; otherwise, when the base station needs to schedule multiple UEs in one DCI, at least UE IDs of the multiple UEs needs to be carried, resulting in a large overhead, Under the premise of the equal signaling overhead, the method may implements that the base station schedules one or more UEs in one DCI, and the mapping relationship between the scheduling information and the corresponding transport block is implemented by implicitly or explicitly, indicating the resource position, that is, the resource position used by the transport block being used as a condition or parameter for the UE to identify the transport block corresponding to the scheduling information in the DCI.

In the method, the new DCI format carries scheduling information of one or more transport blocks, and the scheduling information of each scheduling block explicitly or implicitly indicates resource position information of the transport block. The new DCI format is transmitted by the base station to a UE group which consists of one or more UEs. After some UE in the UE group decodes the new DCI format, it acquires resource position information of one or more transport blocks carried in the DCI; and determines whether the scheduling information of the transport block carried in the DCI is used for scheduling the next PDSCH decoding and/or PUSCH transmission of the UE, according to whether the resource position information, used for the last one or N PDSCH decodings and/or PUSCH transmissions of the UE and/or for all of one or more PDSCH decodings and/or PUSCH transmissions which are scheduled by the DCI last time, is the same as the resource position information of any one of the transport blocks carried in the DCI.

If the scheduling information of the transport block carried in the DCI is used for scheduling the next PDSCH and/or PUSCH of the UE, the HARQ ID of the next PDSCH and/or PUSCH is the same as the HARQ ID of the last PDSCH and/or PUSCH corresponding to the resource position, and the NIX information of the transport block is used for indicating that the HARQ process of the previous PDSCH and/or PUSCH corresponding to the resource position is a retransmission or an initial transmission of new data.

This method may be applied in scheduling of both uplink traffic and downlink traffic. For example, when some transport block scheduled in the DCI is for uplink traffic, the UE determines whether the scheduling information of the transport block is used for itself according to its own PUSCH transmission resource; when some transport block scheduled in the DCI is for downlink traffic, the UE determines whether the scheduling information of the transport block is used for itself according to its own PDSCH transmission resource. When multiple transport blocks are scheduled in the DCI, the multiple transport blocks may be transport blocks of uplink traffic or transport blocks of downlink traffic, and the DCI may schedule both the uplink traffic and the downlink traffic.

Method for Scheduling Multiple Transport Blocks Based on MAC CE

According to an embodiment of the present disclosure, one method is introducing at least one new MAC CE for scheduling the multiple transport blocks. The MAC CE uses a new Logical Channel ID (LCID) for carrying information related to the scheduling of the multiple transport blocks. If the feature of the DCI scheduling the multiple transport blocks is activated or enabled, the UE may use the MAC CE to carry or indicate the information related to the scheduling of the multiple transport blocks.

For example, content carried in the MAC CE can be at least one of:

a maximum number of transport blocks scheduled in the DCI; a DCI scheduling type; piggybacked HARQ-ACK feedback for downlink traffic; or a new data/retransmission indication of downlink traffic. The DCI scheduling type includes, if the system supports multiple methods for scheduling multiple transport blocks in Del, for example, an SPS-based method, a method based on dynamic scheduling which includes multiple scheduling methods in different timing sequences as shown in FIG. 2a and FIG. 2b, a resource-based DCI scheduling methods, etc., the MAC CE indicating the scheduling method used by the base station or the UE; and/or, if the system supports multiple uplink/downlink combination modes of transport blocks scheduled in the DCI, the MAC CE indicating the uplink/downlink combination mode used by the base station or the UE.

Configuration and Enabling/Disabling of Features

According to an embodiment of the present disclosure, support of the UE on the feature of scheduling multiple transport blocks in the DCI, or activation/enabling and/or disabling/release (the release corresponding to the activation may also be deactivation in this embodiment) of the feature, is configured by the base station, and/or is configured by the higher layer, and/or is determined by UE capabilities. For the UE supporting the feature, the enabling/disabling or activation/release of the features is configured by the base station, and/or is configured by the higher layer.

If the UE supports or is configured with the feature, and/or the feature of the UE is enabled/activated, then:

(1) The UE enables/activates a newly introduced signal/channel/signaling; format corresponding to the feature, the signal/channel/signaling format including at least one of:

a DCI format for scheduling multiple transport blocks, a signal and/or a channel for an ACK/NACK feedback message indicating HARQ-ACK feedback for multiple transport blocks, and a MAC CE indicating information related to the feature.

Any of the above signal/channel/signaling formats is predefined or configured by the higher layer or configured by the base station.

(2) The UE obtains configuration information of the feature that is configured by the base station and/or is configured by the higher layer and/or is predefined, the configuration information including at least one of:

a search space for detecting a DCI format for scheduling multiple transport blocks, a search space for detecting an ACK/NACK feedback message indicating HARQ-ACK feedback of multiple transport blocks, a maximum number of transport blocks scheduled in the DCI, enabling/disabling or activation/release of a method based on dynamic scheduling, enabling/disabling or activation/release of an SPS-based method, enabling/disabling or activation/release of other DCI scheduling methods, a DCI multi-transport block scheduling type, the number of HARQ processes scheduled in DCI, a maximum number of HARQ processes supported by DCI scheduling, the number of PDSCH decodings/PUSCH transmissions before transmission/reception of ACK/NACK feedback, or an amount of ACK/NACK feedback information carried in HARQ-ACK feedback.

The DCI multi-transport block scheduling type includes at least one of:

DCI scheduling multiple transport blocks of uplink traffic, DCI scheduling multiple transport blocks of downlink traffic, DCI scheduling one or more transport blocks of uplink traffic and one or more of transport blocks of downlink traffic ACK/NACK resource positions scheduled by DCI following all of transport blocks, an ACK/NACK resource position scheduled by DCI following each transport block, ACK/NACK resource positions scheduled by DCI following every N transport blocks, DCI scheduling multiple transport blocks of unicast traffic, DCI scheduling multiple transport blocks of multicast traffic, DCI scheduling one or more transport blocks of unicast traffic, and DCI scheduling one or more transport blocks of multi cast traffic.

(3) Behavior changes in search space monitoring and DCI format detection of the UE include two categories as follows.

a) The UE additionally monitors or detects one or more DCI formats or newly, introduced search space corresponding to the feature, and stops monitoring or detecting a part of the existing DCI formats or a part of the existing search space.

For example, the UE reuses the existing UE behavior for monitoring the search space, stops detecting the existing DCI format for dynamically scheduling one transport block in the search space, detects the existing other DCI formats that are not used for dynamic scheduling, and detects all DCI formats for scheduling multiple transport blocks.

For example, the UE stops monitoring the Type-1 search space, monitors the newly introduced search space, and detects the DCI format for scheduling multiple transport blocks corresponding to the feature in the newly introduced search space.

b) Alternatively, the UE reuses the current UE behaviors for monitoring the search space and detecting the DCI format, and additionally monitors the newly introduced search space, and/or detects all DCI formats for scheduling multiple transport, blocks.

For example, the UE reuses the current UE behaviors for monitoring the search space and detecting the DCI format, and additionally monitors the newly introduced search space, and detects a DCI format for scheduling multiple transport blocks corresponding to the feature in the newly introduced search space.

For example, the UE reuses the current UE behaviors for monitoring the search space and detecting the DCI format, and additionally detects a DCI format for scheduling multiple transport blocks corresponding to the feature in all the monitored search spaces or the monitored Type-1 search space.

For a) and b), the additional monitoring of the search space and/or detection of the DCI format are always performed, or enabled/activated or deactivated/released when a predefined condition is met.

For example, the UE enables/activates the additional monitoring of the search space and/or detection of the DCI format, after at least one transport block of downlink/uplink traffic is scheduled by the existing mechanism, or when the reported BSR exceeds a predefined threshold.

For example, the UE disables/releases the additional monitoring of the search space and/or detection of the DCI format, after the uplink traffic transmission is ended, or when the reported BSR is below the predefined threshold.

The configuration of the feature of scheduling multiple transport blocks in the DCI, or the enabling/activation, and/or the deactivation/release (the release corresponding to the activation may also be deactivated in this embodiment) of the feature is configured for all traffic types.

For example, if the feature of scheduling multiple transport blocks in the DO is enabled, the feature is enabled for all traffic that supports this feature. For example, the traffic supporting this feature includes all of uplink traffic and downlink traffic, including uplink/downlink unicast traffic and multicast traffic.

Alternatively, the configuration of the feature of scheduling multiple transport blocks in the DCI, or the enabling/activation, and/or the deactivation/release of the feature is independently configured for each traffic type. The configuration information of different traffic types may be different or the same.

For example, the feature of scheduling multiple transport blocks in the DCI is configured for the uplink traffic, or the feature is enabled/activated and/or disabled/released for the uplink traffic, and the feature of scheduling m multiple transport blocks in the DCI is configured for the downlink traffic, or the feature is enabled/activated and/or disabled/released for the downlink traffic. For example, the feature of scheduling multiple transport blocks in the DCI is configured for the unicast traffic, or the feature is enabled/activated and/or disabled/released for the uplink traffic, and the feature of scheduling multiple transport blocks in the DCI is configured for the multicast traffic, or the feature is enabled/activated and/or disabled/released for the downlink traffic.

DCI Design

Search Space of DCI for Scheduling Multiple Transport Blocks

According to an embodiment of the present disclosure, the UE detects the DCI transmitted by the base station for scheduling multiple transport blocks, including monitoring a UE-specific Search Space (USS) and/or a Common Search Space (CSS), detects and decodes the DCI. Here, the UE-specific search space includes at least one existing UE-specific search space in LTE, and/or a newly introduced UE-specific search space for transmitting the DCI carrying scheduling information of the multiple transport blocks; and the common search space includes at least one existing common search space in LTE, and/or a newly introduced common search space for transmitting the DCI carrying the scheduling information of the multiple transport blocks.

The DCI transmitted by the base station for scheduling multiple transport blocks is transmitted in the UE-specific search space, and/or is transmitted in the common search space.

Differentiation of DCI Formats and Differentiation Between Uplink/Downlink Transport Blocks According to an embodiment of the present disclosure, one or more DCI formats are introduced for scheduling multiple transport blocks. If multiple DCI formats are introduced, different DCI formats are used for different DCI multi-transport block scheduling types (the tDCI multi-transport block scheduling types have been described in Configuration and Enabling/Disabling of Feature Section), For example, a DCI format is used for scheduling multiple transport blocks of the uplink unicast traffic, another DCI format is used for scheduling multiple transport blocks of downlink unicast traffic, another DCI format is used for scheduling a transport block of uplink unicast traffic and a transport block of downlink unicast traffic, and another DCI format is used for scheduling multiple transport blocks of multicast traffic.

After the UE decodes the DCI transmitted by the base station, the UE determines that the DCI is used for scheduling multiple transport blocks according to at least one of: a format of the DCI, a scrambling RNTI used by the DCI, and a search space in which the DCI is detected, a size of the DCI.

The UE decoding the DCI transmitted by the base station and determining that the DCI is used for scheduling the multiple transport blocks further includes: determining that any one of the transport blocks scheduled by the DCI is a transport block of uplink traffic and/or a transport block of downlink traffic according to at least one of:

the format of the DCI, the scrambling RNTI used by the DCI, the search space in which the DCI is detected, the size of the DCI, an indication field carried in the DCI, and scheduling information carried in the DCI.

For example, after the UE decodes the DCI transmitted by the base station, the UE determines that the DCI is used for scheduling the multiple transport blocks according to the decoded scrambling RNTI used by the DCI, and determines that each transport block scheduled in the DCI is a transport block of uplink traffic or downlink traffic according to the indication field carried in the DCI. Three examples of the indication fields in the DCI are shown in Table 1, which are respectively DCI for scheduling 2 transport blocks, DCI for scheduling m transport blocks, and DCI for scheduling 8 transport blocks.

For example, after the UE decodes the DCI transmitted by the base station, the UE determines that the DCI is used for scheduling multiple transport blocks according to the search space in which the DCI is detected, and according to resource position information of a transport block implicitly or explicitly indicated in the scheduling information of some transport block carried in the DCI, determines that the resource position information is the same as the resource position where the UE is scheduled last time for PUSCH transmission, and determines that the resource position information is used for scheduling the next PUSCH transmission of the UE; or determines that the resource position information is the same as the resource position where the UE is scheduled last time for PDSCH decoding, and determines that the resource position information is used for scheduling the next PDSCH decoding of the UE.

TABLE 1

| DCI Type Field | Type of Transport Block Scheduled by DCI |
|---|---|
| (2 bits) | |
| 00 | DL + DL |
| 01 | DL + UL |
| 10 | UL + DL |
| 11 | UL + UL |
| (m bits) | |
| The i-th bit ($0 < i <= m$) = 0 | The i-th transport block is DL |
| The i-th bit ($0 < i <= m$) = 1 | The i-th transport block is UL |
| (3 bits) | |
| 000 | 8 DLs |
| 001 | The first 6 are DLs and the last 2 are ULs |
| 010 | The first 4 are DLs and the last 4 are ULs |
| 011 | The first 2 are DLs and the last 6 are ULs |
| 100 | The first 6 are ULs and the last 2 are DLs |
| 101 | The first 4 are ULs and the last 4 are DLs |
| 110 | The first 2 are ULs and the last 6 are DLs |
| 111 | 8 ULs |

DCI Content

According to an embodiment of the present disclosure, the DCI size of the DCI for scheduling multiple transport blocks is fixed, or is determined by the maximum number of transport blocks scheduled in the configured DCI. In the DCI for scheduling multiple transport blocks, the size of each field is fixed, or is determined by the maximum number of transport blocks scheduled in the configured DCI, or is determined by the number of transport blocks actually scheduled in the DCI.

The size of the DCI for scheduling multiple transport blocks is the same as the size of at least one existing DCI format, or the size of the DCI for scheduling multiple transport blocks is different froth the size of the existing DCI format. When the size of the DCI for scheduling multiple transport, blocks is the same as the size of the at least one existing DCI format, one method is that the DCI for scheduling the multiple transport blocks reuses the at least one existing DCI format, and reinterprets meanings of some fields in the existing DCI format, or deletes/does not indicate the some fields in the existing DCI format, and using the some fields for indicating fields newly added in the DCI for scheduling the multiple transport blocks and/or a transport block-specific field or a field with an increased size in the DCI for scheduling the multiple transport blocks.

The DCI format carries at least one of the following fields: an DCI format differentiation, the number of transport blocks scheduled in DCI, frequency domain resources, time domain resources, a scheduling delay, an MCS, an RV, the number of repetitions, an NDI, the number of DCI subframe repetitions, the number of HARQ processes, HARQ ID, HARQ-ACK time domain and/or frequency domain resources, power control information, SC-MCCH change notification.

A field carried in the DCI format is transport block-specific, that is, the DCI carries m such fields when the DCI is used for scheduling m transport blocks; or, is common to all the transport blocks scheduled by the DCI, that is, the DCI carries one such field.

Table 2 provides an example for explaining content of a part of fields carried in a DCI format for scheduling multiple transport blocks.

TABLE 2

| DCI Format Differentiation | Indicating a DCI format, or determining that any one of transport blocks carried in the DCI is a transport block of uplink/downlink traffic. Table 1 is an example of this field. |
|---|---|
| Number of Transport Blocks Scheduled in DCI (or Number of PDSCH/PUSCH Resources) | Indicating the number of transport blocks scheduled in the DCI (or the number of PDSCH/PUSCH resources or the number of HARQ processes). The size of this field is based on the configured maximum number of transport blocks. |
| Frequency Domain Resources/MCS/Repetitions | Reusing the indication method in the existing mechanism, and all of the transport blocks using the same frequency domain resource/MCS/repetition times. |
| Time Domain Resource/Scheduling Delay | The time domain resources are indicated by a scheduling delay field. Scheduling Delay Field 1, indicating a scheduling delay/gap/time interval between DCI and the first PDSCH/PUSCH Scheduling Delay Field 2, indicating a scheduling delay/gap/time interval between every two PDSCHs/PUSCHs Scheduling Delay Field 3, indicating a scheduling delay/gap/time interval between each PDSCH/PUSCH and corresponding HARQ-ACK feedback |
| NDI | a bitmap with a length of m, each bit indicating that transmission of data of one HARQ process (or PDSCH decoding) as an initial transmission or a retransmission according to a time domain order of HARQ processes (or a time domain order of PDSCH decodings); wherein m is the number of transport blocks scheduled in DCI, or m is the configured maximum number of transport blocks scheduled in DCI, and the HARQ process that is not actually scheduled uses padding bits. or 1 bit, indicating two states of initial transmission or retransmission for all HARQ processes (or PDSCH decodings). |
| RV | a bitmap with a length of m*k, each consecutive k bits indicating an RV of one HARQ process (or PDSCH decoding) according to a time domain order of HARQ processes (or a time domain order of PDSCH decodings), each HARQ process (or PDSCH decoding) having $2^k$ RV states; wherein m is the number of transport blocks scheduled in DCI, or m is the configured maximum number of transport blocks scheduled in DCI, and the HARQ process that is not actually scheduled uses padding bits. or |

TABLE 2-continued

| | |
|---|---|
| | a bitmap with a length k, indicating 2^k RV states for all HARQ processes (or PDSCH decodings). |
| Number of HARQ processes | When the number of HARQ processes is N, the UE transmits HARQ-ACK feedback after N PDSCH receptions, and/or receives HARQ-ACK feedback or detects DCI in PDCCH after N PUSCH transmissions, and/or the UE transmits/receives HARQ-ACK feedback or detects DCI in PDCCH after a total of N PDSCH receptions and PUSCH transmissions. |
| HARQ ID | When the number of HARQ processes is N and N > 1, this field indicates a reference HARQ ID, and an HARQ ID of each HARQ process is calculated using the reference HARQ ID according to a predefined configuration; When the number of HARQ processes is N and N = 1, this field indicates an ID of this HARQ process. |

According to an embodiment of the present disclosure, in the DCI for scheduling multiple transport blocks, the number of actually scheduled transport blocks is configurable, and the minimum value may be 1. When the size of the DCI has been determined, padding is used in a transport block-specific field corresponding to the transport block that is not actually scheduled.

For example, when the maximum number of the transport blocks scheduled in the DCI which is configured by the higher layer is 2, 2 IDI fields and 2 RV fields are carried in fields of the DCI. When the number of scheduled transport blocks indicated by the DCI is 1, that is, scheduling information of only one transport block is carried, the scheduling information of this transport block is indicated in the first NDI field and the first RV field, and padding is used in the second NDI field and the second RV field.

Hereinafter, several specific examples are illustrated for a method of scheduling multiple transport blocks in DCI and an overall flow of the scheduling method.

The first example describes a method of scheduling multiple transport blocks of downlink traffic.

The UE supports the feature of scheduling multiple transport blocks in DCI, but is configured by the base station to disable/release (or deactivate) this feature. The UE does not use this feature, and reuses the existing UE mechanism for monitoring the PDCCH and the search space, monitoring the PDSCH, and detecting the DCI.

The UE is a single-HARQ capable UE, supporting the feature of scheduling multiple transport blocks in the DCI, and is configured by the base station to enable/activate this feature. The UE behaviors includes:

(1) Enabling/activating newly introduced signals/channels/signaling formats corresponding to the feature, including:
a DCI format for scheduling multiple transport blocks, including a DCI format X0 for scheduling multiple transport blocks of downlink traffic;
a signal and/or a channel for an ACK/NACK feedback message indicating HARQ-ACK feedback for multiple transport blocks;
a MAC CE for indicating information related to the feature.
The above signals/channels/signaling formats are predefined.

(2) The UE obtaining configuration information of the feature that is configured by the base station and/or is configured by the higher layer and/or is predefined, including:
a search space for detecting a DCI format for scheduling m multiple transport blocks;
a maximum number of transport blocks scheduled in DCI;
enabling of a method based on dynamic scheduling;
a maximum number of HARQ processes supported by DCI scheduling.

(3) The UE monitoring a USS and detecting DCI transmitted by the base station, including:
the UE stopping monitoring a Type-1 search space, additionally monitoring a newly introduced search space, and detecting a DO format for scheduling multiple transport blocks corresponding to the feature in the newly introduced search space. Here, the size of the DCI format is determined by the maximum number of transport blocks scheduled in the DCI.

(4) The UE detecting the DCI format X0, determining that the DCI is used for scheduling multiple transport blocks according to the DCI format and the RNTI used by the DCI, and determining that each of the transport blocks scheduled in the DCI is a transport block of downlink traffic, according to the indication field carried in the DCI.

(5) The UE decoding the PDSCH transmitted by the base station according to the scheduling information carried in the DCI, and transmitting PDSCH decoded ACK/NACK feedback to the base station, including:
the UE determining that m PDSCH receptions (or PDSCH decodings) are scheduled in the DCI according to the number of transport blocks indicated by the number of subframes field in the DCI being tn.

The UE decoding the PDSCH transmitted by the base station according to the scheduling information carried in the DCI and transmitting the PDSCH decoded ACK/NACK feedback to the base station further includes:
the UE determining that corresponding HARQ-ACK feedback is transmitted after each PDSCH reception, according to the number of HARQ processes indicated by the DCI being 1, the HARQ-ACK feedback carrying 1-bit ACK/NACK information; the HARQ ID indicated by the DCI is an ID of an HARQ process for each PDSCH reception.

Figure 5:
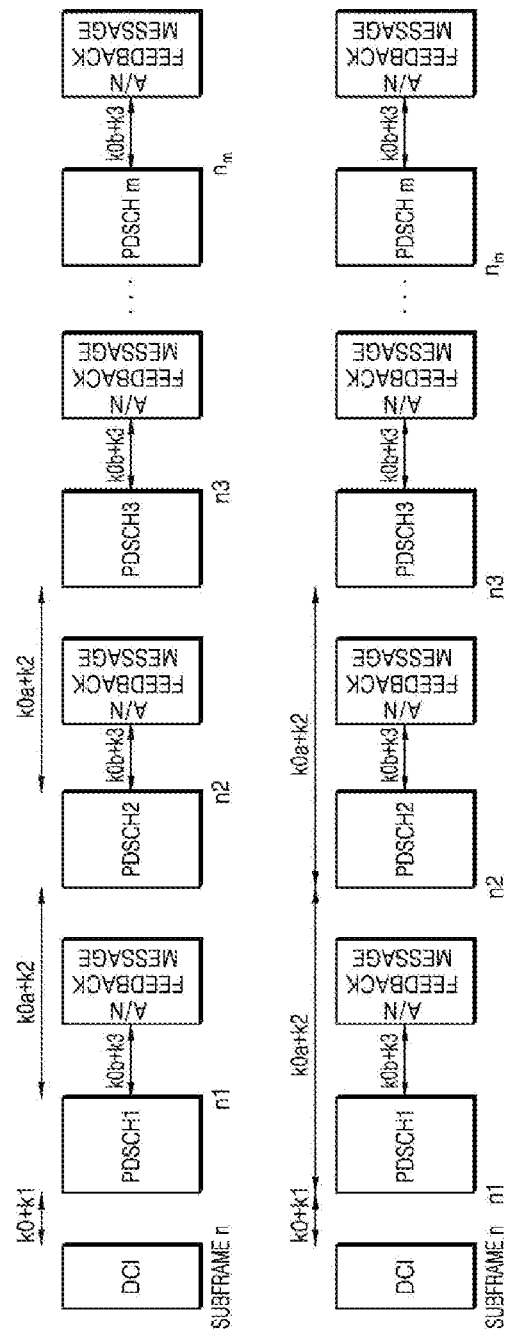
FIG. 5 schematically illustrates a diagram of scheduling multiple transport blocks of downlink traffic using DCI according to an embodiment of the present disclosure.

The UE decoding the PDSCH transmitted by the base station according to the scheduling information carried in the DCI and transmitting the PDSCH decoded ACK/NACK feedback to the base station further includes:
the UE determining a time domain position for performing PDSCH decoding and a time domain position for transmitting ACK/NACK feedback according to the scheduling delay field carried in the DCI. FIG. 2 is an example in which the UE detects the DCI format X0 of the PDCCH ending at Subframe n, and the time domain positions of the UE decoding the PDSCH and transmitting the ACK/NACK feedback are:
a start subframe for decoding the PDSCH for the first time being Subframe (n+k0+k1), a start subframe for decoding the PDSCH for the second time being Subframe (n1+k0a+k2), and a start subframe for decoding the PDSCH for the third time being Subframe (n2+k0a+k2), and so on, and a start subframe for decoding the PDSCH for the m-th time being Subframe (nm−1+k0a+k2);
a start subframe of the ACK/NACK transmission for decoding the PDSCH for the first time being Subframe (n1'+k0b+k3), and a start subframe of the ACK/NACK transmission for decoding the PDSCH for the second time being Subframe (n2'+k0b+k3), and so on, and a start subframe of the ACK/NACK transmission for decoding the PDSCH for the m-th time being Subframe (nm−1'+k0b+k3);

wherein K0, k0a and k0b are predefined values and may be 0 or an integer greater than 0;

any of k1, k2 and k3 is explicitly indicated in the DCI, or is predefined. For example, three scheduling delay fields carried in the DCI respectively indicate k1, k2 and k3; or, two scheduling delay fields carried in the DCI respectively indicate values k and k', where k1=k2=k, k3=k'; or, one scheduling delay field carried in the DCI indicates a value k, where k1=k2=k, and k3 is a predefined value;

as shown in FIG. 5, n1 is an end subframe or a start subframe of the first decoding, n2 is an end subframe or a start subframe of the second decoding, and so on, and nm−1 is an end subframe or a start subframe of the (m−1)-th decoding; or, n1 is an end subframe or a start subframe of the first ACK/NACK feedback message, and n2 is an end subframe or a start subframe of the second ACK/NACK feedback message, and so on, and nm−1 is an end subframe or a start subframe of the (m−1)-th ACK/NACK feedback message;

as shown in FIG. 5, n1' is an end subframe or a start subframe of the first decoding, n2' is an end subframe or a start subframe of the second decoding, and so on, and nm−1' is an end subframe or a start subframe of the (m−1)-th decoding.

For a TDD (Time Division Duplex or HD (Half Duplex)-FDD (frequency Division Duplex) UE, the scheduling delay between two adjacent PDSCHs needs to satisfy that a time interval/gap between the two adjacent PDSCHs can meet a time period required for transmission of the ACK/NACK feedback message. For example, for the upper example in FIG. 5, k0+k2 should be no shorter than (k0b+k3+ACK/NACK Feedback Message Transmission Duration+Re-tune Time).

Figure 6:
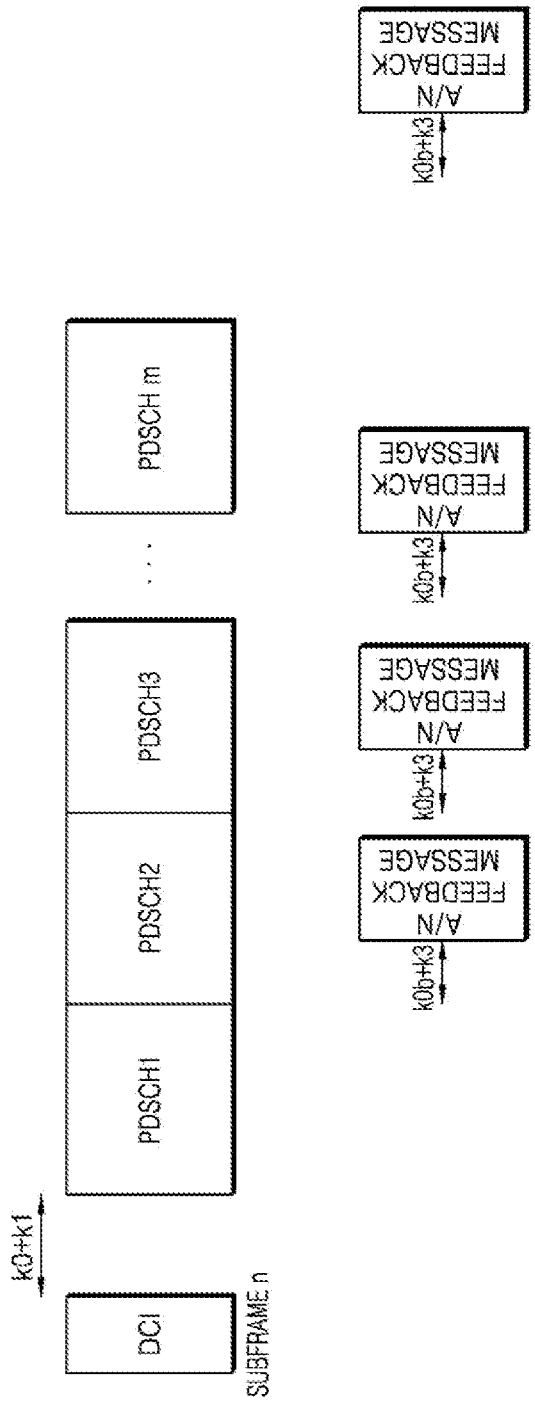
FIG. 6 schematically illustrates a diagram of scheduling multiple transport blocks of downlink traffic using DCI according to an embodiment of the present disclosure.

For an FD (Full Duplex)-FDD UE, there is no such a requirement for the scheduling delay between adjacent PDSCHs as in the TDD/HD-FDD scenario, and a minimum of the scheduling delay between adjacent PDSCHs may be 0. That is, for the FD-FDD UE, adjacent PDSCHs may use resources that are contiguous in the time domain, as shown in FIG. 6, where k0=k2=0, and the FD-FDD UE needs to perform PDSCH reception and ACK/NACK feedback message transmission on some subframes at the same time, but use different frequency domain resources.

According to an embodiment of the present disclosure, the UE decoding the PDSCH transmitted by the base station according to the scheduling information carried in the DCI and transmitting the PDSCH decoded ACK/NACK feedback to the base station further includes:

the UE determining that the transmission of the PDSCH received by the HARQ process is a retransmission or an initial transmission of new data, wherein the UE treats the transmission of PDSCH of the first decoding as an initial transmission by default, or determines that the transmission of PDSCH of the first decoding is an initial transmission according to the 1-bit NDI field carried in the DCI; determines, for any subsequent PDSCH, that the transmission of the PDSCH is an initial transmission or a retransmission according to content of HARQ-ACK feedback corresponding to the previous PDSCH, and/or information implicitly or explicitly carded in the transport block of the PDSCH.

According to an embodiment of the present disclosure, the information implicitly or explicitly carried in the transport block of the PDSCH includes: a higher-layer header added before the transport block, including a MAC header/ RLC header/PDCP header; or, a newly introduced MAC CE carded in a MAC PDU of the transport block, or a 1-bit initial transmission/retransmission indication added before the transport block, or a predefined scrambling sequence.

For example, when HARQ-ACK feedback of PDSCH1 is ACK, the transmission of PDSCH2 is an initial transmission, and when HARQ-ACK feedback of PDSCH2 is NACK, and the MAC PDU of PDSCH3 carries an MAC CE indicating a retransmission, the transmission of PDSCH3 is a retransmission of PDSCH2.

According to an embodiment of the present disclosure, the UE decoding the PDSCH transmitted by the base station according to the scheduling information carried in the DCI and transmitting the PDSCH decoded ACK/NACK feedback to the base station further includes:

for multiple PDSCH decodings indicated by one DCI carrying multiple transport blocks, parameters used by the UE for each decoding being the same or different. For example, a value of the number of repetitions is indicated in the DCI, and all the PDSCHs scheduled by the DCI use the same number of repetitions. For example, when the DCI is used for scheduling two transport blocks, two MCS values are carried to sequentially indicate MCSs of the two transport blocks.

Similarly, for ACK/NACK feedback for multiple PDSCH decodings indicated by one DCI carrying multiple transport blocks, parameters used by the UE for each time transmitting the ACK/NACK feedback to the base station may be the same or different. For example, the UE reuses the existing mechanism by which the same number of repetitions per ACK/NACK transmission is used; uses a different subcarrier position for each ACK/NACK transmission according to multiple ACK/NACK subcarrier positions indicated in the DCI; or calculates subcarrier positions of the corresponding ACK/NACK transmission according to the frequency domain position of each PDSCH, according to one or more ACK/NACK subcarrier positions indicated in the DCI.

(6) When the UE decodes the PDSCH scheduled by the DCI and transmits the ACK/NACK feedback of the PDSCH decoding to the base station, the UE determines the PDCCH monitoring behavior according to the performance of the UE.

For example, the UE is a single-HARQ capable UE, the last PDSCH scheduled in the DCI ends at Subframe (n+m), and the UE does not need to monitor the PDCCH or PDCCH candidates in any subframe between Subframe (n+1) and Subframe (n+m−1).

For example, the UE is a 2-HARQ capable LTE, PDSCH1, PDSCH2, . . . , PDSCHm scheduled in the DCI start and end at Subframes n1 and n1', n2 and n2', . . . , nm and nm' respectively, and the UE does not need to monitor the PDCCH or PDCCH candidates in any subframe for transmitting ACK/NACK between Subframe (n1−2) and Subframe (n1'−1), between. Subframe (n2−2) and Subframe (n2'−1), . . . between Subframe (nm−2) and Subframe (nm'−1), and between Subframe (n+1) and Subframe (n+m−1).

For example, the UE is a 2-HARQ capable FD-FDD UE, the PDSCH scheduled in the DCI is not counted in the HARQ process, and the UE reuses the existing mechanism for the PDCCH monitoring, and is not subject to additional limitations.

Additionally, a simplified scenario illustrating the first example will be described. In this scenario, the UE supports the feature of scheduling multiple transport blocks in DCI, and is configured by the base station to enable/activate this feature. The UE behaviors includes:

(1) Enabling/activating newly introduced signals/channels/signaling formats corresponding to the feature, including:

a DCI format for scheduling multiple transport blocks, including a DCI format X0 for scheduling multiple transport blocks of downlink traffic;

(2) The UE obtaining configuration information of the feature that is configured by the base station and/or is configured by the higher layer and/or is predefined, including:

a maximum number of transport blocks scheduled in DCI;

(3) The UE monitoring a USS and detects DCI transmitted by the base station, including:

the UE monitoring the USS in the existing mechanism, and detecting the DCI transmitted by the base station.

(4) The UE detecting the DCI format X0, determining that the DO is used for scheduling multiple transport blocks according to the DCI format and the RNTI used by the DCI, and determining that the DCI is used for scheduling the multiple transport blocks of downlink traffic.

(5) The UE decoding the PDSCH transmitted by the base station according to the scheduling information carried in the DCI, and transmitting PDSCH decoded ACK/NACK feedback to the base station, including:

the UE determining that m PDSCH receptions (or PDSCH decodings) are scheduled in the DCI according to the number of transport blocks indicated by the number of subframes field in the DCI being iii.

According to an embodiment of the present disclosure, the UE decoding the PDSCH transmitted by the base station according to the scheduling information carried in the DCI and transmitting the PDSCH decoded ACK/NACK feedback to the base station further includes:

the VIE determining that corresponding HARQ-ACK feedback is transmitted after each PDSCH reception, according to the number of HARQ processes indicated by the DCI being 1, the HARQ-ACK feedback carrying 1-bit ACK/NACK information; the HARQ ID indicated by the DCI is an ID of an HARQ process for each PDSCH reception.

Alternatively, for the transmission indicated by the DCI format X0, a predefined HARQ ID is used, and a predefined number of HARQ processes is used. Assuming that the predefined value is 1, the UE transmits corresponding HARQ-ACK feedback after each PDSCH reception, the HARQ-ACK feedback carrying 1-bit ACK/NACK information.

According to an embodiment of the present disclosure, the UE decoding the PDSCH transmitted by the base station according to the scheduling information carried in the DO and transmitting the PDSCH decoded ACK/NACK feedback to the base station further includes:

the UE determining a time domain position for performing PDSCH decoding and a time domain position for transmitting ACK/NACK feedback according to the scheduling delay field and/or the period field and/or the predefined parameter carried in the DCI, For example, a time interval between an end subframe of the DCI and a start subframe for decoding the PDSCH for the first time is indicated by a scheduling delay field, or is predefined; a time interval between a time of decoding the PDSCH for the n-th time and a time of decoding the PDSCH for the n+1)-th time is indicated or predefined, the time interval being the number of subframes between a start or end subframe for decoding the PDSCH for the n-th time and a start or end subframe for decoding the PDSCH for the (n+1)-th time.

According to an embodiment of the present disclosure, the UE decoding the PDSCH transmitted by the base station according to the scheduling information carried in the DCI and transmitting the PDSCH decoded ACK/NACK feedback to the base station further includes:

the UE determining that the transmission of the PDSCH received by the HARQ process is a retransmission or an initial transmission of new data, according to the NDI field carried in the DCI, and/or content of the HARQ-ACK feedback, and/or information implicitly or explicitly carried in the transport block of the PDSCH, and/or by reusing the method in the existing SPS mechanism.

The second example describes a method of scheduling multiple transport blocks of downlink traffic. The example is similar to the first example, but the UE is a 2-HARQ capable UE, and the number of HARQ processes indicated in the DCI for scheduling multiple transport blocks for the UE is 2. In this example, only difference from the first example will be described.

According to an embodiment of the present disclosure, the UE determines that corresponding HARQ-ACK feedback is transmitted after every two PDSCH receptions, according to the number of HARQ processes indicated in the DCI, wherein the HARQ-ACK feedback carries a bitmap with a length of 2, and each bit indicates ACK/NACK information of one PDSCH in chronological order; the HARQ ID indicated by the is the ID of the first HARQ process, and the ID of the second HARQ process is the ID of the first HARQ process+1 according to a predefined configuration.

Figure 7:
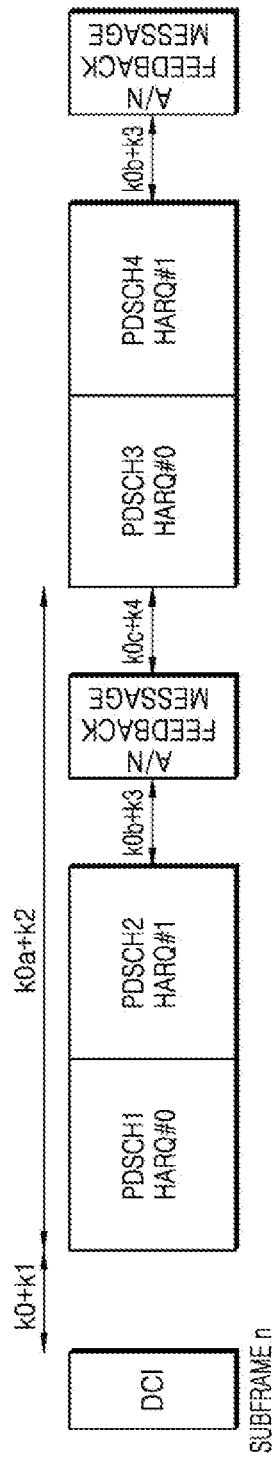
FIG. 7 schematically illustrates a diagram of scheduling multiple transport blocks of downlink traffic using DCI according to an embodiment of the present disclosure.

According to an embodiment of the present disclosure, the UE determines a time domain position for performing PDSCH decoding and a time domain position for transmitting ACK/NACK feedback according to the scheduling delay field carried in the DCI. FIG. 7 is an example in which the scheduling delay field in the DCI indicates an interval between the DCI and the first PDSCH (k0+k1, where k0 is a predefined value), and/or, an interval between a PDSCH and a corresponding HARQ-ACK feedback messages (k0b+k3, where k0b is a predefined value), and/or an interval between two PDSCHs of the same HARQ ID (k0a+k2, where k0a is a predefined value) or an interval between an HARQ-ACK feedback message and a subsequent PDSCH (k0c+k4, where k0c is a predefined value). Here, any of the above intervals is calculated from the start subframe and/or end subframe of two adjacent transmissions. For example, the end subframe of the previous transmission + the start subframe of the subsequent transmission, or the start subframe of the previous transmission + the start subframe of the subsequent transmission.

Similar to the first example, for a TDD or HD-FDD UE, the scheduling delay between two adjacent PDSCHs needs to satisfy that a time interval/gap between the two adjacent PDSCHs can meet a time period required for transmission of the ACK/NACK feedback message; and for an FD-FDD UE, the minimum of the scheduling delay may be 0.

Similar to the first example, the UE treats the transmission of the previous two PDSCH decodings, i.e., the transmission of the first decoding of each HARQ process as an initial transmission of new data by default, or determines that the transmission of the previous two PDSCH decodings is an initial transmission according to the 2-bit NDI field carried in the DCI; for any subsequent PDSCH, determines that the transmission of the PDSCH is an initial transmission or a retransmission according to content of HARQ-ACK feedback corresponding to the previous PDSCH of the HARQ process of the PDSCH, and/or information implicitly or explicitly carried in the transport block of the PDSCH.

For example, when HARQ-ACK feedback of PDSCH1 is ACK, the transmission of PDSCH3 is an initial transmission, and when HARQ-ACK feedback of PDSCH2 is NACK, and the MAC PDU of PDSCH4 carries an MAC CE indicating a retransmission, the transmission of PDSCH4 is a retransmission of PDSCH2.

Similar to the first example, when the UE decodes the PDSCH scheduled by the DCI and transmits the ACK/NACK feedback of the PDSCH decoding to the base station, the UE determines the PDCCH monitoring behavior according to the performance of the UE.

For example, the UE is a 2-HARQ capable UE, the last scheduled in the DCI ends at Subframe (n+m), and the UE does not need to monitor the PDCCH or PDCCH candidates in any subframe between Subframe (n+1) and Subframe (n+m−1).

The third example describes a method of scheduling multiple transport blocks of uplink traffic or scheduling multiple transport blocks of downlink traffic. This example is similar to the first example, but the UE may support at most m HARQ processes. In the DCI for scheduling multiple transport blocks for the UE, the number of scheduled transport blocks is m, the number of indicated HARQ processes is m, or the number of HARQ processes is not indicated, and the maximum number of HARQ processes that can be supported by the UE is used by default. In this example, only difference from the first example will be described.

According to an embodiment of the present disclosure, the UE determines that corresponding HARQ-ACK feedback is transmitted after all of m PDSCH receptions, according to the number of HARQ processes indicated in the DCI, wherein the HARQ-ACK feedback carries a bitmap with a length of m, and each bit indicates ACK/NACK information of one PDSCH in chronological order; the DCI indicates that a reference ID is the ID of the first HARQ process, and the II) of the n-th HARQ process is the reference HARQ ID+n−1 according to a predefined configuration.

Figure 8:
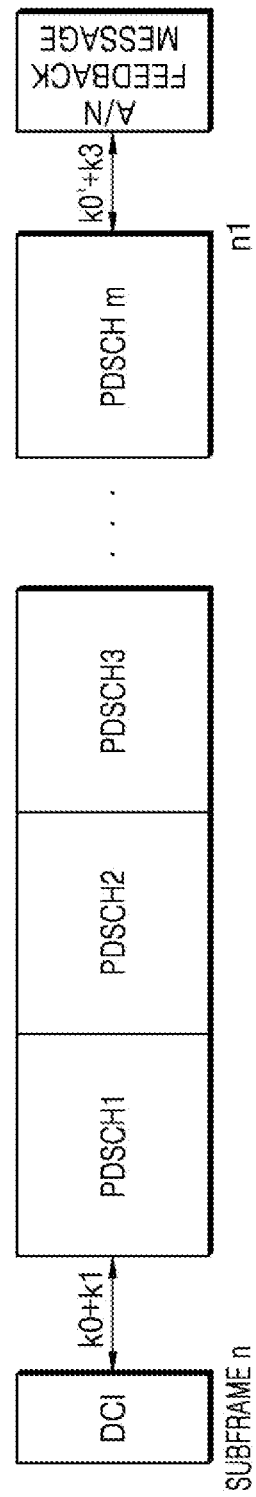
FIG. 8 schematically illustrates a diagram of scheduling multiple transport blocks of downlink traffic using DCI according to an embodiment of the present disclosure.

According to an embodiment of the present disclosure, the UE determines a time domain position for performing PDSCH decoding and a time domain position for transmitting ACK/NACK feedback according to the scheduling delay field carried in the DCI. FIG. 8 is an example in which the scheduling delay field in the DCI indicates an interval between the DCI and the first PDSCH (k0+k1, where k0 is a predefined value), and/or an interval between the last PDSCH and an HARQ-ACK feedback message (k0'+k3, k0b is a predefined value). Additionally, the scheduling delay field also indicates an interval between two adjacent PDSCHs, or that the interval takes a predefined value. For example, in FIG. 8, the interval is 0, and the resources used by the several PDSCHs scheduled the DCI are consecutive in the time domain; or, when the interval is not 0, the resources used by the several PDSCHs scheduled by the DCI are inconsecutive in the time domain.

According to an embodiment of the present disclosure, the UE determines that the transmission of each transport block or downlink HARQ process is an initial transmission or a retransmission, according to the NDI field carried in the DCI, Here, the NDI field carried in the DCI is specific to the transport block/HARQ process, that is, the DCI carries in NDI fields, and each NDI field sequentially corresponds to one transport block/HARQ process; or the NDI field in the DCI is common to all the transport blocks or HARQ processes, that is, all the transport blocks or HARQ processes use the same NDI parameters.

According to an embodiment of the present disclosure, alter decoding data of all the multiple transport blocks indicated by the DCI, the UE transmits to the base station an ACK/NACK feedback message which carries feedback for all the multiple transport blocks, or transmits to the base station multiple ACK/NACK feedback messages, each of which carries feedback for one or more transport blocks. For example, in FIG. 8, the UE transmits to the base station one ACK/NACK feedback message, which carries a bitmap with a length of m, and indicates ACK/NACK feedback of all m PDSCH decodings in chronological order.

Figure 9:
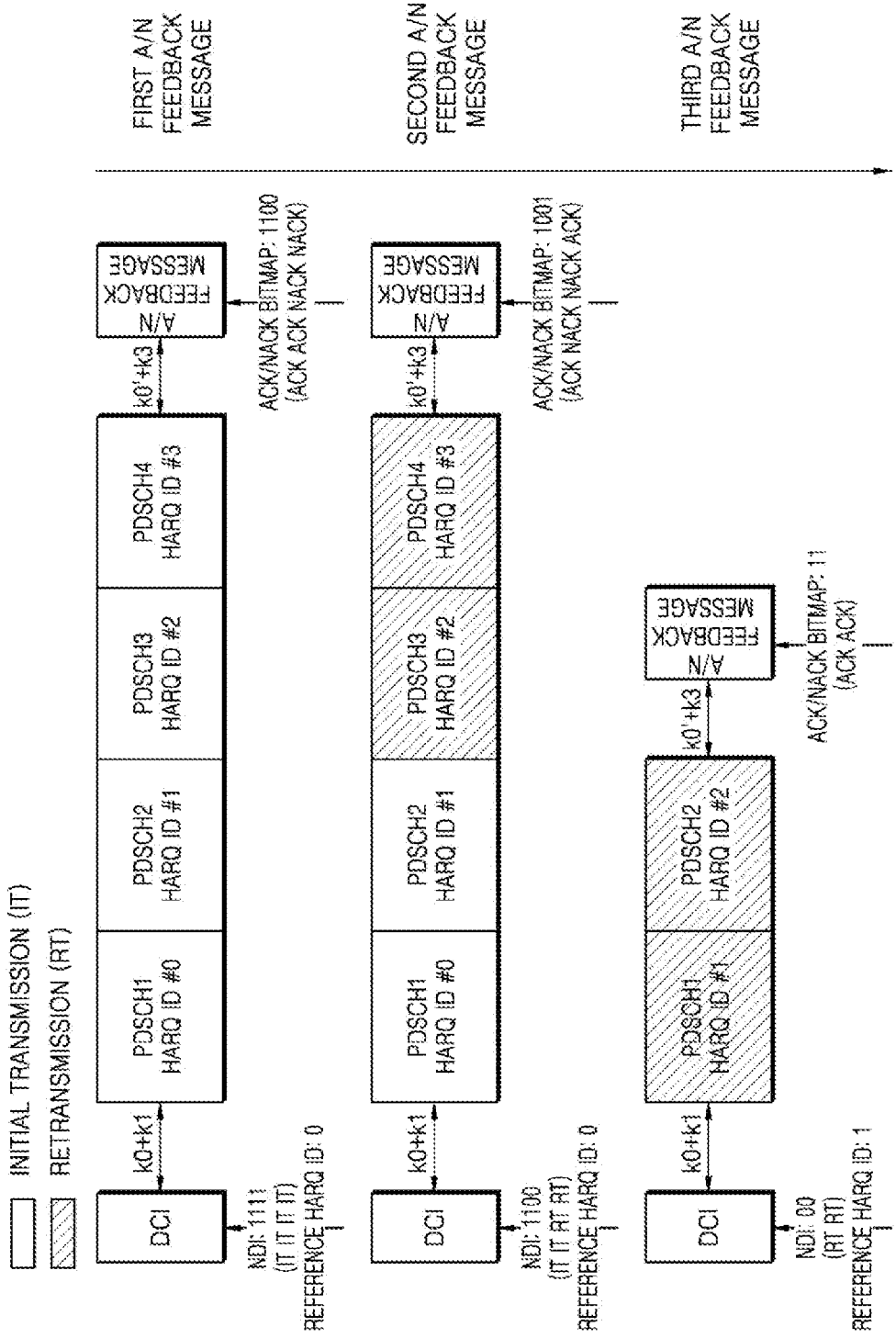
FIG. 9 schematically illustrates a diagram of scheduling multiple transport blocks of downlink traffic using three pieces of DCI according to an embodiment of the present disclosure.

A more specific example will be described below. As shown in FIG. 9, a method of determining an initial transmission/retransmission in an HARQ process in this example is illustrated in a process of scheduling downlink traffic in all of three pieces of DCI, wherein it is assumed that the UE can support at most 4 HARQ processes in parallel.

According to an embodiment of the present disclosure, in DCI detected by the UE for the first time, the number of scheduled transport blocks is 4, the indicated NDI is 1111 (in this example, it is assumed that 1 means an initial transmission of new data, and 0 means a retransmission), transmissions of the 4 transport blocks are all initial transmissions, and the HARQ ID of each transport block is indicated; the UE determines that all of HARQ #0~#3 are initial transmissions; after receiving the 4 PDSCHs, the UE transmits an HARQ-ACK feedback message 1100 to the base station according to the reception state (in this example, it is assumed that 1 means ACK, and 0 means NACK), indicating that the first two PDSCHs are ACKs, and the last two PDSCHs are NACKs; and the UE starts to monitor the PDCCH.

According to an embodiment of the present disclosure, in DCI detected by the UE for the second time, the number of scheduled transport blocks is 4, the indicated NDI is 1100, transmissions of the first 2 transport blocks are initial transmissions, transmissions of the last 2 transport blocks are retransmissions, and the HARQ ID of each transport block is indicated; the UE determines that HARQ #0 and HARQ #1 are initial transmissions, and HARQ #2 and HARQ #3 are retransmissions; after receiving the 4 PDSCHs, the UE transmits an HARQ-ACK feedback message 1001 to the base station according to the reception state, indicating that the first and fourth PDSCHs are ACKs, and the second and third PDSCHs are NACKs; and the UE starts to monitor the PDCCH.

According to an embodiment of the present disclosure, in DCI detected by the UE for the third time, the number of scheduled transport blocks is 2, the indicated NDI is 00, transmissions of both the 2 transport blocks are retransmissions, and the HARQ ID of each transport block is indicated; the UE determines that both HARQ #1 and HARQ #2 are retransmissions; after receiving the 2 PDSCHs, the UE transmits an HARQ-ACK feedback message 11 to the base station according to the reception state, indicating that both the two PDSCHs are ACKs; and the UE starts to monitor the PDCCH.

So far, all retransmissions of the downlink traffic have been completed, and all data transmission of the downlink traffic is completed.

In this example, fallback of the feature of scheduling multiple transport blocks by the DCI is also supported. Taking the scenario shown in FIG. 9 as an example, if the HARQ-ACK feedback message transmitted to the base station by the UE for the second time is 1010, indicating that the first and third PDSCHs are ACKs, and the second and fourth PDSCHs are NACKs, then the base station transmits two pieces of DCI to the UE, indicating retransmissions of HARQ #1 and HARQ #3 respectively. The two pieces of DCI are fallen back from scheduling multiple transport blocks to scheduling one transport block.

These two pieces of DCI use the DCI format for scheduling multiple transport blocks, or use the existing DCI format. Here, when the UE maintains the monitoring of the existing search space and/or the detection of the existing DCI format, the two pieces of DCI may use the existing DCII format; for example, the UE needs to monitor the existing search space and detect therein the existing DCI format, and monitors the newly introduced search space and detecting therein a DCI format for scheduling multiple transport blocks, or the UE needs to monitor the newly introduced search space and detect therein the existing DCI format for scheduling multiple transport blocks.

Similarly, the mechanism of falling back from the DCI for scheduling multiple transport blocks to scheduling the DCI for scheduling one transport block is also applicable to uplink traffic.

According to an embodiment of the present disclosure, the fallback behavior is scheduled by the base station, that is, the UE maintains the monitoring of the existing search space and/or the detection of the existing DCI format, and/or monitors the newly introduced search space and/or detects the DCI format for scheduling multiple transport blocks; or the fallback behavior is configured by the base station or configured by the higher layer, that is, the base station/higher-layer configures the UE to stop monitoring the newly introduced search space and/or detecting the DCI format for scheduling the multiple transport blocks; or the fallback behavior is conditional. For example, when the BSR reported by the UE is lower than a predefined threshold, the UE falls back to using the DCI for scheduling one transport block. For example, when the uplink data transmission of the UE is completed (may or may not have data needed to be retransmitted, but have no new data needed to be initially transmitted), the UE falls back to using the DCI for scheduling one transport block.

The fourth example describes a method of scheduling multiple transport blocks of uplink traffic.

According to an embodiment of the present disclosure, the UE supports the feature of scheduling multiple transport blocks in DCI, and is configured by the base station to enable/activate this feature. The UE behaviors includes:

(1) The UE enabling/activating newly introduced signals/channels/signaling formats corresponding to the feature; further including:

a DCI format for scheduling multiple transport blocks, including a DCI format X1 for scheduling multiple transport blocks of uplink traffic;

a MAC CE for indicating information related to the feature.

The above signals/channels/signaling formats are predefined.

(2) The UE obtaining configuration information of the feature that is configured by the base station and/or is configured by the higher layer and/or is predefined, including:

a search space for detecting a DCI format for scheduling multiple transport blocks;

a maximum number of transport blocks scheduled in DCI;

enabling of a method based on dynamic scheduling;

a maximum number of HARQ processes supported by DCI scheduling.

(3) The UE monitoring a USS and detects DCI transmitted by the base station, including:

for example, the UE stopping monitoring a Type-1 search space, additionally monitoring a newly introduced search space, and detecting a DCI format for scheduling multiple transport blocks corresponding to the feature in the newly introduced search space. Here, the size of the DCI format is determined by the maximum number of transport blocks scheduled in the DCI.

(4) The UE decoding the DCI format X1, determining that the DCI is used for scheduling multiple transport blocks according to the DCI format and the RNTI used by the DCI, and determining that the DCI is used for scheduling the multiple transport blocks of uplink traffic.

(5) The UE transmitting the PUSCH according to the scheduling information carried in the DCI, including:

the UE determining that m PUSCH transmissions are scheduled in the DCI according to the number of transport blocks indicated by the number of subframes field in the DCI being m.

The UE transmitting the PUSCH according to the scheduling information carried in the DCI further includes:

after all m PUSCH transmissions, the UE monitoring the PDCCH and detecting the DCI for scheduling one or more transport blocks.

Figure 10:
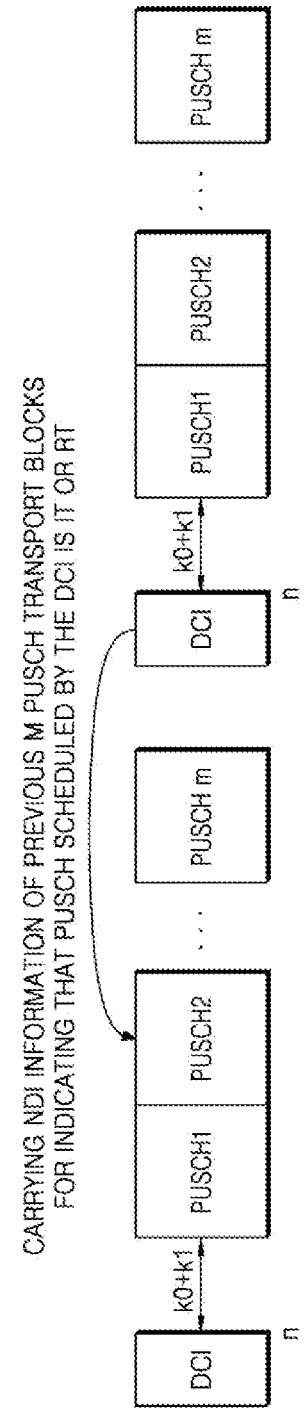
FIG. 10 schematically illustrates a diagram of scheduling multiple transport blocks of uplink traffic using DCI according to an embodiment of the present disclosure.

The UE transmitting the PUSCH according to the scheduling information carried in the DCI further includes:

the UE determining a time domain position for performing PUSCH transmission according to the scheduling delay field carried in the DCI. FIG. 10 is an example, in which the UE detects the DCI format X1 transmitted in PDCCH ending at Subframe n, and the time domain positions of the UE transmitting the PUSCH are:

a start subframe of transmitting the PUSCH for the first time being Subframe (n+k0+k1), and resource positions of the two adjacent PUSCH transmissions being adjacent in the time domain, or there being a gap of a length L in the time domain between the resource positions of the two adjacent PUSCH transmissions, or a resource position of each PUSCH transmission being periodic in the time domain with a period of T.

After m PUSCH transmissions are completed, the UE starts to monitor the search space and detects the DCI in the next USS (UE specific Search Space).

Here, K0 is a predefined value, and may be 0 or an integer greater than 0;

each of the gap length L, the PUSCH resource period of T, and the scheduling delay k1 can be explicitly indicated in the DCI, or can be predefined. For example, the predefined value of L is 0, that is, the resource positions of the two adjacent PUSCH transmissions are adjacent in the time domain; for example, the DCI carries a scheduling delay field indication Id.

The UE transmitting the PUSCH according to the scheduling information carried in the DCI further includes:

the UE determines that transmission of each transport block or each PUSCH or a HARQ process corresponding to each PUSCH is a retransmission or an initial transmission of new data, according to the NDI (New Data. Indicator) field carried in the DCI.

Here, the NDI field carried in the DCI is specific to the transport block HARQ process, that is, the DCI carries multiple NDI fields, and each NDI field sequentially corresponds to one transport block/HARQ process; or the NDI field in the DCI is common to all the transport blocks or HARQ processes, that is, the NDI field indicating that transmission of all the transport blocks or HARQ processes are initial transmissions or retransmissions.

Figure 11:
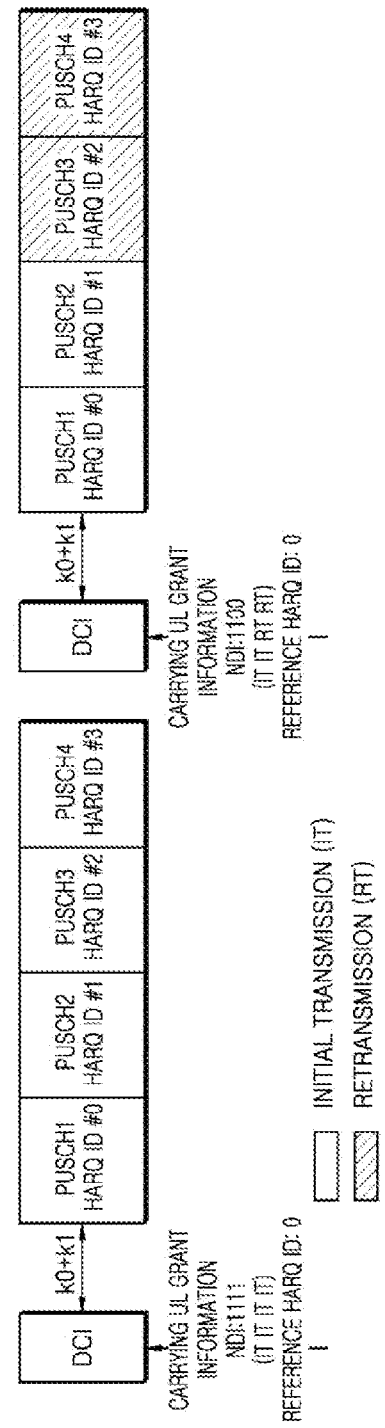
FIG. 11 schematically illustrates a diagram of scheduling multiple transport blocks of uplink traffic using DCI according to an embodiment of the present disclosure.

A more specific example will be described below. As shown in FIG. 11, a method of determining an initial transmission/retransmission in an HARQ process in this example is illustrated in a process of scheduling uplink traffic in both two pieces of DCI, wherein it is assumed that the UE can support at most 4 HARQ processes in parallel.

According to an embodiment of the present disclosure, in DCI detected by the UE for the first time, the number of scheduled transport blocks is 4, the indicated NDI is 1111 (in this example, it is assumed that 1 means an initial transmission of new data, and 0 means a retransmission), transmissions of the 4 transport blocks are all initial transmissions, and the HARQ ID of each transport block is indicated; the UE determines that all of HARQ #0~#3 are initial transmissions; after transmitting the 4 PUSCHs, the UE starts to monitor the PDCCH.

According to an embodiment of the present disclosure, in DCI detected by the UE for the second time, the number of scheduled transport blocks is 4, the indicated NDI is 1100, transmissions of the first 2 transport blocks are initial transmissions, transmissions of the last 2 transport blocks are retransmissions, and the HARQ ID of each transport block is indicated; the UE determines that HARQ #0 and HARQ #1 are initial transmissions, and HARQ #2 and HARQ #3 are retransmissions; after transmitting the 4 PUSCHs, the UE starts to monitor the PDCCH.

(6) When the UE transmits the PUSCH scheduled by the DCI, the UE determines the PDCCH monitoring behavior according to the performance of the UE.

For example, the UE is a single-HARQ capable UE, the last PUSCH scheduled in the DCI ends at Subframe (n+m), and the UE does not need to monitor the PDCCH or PDCCH candidates in any subframe between Subframe (n+1) and Subframe (n+m−1).

In the existing MTC and NB-IoT, the base station does not transmit the HARQ-ACK feedback for uplink traffic, but transmits DCI carrying uplink grant information, and the obtains an indication of initial transmission/retransmission from the NDI field carried by the DCI. In this mechanism, the NDI field implicitly indicates ACK/NACK feedback. The above description in this example is based on the scenario where the HARQ-ACK feedback for the uplink traffic is not used.

Additionally, another scenario of using HARQ-ACK feedback messages for the uplink traffic transmission will be described below. In this scenario, a new signal/channel is introduced to indicate HARQ-ACK information of one or more transport blocks of the uplink traffic. This signal is feedback DCI transmitted on the PDCCH, or a dedicated signal/channel. After completing the PUSCH transmission, or during the PUSCH transmission, the UE detects/listens the signal or channel dedicated to the HARQ-ACK feedback of the uplink traffic, and obtains ACK/NACK information transmitted by the base station.

In this scenario, the UE behaviors additionally include:

(1) The UE enabling/activating newly introduced signals/channels/signaling formats corresponding to the feature, further including:

a signal and/or a channel for an ACK/NACK feedback message indicating HARQ-ACK feedback for multiple transport blocks;

(2) The UE determining to monitor the PDCCH and detect the newly introduced DCI for indicating HARQ-ACK information of one or more transport blocks after every N PUSCH transmissions according to the number of HARQ processes indicated by the DCI for scheduling multiple transport blocks being N, and/or monitor the newly introduced channel for indicating HARQ-ACK information of one or more transport blocks.

According to an embodiment of the present disclosure, the UE treats the first. N PUSCH transmissions or the first PUSCH transmission of each HARQ process as an initial transmission by default, or determines that the first N PUSCH transmissions are initial transmissions or retransmissions respectively according to the N-bit NDI field carried in the ICI; and determines, for any of subsequent PUSCH transmissions, that the PUSCH transmission is an initial transmission or a retransmission according to content of HARQ-ACK feedback corresponding to the previous PUSCH transmission of the HARQ process corresponding to the PUSCH transmission.

According to an embodiment of the present disclosure, the HARQ-ACK feedback carries N-bit ACK/NACK information, that is, carries a bit map pattern of a length N to indicate the ACK/NACK information, and the N bits respectively indicate the ACK/NACK information of the PUSCH transmissions of the N HARQ processes.

According to an embodiment of the present disclosure, the UE monitoring the PDCCH and detecting the newly introduced ICI for indicating HARQ-ACK information of one or more transport blocks, and/or monitoring the newly introduced channel for indicating HARQ-ACK information of one or more transport blocks includes:

the UP determining a time window of an ACK/NACK feedback message according to time domain resources of the last PUSCH transmission, monitoring a search space of the corresponding feedback message of the uplink traffic and detecting a group feedback message indicating the ACK/NACK feedback for the N transport blocks in the monitored time window; and/or monitoring/detecting the ACK/NACK feedback message transmitted by the base station, e.g., monitoring the PHICH-like feedback message dedicated channel transmitted by the base station and detecting/decoding the ACK/NACK feedback message.

According to an embodiment of the present disclosure, the ACK/NACK feedback message of the uplink traffic in this scenario is UE-specific, which implicitly or explicitly indicates in the feedback message at least one of: an UE identity, an HARQ ID, an ACK/NACK state.

According to an embodiment of the present disclosure, the ACK/NACK feedback message of the uplink traffic in the scenario is common to multiple UEs or a group of UEs, which implicitly or explicitly indicates in the feedback message at least one of: an UE identity, an UE group identity, an HARQ ID, an ACK/NACK state, a corresponding PUSCH resource position. The ACK/NACK feedback message common to the multiple UEs or the group of LIB belongs to group DCI/group common DCL Specifically, it may be used by an early termination feature for early terminating the feedback message of a type that supports multiple UEs in the HARQ-ACK feedback message of PUSCH transmissions of one or more UEs.

The fifth example describes a method of scheduling one or more downlink transport blocks and one or more uplink transport blocks in one DCI.

According to an embodiment of the present disclosure, the UE supports the feature of scheduling multiple transport blocks in DCI, and is configured by the base station to enable/activate this feature. The UE behaviors are similar to those in the previous four examples, but have difference as follows.

According to an embodiment of the present disclosure, the UE detects the DCI format X0, determines that the DCI is used for scheduling multiple transport blocks according to the DCI format and the RNTI used by the DCI, and determines that each of the transport blocks scheduled in the DCI is a transport block of downlink traffic or a transport block of uplink traffic, according to the indication field carried in the DCI.

For example, when the DCI format X0 schedules two transport blocks, the DCI carries a 2-bit indication field, respectively indicating that each of the two transport blocks is an uplink or downlink transport block.

According to an embodiment of the present disclosure, the UE decodes the PDSCH transmitted by the base station according to the scheduling information carried in the DCI, and transmits the PDSCH decoded ACK/NACK feedback to the base station; and the UE transmits the PUSCH according to the scheduling information carried in the DCI.

According to an embodiment of the present disclosure, the method of decoding the PDSCH and transmitting the ACK/NACK feedback to the base station according to the scheduling information carried in the DCI is the same as those in the previous four examples; and the method of transmitting the PUSCH according to the scheduling information carried in the DCI is the same as those in the previous four examples.

The following description will be given with reference to specific examples.

Figure 12:
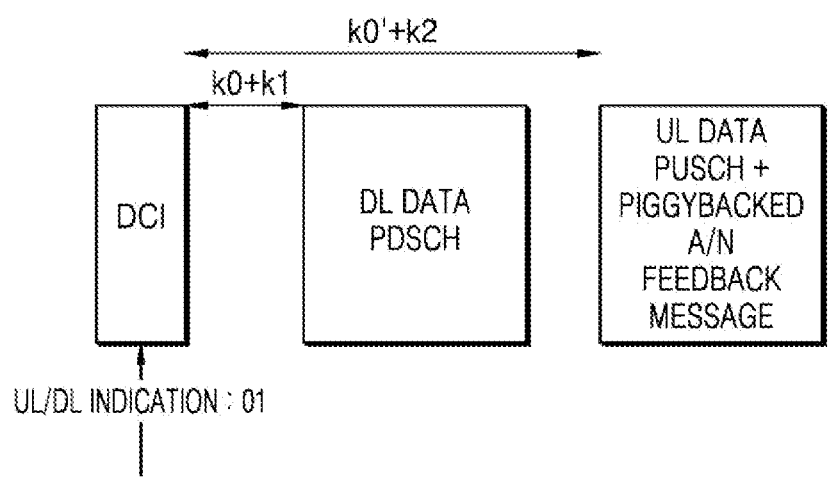
FIG. 12 schematically illustrates a diagram of scheduling two transport blocks using one DCI according to an embodiment of the present disclosure.

FIG. 12 shows a scenario in which one DCI schedules 2 transport blocks. The UE determines scheduling information of the 2 transport blocks according to content as follows carried in the DCI:

According to an embodiment of the present disclosure, the DCI carries a 2-bit uplink/downlink indication field 01, indicating that the first transport block is downlink and the second transport block is uplink.

According to an embodiment of the present disclosure, the DCI carries two scheduling delay values, the first scheduling delay indicating a time interval between the DCI and the first transport block, i.e., the PDSCH, and the second scheduling delay indicating a time interval between the DCI and the second transport block, i.e., the PUSCH, or a time interval between the first transport block, i.e. the PDSCH and the second transport block, i.e., the PUSCH. For example, in FIG. 12, the first scheduling delay is k1, the second scheduling delay is k2, and k0 and k0' are predefined values.

According to an embodiment of the present disclosure, the DCI does not carry a scheduling delay for indicating a time interval between the PDSCH and the corresponding ACK/NACK, For example, the DCI format for scheduling uplink and downlink transmissions does not include the field, or the DCI includes the field but the field is set to be unavailable, or the field in the DCI indicates a specific value which indicates piggybacked ACK/NACK feedback of the downlink traffic.

Figure 13:
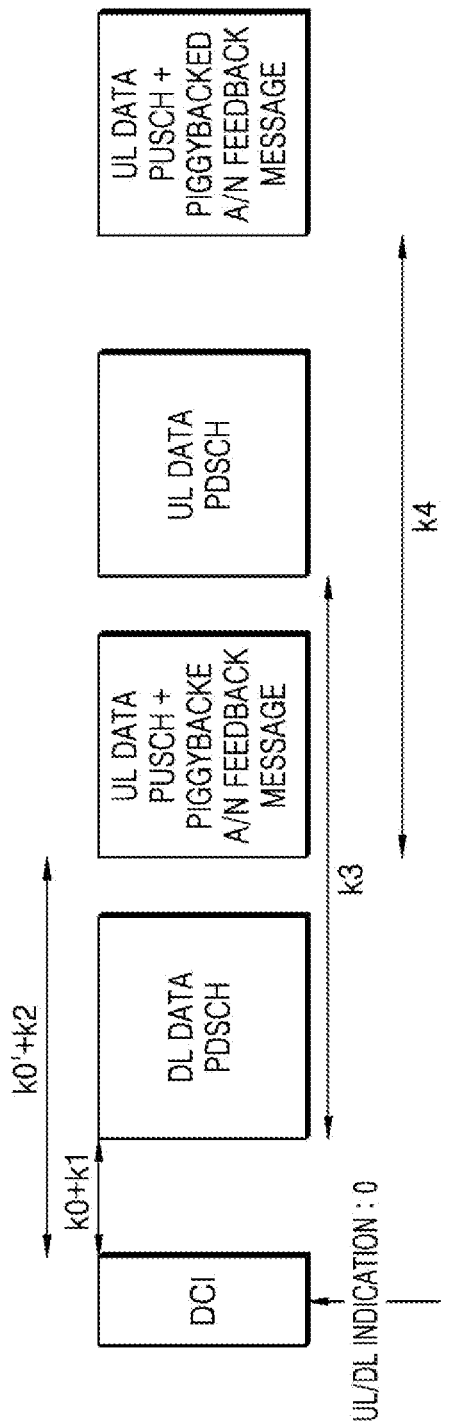
FIG. 13 schematically illustrates a diagram of scheduling four transport blocks using one DCI according to an embodiment of the present disclosure.

FIG. 13 shows a scenario in which one DCI schedules 4 transport blocks. The UE determines scheduling information of the 4 transport blocks according to content as follows carried in the DCI, in which:

the DCI carries a 1-bit uplink/downlink indication field, indicating two predefined types of uplink and downlink combinations: DL, UL, DL, UL; and UL, DL, UL, DL. The value of this field is 0, which indicates the first type of uplink and downlink combination.

According to an embodiment of the present disclosure, the method of determining the time domain positions of the first PDSCH and the first PUSCH is the same as that in the example of FIG. 12, The UE determines the time domain positions of the second PDSCH and the second PUSCH by using another two scheduling delay values k3 and k4 or two predefined period values k3 and k4 carried in the DCI, where k3 is a period of the PDSCH, k4 is a period of the PUSCH, and k3 and k4 are not equal, that is, resources of all the 4 transport blocks are not periodic, but resources of the uplink transport block and resources of the downlink transport block are periodic respectively.

Similar to the example in FIG. 12, according to the DCI indication or the predefined configuration, the HARQ-ACK feedback of the PDSCH is piggybacked in the PUSCH transmission.

Figure 14:
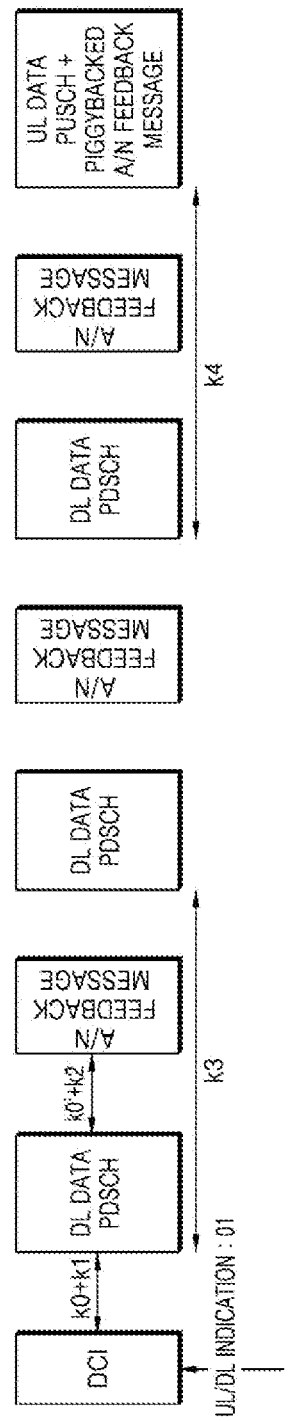
FIG. 14 schematically illustrates a diagram of scheduling four transport blocks using one DCI according to an embodiment of the present disclosure.

FIG. 14 shows another scenario in which one DCI schedules 4 transport blocks. The UE determines scheduling information of the 4 transport blocks according to content as follows carried in the DCI, in which:

According to an embodiment of the present disclosure, the DCI carries a 2-bit uplink/downlink indication field, indicating 4 predefined types of uplink and downlink combinations, as shown in Table 3. In this example, the value of this field is 01.

TABLE 3

| DCI Type Field (2 bits) | Type of Transport Block Scheduled by DCI |
| --- | --- |
| 00 | DL, DL, DL, DL |
| 01 | DL, DL, DL, DL |
| 10 | DL, UL, UL, UL |
| 11 | UL, UL, UL, UL |

According to an embodiment of the present disclosure, the method of determining the time domain position of the first PDSCH is the same as that in the example of FIG. 12. The UE determines the time domain positions of the subsequent PDSCHs and PUSCHs by using another two scheduling delay values k3 and k4 or two predefined period values k3 and k4 carried in the DCI, where k3 is a time interval between the PDSCH and the previous transport block (calculated from a start subframe or an end subframe, an example using a start subframe being shown in FIG. 14), and k4 is a time interval of the PUSCH and the previous transport block (calculated from a start subframe or an end subframe, an example using a start subframe being shown in FIG. 14); K3 and k4 are equal or not equal, that is, resources of all the 4 transport blocks are periodic or aperiodic.

In this example, the HARQ-ACK feedback of the PDSCH is piggybacked in the PUSCH transmission according to the DCI indication or the predefined configuration. The UE uses a principle of piggybacking the HARQ-ACK as much as possible, that is, when the UE needs to transmit the HARQ-ACK feedback, if the transmission of the next transport block is an uplink transmission, the piggybacked HARQ-ACK feedback is used; otherwise, if the transmission of the next transport block is an uplink transmission, an independent HARQ-ACK feedback message is transmitted according to the DCI indication or the predefined scheduling delay k2.

The sixth example describes a method of scheduling multiple transport blocks of multi cast traffic. The multicast traffic includes Single Cell-Point to Multi-point (SC-PTM) traffic.

For the UE that supports the feature of scheduling multiple transport blocks in the DCI, the UE is configured by the base station to enable the feature of scheduling multiple transport blocks in the DCI, and the UE receives the multicast traffic according to the scheduling information carried in the DCI.

According to an embodiment of the present disclosure, the UE is configured by, the base station to enable the feature of scheduling multiple transport blocks in the DCI, including:

(1) the UE enabling/activating the newly introduced signal/channel/signaling format corresponding to the feature, including a DCI format for scheduling multiple transport blocks, including a DCI format X2, which is used for scheduling multiple transport blocks of the multicast traffic, wherein the multiple transport blocks of the multicast traffic may be multiple transport blocks of the PDSCH carrying SC-MCCH or SC-MTCH;

(2) the UE obtaining configuration information of the configuration configured by the base station and/or the upper layer, and/or predefined, the configuration information including the maximum number of transport blocks scheduled in the DCI and search space configuration information, the search space being used for detecting the DCI format of the multiple transport blocks of scheduling the multicast traffic;

(3) the UE monitoring the search space configured by the base station/preconfigured and detecting the DCI transmitted by the base station, including: the UE detecting the DCI format for scheduling the multiple transport blocks in the search space, wherein the DCI format may be a DCI format for scheduling the multiple transport blocks of the multicast traffic, the size of the DCI format is determined by configuration information of the feature of scheduling multiple transport blocks in the and the configuration information includes the maximum number of transport blocks scheduled in the DCI;

(4) the UE detecting the DCI format X2, and determining that the DCI is used for scheduling multiple transport blocks of the multicast traffic according to the DCI format and the INTI used by the DCI;

(5) the UE decoding the PDSCH transmitted by the base station according to the scheduling information carried in the DCI, including: the UE determining that m PDSCHs are scheduled by the DCI, according to the number of transport blocks indicated by the number of subframes in the being m; and further including: the UE determining the time domain position for PDSCH decoding according to the scheduling information carried in the DCI, wherein the PDSCH includes a PDSCH carrying an SC-MCCH or an SC-MTCH of SC-PIM traffic.

For the multicast traffic, the UE does not transmit ACK/NACK feedback, and the UE assumes that each PDSCH is an initial transmission of new data.

A flowchart of a method at a base station of transmitting and/or receiving a transport block according to an exemplary embodiment of the present disclosure will be described in detail with reference to FIG. 15. For the sake of brevity, details which have been previously described in the method 100 with reference to FIG. 1 are omitted herein.

Figure 15:
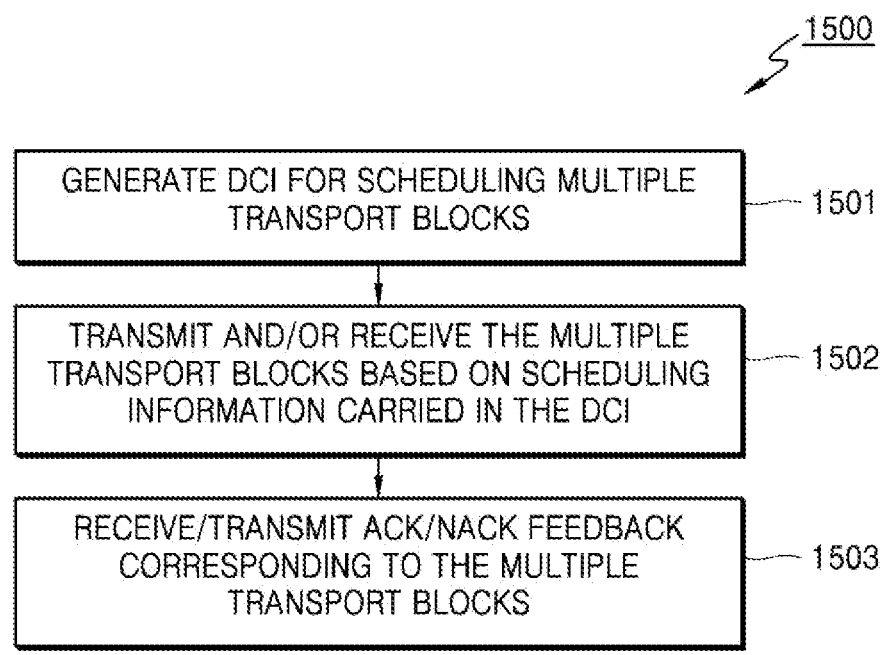
FIG. 15 schematically illustrates a flowchart of a method at a base station of transmitting and/or receiving a transport block according to an embodiment of the present disclosure.

FIG. 15 schematically illustrates a flowchart of a method 1500 at a base station of transmitting and/or receiving a transport block according to an exemplary embodiment of the present disclosure. As shown in FIG. 15, the method 1500 may include a step 1501 in which a base station generates information for scheduling multiple transport blocks; and step 1502 in which the base station receives and/or transmits a transport block(s) based on the information for scheduling multiple transport blocks.

The method 1500 further includes a step 1503, in which the base station transmits/receives ACK/NACK feedback corresponding to the multiple transport blocks.

According to an embodiment of the present disclosure, the multiple transport blocks are scheduled by DO, and all of the multiple transport blocks are initially transmitted or are retransmitted transport blocks. Specifically, the NDI field in the DCI is used for indicating in a form of a bitmap whether each of the multiple transport blocks (and the corresponding HARQ processes) which is scheduled last time by the DO is successfully received, and an additional 1-bit indication field is used for indicating that the transport block scheduled by the DCI is a transport block received successfully (that is, the initial transmission of the transport block being scheduled) or a transport block received unsuccessfully (that is, the retransmission of the transport block being scheduled). Specifically, assuming that in the bitmap of the NDI field, "1" indicates an initial transmission, and "0" indicates a retransmission, when the additional 1-bit indication field is "1", the transport block actually scheduled by the DCI is an initial transmission of the next transport block of the HARQ process corresponding to the bit of "1" in the NDI; when the additional 1-bit indication field is "0", the transport block actually scheduled by the DCI is a retransmission of the transport block of the HARQ process corresponding to the bit of "0" in the NDI.

According to an embodiment of the present disclosure, the HARQ ID indication field in the DCI is used for indicating an ID of the HARQ process corresponding to the transport block scheduled by the DCI, and the 1-bit NDI field in the DCI is used for indicating that all the transport blocks scheduled by the DCI are initially transmitted or retransmitted (for example, the NDI field of "1" indicates that all the transport blocks are initially transmitted, and the NDI field of "0" indicates that all the transport blocks are retransmitted). Further, the HARQ ID field indicates the ID of the HARQ process in a form of a bitmap, and the IDs of at most m HARQ processes may be indicated when the bitmap has a length of m bits; in one example, the HARQ ID indicated in the bitmap is calculated by an HARQ start ID indicated by the DCI or a predefined HARQ start DCI. If the HARQ start ID is NO, the ID of the HARQ process corresponding to the k-th bit in the bitmap is (N0+k−1), and when the k-th bit is "1", the transport block of the HARQ process whose ID is (N0+k−1) is scheduled by the DCI; otherwise, when the k-th bit is "0", the transport block of the HARQ process whose ID is (N0+k−1) is not scheduled by the DCI, Or further, the ID field explicitly indicates the IDs of the m HARQ processes. Specifically, the HARQ ID field includes m*n bits, and the ID of each HARQ process is indicated by n bits.

Figure 26:
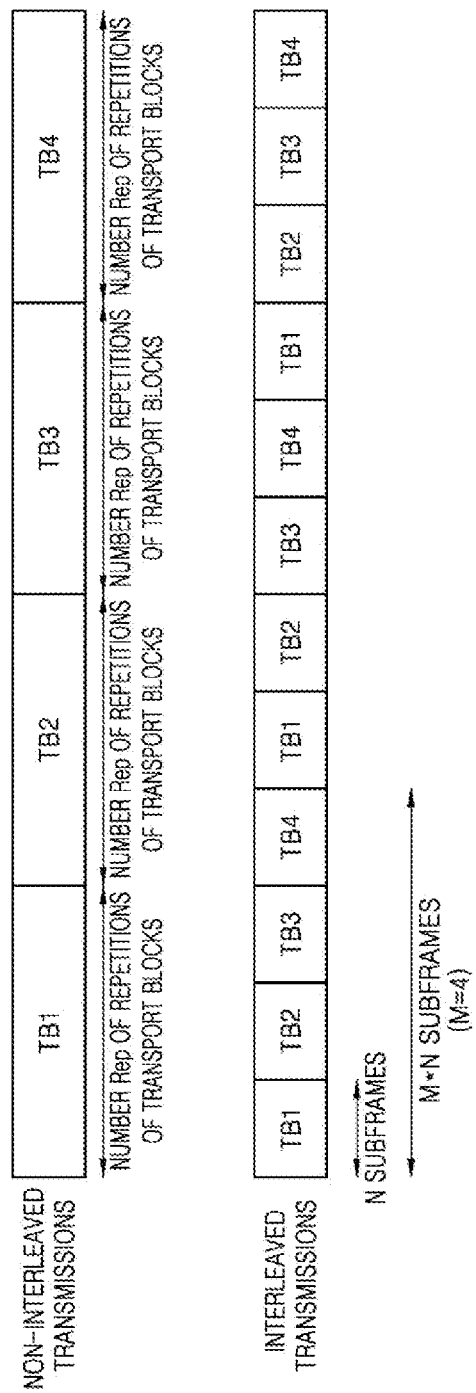
FIG. 26 schematically illustrates a diagram of transmission in an interleaved mode according to an embodiment of the present disclosure.

When scheduling of multiple uplink transport blocks or multiple downlink transport blocks by the DCI is supported, one method is using an interleaved transmission mode between multiple different scheduled transport blocks, in order to further obtain a time diversity gain. This transmission method may be used for PUSCH and/or PDSCH. FIG. 26 shows an example of an interleaved transmission method when DCI schedules 4 transport blocks. As shown in FIG. 26, a non-interleaved transmission is to transmit data of a next transport block after all data of a transport block are completely transmitted, while an interleaved transmission is to transmit part of data of a next transport block in the (N+1)-th subframe to the 2N-th subframe after part of data of a transport block is transmitted in N consecutive subframes, and so on, part of data of each transport block being transmitted cyclically, until all the transmissions are completed.

According to an embodiment of the present disclosure, if M transport blocks are scheduled in the DCI and the numbers of repetitions of the transport blocks are identical and greater than 1, data of all the Nil transport blocks are cyclically scheduled in every M*N subframes, starting from a start subframe of data channel resources of the schedule M transport blocks, and there are Rep/N groups of M*N subframes in total, where Rep is the number of repetitions of the transport block; and data of the same transport block are transmitted in every N consecutive subframes, starting from a start subframe of every subframes, which is performed sequentially from the first transport block to the last transport block. Specifically, data of the k-th transport block is transmitted in the k-th N consecutive subframes per M*N subframes. In one example, 4 transport blocks are scheduled in the DCI, and the number of repetitions of the transport block is 8, assuming N=4, starting from the start subframe of the data channel resources of the scheduled 4 transport blocks, data of the first transport block is transmitted in the 1st to 4th and 17th to 20th subframes, data of the first transport block is transmitted in the 5th to 8th and 21st to 24th subframes, data of the first transport block is transmitted in the 9th to 12th and 25th to 28th subframes, and data of the first transport block is transmitted in the 13th to 16th and 29th to 32nd subframes.

According to an embodiment of the present disclosure, for transmitting data of the same transport block in every N consecutive subframes in the interleaved transmission method, N is indicated or determined by at least one of: RRC signaling transmitted by the base station, DCI transmitted by the base station, a predefined criterion.

In one example, N is explicitly obtained by at least one of the above. For example, the value of N is explicitly indicated in the RRC signaling or DCI; or the value of N is predefined.

In one example, the predefined value of N is equal to some parameter in the existing mechanism for repetitions of the uplink and/or downlink channels, or a multiple of the parameter. For example, in the existing mechanism, each subframe uses the same scrambling sequence in a given block with Nacc subframes, then N=Nacc*K, and K is a positive integer greater than or equal to 1; for example, in the existing mechanism, after the data is mapped to Nslot time slots, the Nslot time slots may be repeated $M_{identical}^{NPUSCH}-1$ times additionally, then $N=M_{identical}^{NPUSCH}*K$, or after the data is mapped to one subframe, the sub-frame may be repeated $\min(M_{rep}^{NPUSCH}, 4)-1$ times additionally, then $N=\min(M_{rep}^{NPDSCH}=1,4)*K$ where K is a positive integer greater than or equal to 1. In one example, K is the total number of RV's used by the interleaved multiple transport blocks. For example, when the RV's of the transport blocks has 4 values of {0, 2, 3, 1}, K=4.

In another example, N is calculated according to parameters and/or predefined configuration information indicated in at least one of the above. For example, the base station indicates an interleave factor k in the RRC signaling or DCI or uses a predefined interleave factor k, N=Rep/k, where Rep is the number of repetitions of the transport block. For example, in the TDD system, N is the total number of uplink subframes or the number of consecutive uplink subframes in each radio frame, which is calculated according to the TDD uplink-downlink configuration indicated by the base station in the RRC signaling. For example, for the uplink-downlink configuration 1 in the TDD system, Subframes 0, 4, 5, and 9 are downlink subframes, Subframes 1, 6 are special subframes, and Subframes 2, 3 and 7, 8 are uplink subframes, then N=4 (the total number of uplink subframes) or N=2 (the number of consecutive uplink subframes).

According to an embodiment of the present disclosure, the number Rep of repetitions of the transport block is divisible by N, then the data of the same transport block is transmitted in every N consecutive subframes, starting from the start subframe of the transport block scheduled by the DCI. In another exemplary embodiment, the number Rep of repetitions of the transport block is not divisible by N, then starting from the start subframe of the transport block scheduled by the DCI, the data of the same transport block is transmitted in every N consecutive subframes of the first floor(Rep/N)*M*N subframes, and the data of the same transport block is transmitted in every mod(Rep, N) consecutive subframes of the remaining subframes.

According to an embodiment of the present disclosure, the numbers of repetitions of the multiple (e.g., M) transport blocks scheduled by the DCI are not equal, and the UE considers that the interleaved transmissions are not supported.

According to an embodiment of the present disclosure, if the numbers of repetitions of the multiple (e.g., M) transport blocks of the DCI scheduling are not equal, the interleaved transmission is first performed per the minimum of the number of repetitions of the multiple transport blocks, and after the transport blocks (e.g., M1) whose repetition number is corresponding to the minimum of the number of repetitions of the multiple transport blocks are completely transmitted, a non-interleaved transmission or interleaved transmission is performed on the remaining transport blocks (for example, M-M1) sequentially.

According to an embodiment of the present disclosure, if the DCI schedules multiple uplink transport blocks and uses the interleaved transmissions, the early termination of the PUSCH is also supported. For example, if the DCI acquired by the UE indicates the early termination of some uplink transport block that is transmitted in an interleaved manner, the UE stops transmitting the uplink transport block, and does not transmit in the remaining resources (which may be resource positions corresponding to the interleaved transmission) corresponding to the uplink transport block any more, or transmits the next transport block of the HARQ process corresponding to the early terminated uplink transport block on the remaining resources corresponding to the uplink transport block.

The existing mechanism supports that a gap is configured between multiple consecutive subframes for uplink transmission or downlink transmission. The mechanism is mainly applied in a scenario with a larger number of repetitions, so as to enable the UE to avoid a crystal oscillator frequency offset caused by change of the transmitter temperature due to consecutive transmissions/receptions, or congestion to other UEs caused by a larger number of repetitions of consecutive downlink transmission of one UE, and enable the UE of consecutive uplink transmissions to perform synchronous tracking or downlink measurement in the configured gap. This mechanism may similarly be applied in interleaved uplink or downlink transmission. For example, for the interleaved PUSCH transmission, after the UE completes data transmission of P consecutive subframes, an uplink or downlink gap of P1 subframes is configured, and the remaining data is delayed to be transmitted.

In a scenario where multiple transport blocks are scheduled by one DCI as provided in the present disclosure, in order to further reduce the resources occupied by the control signaling and the feedback signaling, it may be considered that the transmission of the HARQ-ACK feedback signaling may be enhanced. A particular method as previously discussed may be used for the enhancement, in which the HARQ-ACK feedback may be performed based on a predefined ACK/NACK state or a predefined ACK-NACK transmission criterion. For example, if the reception of the receiving end fails after the data message transmission has completed, a NACK message is transmitted; otherwise, if the reception is successful, no ACK message is transmitted; and if the transmitting end does not receive the NACK message, it considers that the transmission is successful, and vice versa. That is, in another particular example of the method, if the reception of the receiving end is successful after the data message transmission has completed, an ACK message is transmitted; otherwise, if the reception fails, no NACK message is transmitted, and if the transmitting end does not receive the ACK message, it considers that the transmission fails.

According to an embodiment of the present disclosure. The method can effectively reduce the overhead of the HARQ-ACK feedback signaling. However, when the transmitting end fails to receive the feedback message of the receiving end, that is, when a miss detection of the HARQ-ACK message occurs, the method may cause an error. A particular error manifests itself in that the transport block that the transmitting end needs to transmit and the transport block that the receiving end needs to receive cannot be aligned with each other.

Hereinafter, a particular example is taken for illustration. In the example, the base station transmits DCI to the UE, wherein the transport blocks scheduled by the DCI include two downlink transport blocks TB0 and TB1, After the base station transmits the TB0, the UE fails to receive TB0, and transmits a NACK message (NACK0) to the base station, but a miss detection of the NACK message occurs at the base station side. The base station fails to receive the NACK message, it assumes that the transmission of TB0 is successful, then transmits TB1 to the UE. However, the transmission actually expected by the UE is a retransmission of TB0. If the transmission of TB1 is indicated by the DCI as an initial transmission (specifically, after the LT transmits the NACK, the DCI transmitted by the base station indicates by the NDI that the corresponding TB is an initial transmission), the UE may deduce that the transmission is an initial transmission of TB1 but not a retransmission of TB0. However, due to the limitation of the buffer size, the UE has no redundant buffer for receiving TB1 before successfully receiving TB0. If the transmission of TB1 is not indicated by the DCI as an initial transmission or a retransmission, but is deduced by the UE (specifically, the UE deduces from the previously transmitted NACK that the transmission is a retransmission of the previous TB, or deduces from the previously transmitted ACK that the transmission is an initial transmission of the next TB), the IT will mistake the initial transmission of TB1 for the retransmission of TB0 and perform the decoding. Accordingly, the reception cannot be successful either.

For the erroneous scenario where the transport block that the transmitting end needs to transmit and the transport block that the receiving end needs to receive cannot be aligned with each other, a feasible solution is the solution as discussed previously, i.e., adding an ACK/NACK feedback field before or after the transport block of the uplink/downlink traffic, so that when receiving the uplink/downlink traffic transport block, the receiving end deduces that the transport block transmission is an initial transmission or a retransmission according to the ACK/NACK feedback field (for example, deducing that the transport block transmission is an initial transmission based on ACK, and that the transport block transmission is a retransmission based on NACK). Another solution is to carry information in the ACK/NACK feedback message, indicating the transport block associated with the feedback message. The second solution will be described in detail below.

According to an embodiment of the present disclosure, after the data message transmission has completed, the receiving end carries information in the corresponding HARQ-ACK feedback message, indicating the transport block associated with the feedback message. This information may be explicitly indicated in the content of the ACK message or NACK message, or may be implicitly indicated, for example, by different scrambling sequences, or by different sequences/patterns of reference signals.

In a specific example, the DCI received by the UE schedules $2^N$ TBs for a given HARQ process, and the UE carries N-bit information in the ACK/NACK message corresponding to the HARQ process, indicating the TB associated with the feedback message. The N-bit information is explicitly indicated in the content of the ACK/NACK feedback message (e.g., using a field with a length of N in the ACK/NACK message), or is indicated by $2^N$ different scrambling code sequences, or is implicitly indicated by $2^N$ different sequences or patterns of reference signals (e.g., DMRS (DeModulation Reference Signal)s).

According to an embodiment of the present disclosure, the receiving end performs HARQ-ACK feedback after the data message transmission has completed, and information carried in the feedback message indicates the transport block associated with the feedback message; after receiving the feedback message, the transmitting end determines, according to the information carried in the feedback message indicating the transport block associated with the feedback message, the transport block associated with the feedback message, and further determines data to be subsequently transmitted.

According to an embodiment of the present disclosure, after the transmitting end receives the feedback message, if the transport block associated with the feedback message is a transport block transmitted by the transmitting end in the previous (last) transmission, the transmitting end determines that the subsequent data transmission is a retransmission of the transport block transmitted in the last transmission, according to the content of the feedback message being NACK; or determines that the subsequent data transmission is an initial transmission of a transport block next to the transport block transmitted in the last transmission, according to the content of the feedback message being ACK. Otherwise, if the transport block associated with the feedback message is not (or is earlier than) the transport block transmitted by the transmitting end in the previous (last) transmission, the transmitting end may assume that an error of misalignment with the receiving end has occurred, and determine that the subsequent data transmission is a retransmission of the transport block associated with the feedback message according to the content of the feedback message being NACK, or determine that the subsequent data transmission is an initial transmission of the transport block next to the transport block associated with the feedback message according to the content of the feedback message being ACK.

According to an embodiment of the present disclosure, the base station transmits a downlink transport block TB0 to the UE, and then does not receive a NACK message of TB0, thus it considers that TB0 is successfully received, and transmits a downlink transport block TB1 to the UE. The base station receives the feedback message of TB1, which indicates that:

a) the transport block associated with the feedback message is TB0, and the feedback message is ACK; thus the base station assumes that TB1 transmission fails, then the next transmission is a retransmission of TB1; or, the base station assumes that the UE fails to detect TB1, then the next transmission is an initial transmission of TB1;

b) the transport block associated with the feedback message is TB0, and the feedback message is NACK; thus the base station assumes that the TB0 transmission fails and the UE cannot receive TB1, then the next transmission is a retransmission of TB0;

c) the transport block associated with the feedback message is TB1, and the feedback message is ACK; thus the base station assumes that the TB0 transmission is successful and the TB1 transmission is successful, then the next transmission is an initial transmission of TB2; or d) the transport block associated with the feedback message is TB1, and the feedback message is NACK; thus the base station assumes that the TB0 transmission is successful and the TB1 transmission fails, then the next transmission is a retransmission of TB1.

The solution of adding an ACK/NACK feedback field before or after the transport block of the uplink/downlink traffic and the solution of carrying the information indicating the TB associated with the feedback message in the ACK/NACK feedback message may be used independently or may be combined.

When multiple transport blocks TB are scheduled by using one in order to save DCI information bits, a feasible method is to jointly code multiple fields. For example, in a scenario where up to 2 HARQ processes or up to 2 TBs are scheduled, if the NDI field uses independent coding, a 2-bit NDI field indicating the NDI of each TB needs to be carried in the DCI. However, when only one TB is actually scheduled in the DCI, 1 bit in the 2-bit NDI field is wasted. However, if the NDI field is jointly coded with other fields, such a type of waste may be reduced.

Hereinafter, a method of jointly coding three fields, i.e., the number of TBs actually scheduled, the HARQ process index, and the NDI of the HARQ process (or the NDI of the TB), is provided for the scenario where up to 2 TBs and up to 2 HARQ processes are scheduled in one DCI.

According to an embodiment of the present disclosure, 3 bits are used in the DCI for indicating the number of TBs actually scheduled, the HARQ process index, and the NDI for HARQ process.

The number of TBs actually scheduled includes two possible values {1, 2}, and each possible value corresponds to four combined states of HARQ process indexes and NDI for HARQ process:

the number of TBs actually scheduled is 1: the HARQ process index includes 2 possible values {0, 1}, and the HARQ NDIs include 2 possible values {0, 1}, wherein the of the HARQ process indexes and the values of the HARQ NDIs are independent of each other, thus 4 combined states are obtained;

the number of TBs actually scheduled is 2: it is assumed that the terminal supports up to 2 HARQ processes, the HARQ process indexes are fixed to HARQ process #0 corresponding to the first TB and HARQ process #1 corresponding to the second TB (in another exemplary embodiment, fixed to HARQ process #1 corresponding to the first TB and HARQ process #0 corresponding to the second. TB), that is, there is no need to explicitly indicate the HARQ process index with a field; the NDI of each HARQ process includes 2 possible values {0, 1}, values of the NDIs of the two HARQ processes are independent of each other, thus 4 combined states are obtained.

Therefore, there are eight possible combined states in total for the three fields, i.e., the number of TBs actually scheduled, the HARQ process index, and the NDI of the HARQ process (or NDI of the TB), which are indicated by 3 bits in the DCI.

A particular example of the number of TBs actually scheduled, the HARQ process index, and the NDI of the HARQ process (or the NDI of the TB) being indicated by 3 bits in the DCI is given in Table 4. In this example, the number of TBs actually scheduled, the HARQ process index, the NDI of the HARQ process (or the NDI of the TB) are jointly coded and indicated by 3 bits. It may be considered that the number of TBs actually scheduled is indicated by 1 bit, and the HARQ process index and the NDI of the HARQ process (or the NDI of the TB) use jointly, coded and are indicated by 2 bits, but the interpretation of the 2 bits is affected by the number of TBs actually scheduled.

TABLE 4

| DCI Field (3bits) | Number Of Actually Scheduled TBs | Index of HARQ Process | NDI of HARQ Process |
|---|---|---|---|
| 000 | 1 | 0 | 0 |
| 001 | 1 | 0 | 1 |
| 010 | 1 | 1 | 0 |
| 011 | 1 | 1 | 1 |
| 100 | 2 | Index of First HARQ Process is 0, Index of Second HARQ Process is 1 | NDI of First HARQ Process is 0, NDI of Second HARQ Process is 0 |
| 101 | 2 | Index of First HARQ Process is 0, Index of Second HARQ Process is 1 | NDI of First HARQ Process is 0, NDI of Second HARQ Process is 1 |
| 110 | 2 | Index of First HARQ Process is 0, Index of Second HARQ Process is 1 | NDI of First HARQ Process is 1, NDI of Second HARQ Process is 0 |
| 111 | 2 | Index of First HARQ Process is 0, Index of Second HARQ Process is 1 | NDI of First HARQ Process is 1, NDI of Second HARQ Process is 0 |

Hereinafter, a flowchart of a method at a UE for downlink transmission according to an exemplary embodiment of the present disclosure will be described in detail with reference to FIG. 16.

Figure 16:
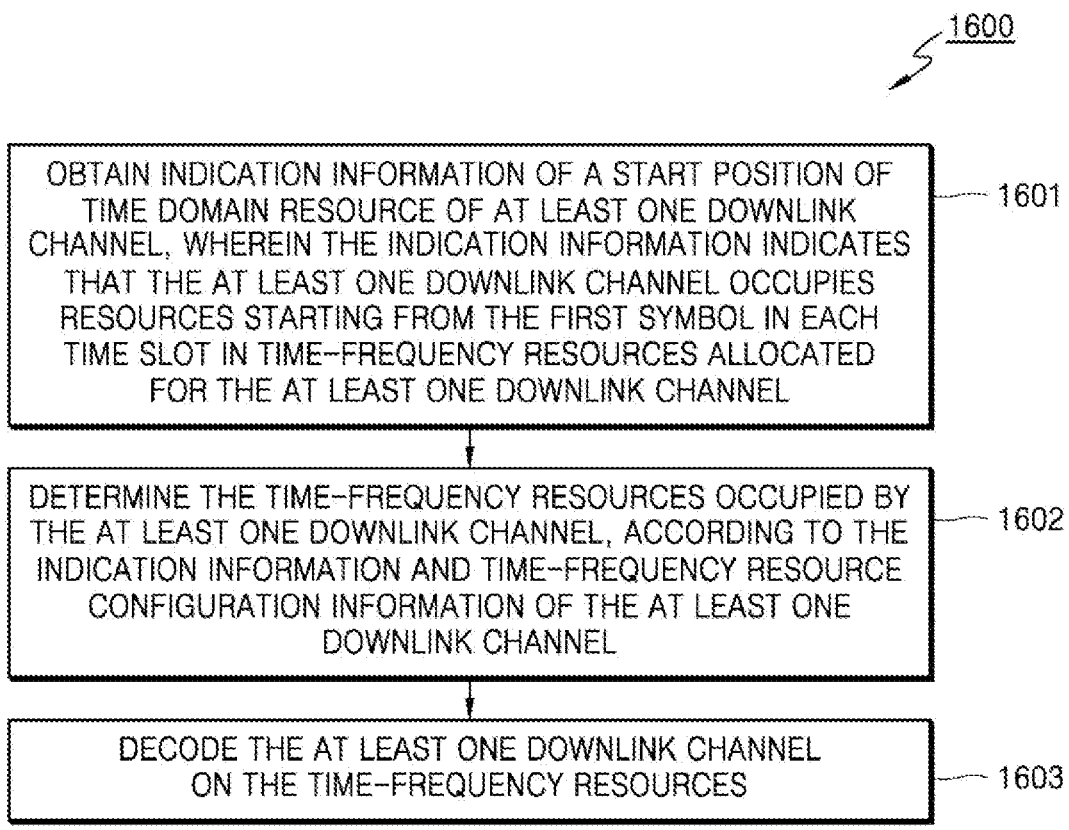
FIG. 16 schematically illustrates a flowchart, of a method at a UE for downlink transmission according to an embodiment of the present disclosure.

FIG. 16 schematically illustrates a flowchart of a method 1600 at a UE for downlink transmission according to an exemplary embodiment of the present disclosure. As shown in FIG. 16, the method 1600 may include:

step 1601 of obtaining, by the UE, indication information of a start position of time domain resource of at least one downlink channel, wherein the indication information indicates that the at least one downlink channel occupies resources starting from the first symbol or the second symbol in each time slot in time-frequency resources allocated for the at least one downlink channel;

step 1602 of determining, by the LT, the time-frequency resources occupied by, the at least one downlink channel, according to the indication information and time-frequency resource configuration information of the at least one downlink channel; and step 1603 of decoding, by the UE, the at least one downlink channel on the time-frequency resources.

According to an embodiment of the present disclosure, a method at a UE for downlink transmission is provided. The method includes: obtaining indication information of a start position of time domain resource of a first downlink channel and/or indication information of a start position of time domain resource of a second downlink channel; determining time-frequency resources occupied by at least one downlink channel, according to the indication information of the start position of time domain resource of the first downlink channel and/or the indication information of the start position of time domain resource of the second downlink channel, and time-frequency resource configuration information of the at least one downlink channel; and decoding the at least one downlink channel on the time-frequency resources.

According to an embodiment of the present disclosure, the indication information of the start position of time domain resource of the first downlink channel and the indication information of the start position of time domain resource of the second downlink channel respectively indicate time domain start positions for at least one different downlink channel. In an exemplary embodiment, the indication information of time domain resource of the second downlink channel start position is used to indicate a start position of time domain resource of a given downlink channel set, for example, to indicate a start position of time domain resource of a downlink shared channel PDSCH and a downlink control channel PDCCH; the indication information of the start position of time domain resource of the first downlink channel is used to indicate a start position of time domain resource of all other downlink channels/signals, or a start position of time domain resource of other downlink channels/signals in a given downlink channel/signal set than the downlink channel set corresponding to the indication information of the start position of time domain resource of the second downlink channel.

According to an embodiment of the present disclosure, the indication information of the start position of time domain resource of the first downlink channel and the indication information of the start position of time domain resource of the second downlink channel are configured independently. For example, the indication information of the start position of time domain resource of the first downlink channel and the indication information of the start position of time domain resource of the second downlink channel indicate different downlink channel resource start positions respectively, or indicate downlink channel resource start positions respectively, and the indicated downlink channel resource start positions are the same.

According to an embodiment of the present disclosure, the indication information of the start position of time domain resource of the first downlink channel and/or the indication information of the start position of time domain resource of the second downlink channel are indicated explicitly or implicitly. For example, the indication information of the start position of the downlink channel time domain resource and the indication information of the start position of time domain resource of the second downlink channel are all explicitly indicated in the system information block SIB1, or the indication information of the start position of the downlink channel time domain resource is explicitly indicated in the SIB1 and the indication information of the start position of time domain resource of the second downlink channel is predefined.

According to an embodiment of the present disclosure, the indication information includes indication information of a start position of the time domain resource of the at least one downlink channel and/or the indication information of the start position of the time domain resource of the first downlink channel and/or the indication information of the start position of the time domain resource of the second downlink channel, and is transmitted in one of:
an MIB,
an SIB1,
other SIBs than the SIB1,
a UE-specific RRC message.

In an exemplary embodiment, the at least one downlink channel is at least one of:
a downlink data channel for transmitting the SIB1,
a downlink data channel for transmitting other SIBs than the SIB1,
a control channel in a common search space,
a control channel in a UE-specific search space,
a downlink data channel scheduled by the control channel in the common search space, or
a downlink data channel scheduled by the control channel in the UE-specific search space.

According to an embodiment of the present disclosure, before step 1601, a capability of the UE supporting receiving the downlink channel occupying resources starting from the first symbol or the second symbol in one time slot is reported to the base station.

In the existing system, the indication of the start position of the downlink channel time domain resource uses different ranges of values depending on whether the system is a broadband system or a narrowband system. When the downlink bandwidth of the system (indicated by the parameter dl-Bandwidth) exceeds 10 resource blocks (RBs), the possible values of the start position of time domain resource of the downlink channel is the second/third/fourth symbol (Symbol 1/Symbol 2/Symbol 3); otherwise, when the downlink bandwidth of the system does not exceed 10 RBs, the possible value of the start position of time domain resource of the downlink channel is the third/fourth/fifth symbol (Symbol 2/Symbol 3/Symbol 4). Therefore, for the case where the downlink bandwidth of the system does not exceed 10 RBs, the indicated start position of time domain resource of the downlink channel may be the first symbol or may be the second symbol for the purpose of using the unused symbol of the downlink channel in the existing system.

According to an embodiment of the present disclosure, step 1601 further includes: the UE obtaining the indication information of the start position of the time domain resource of the at least one downlink channel, wherein the indication information indicates that the at least one downlink channel occupies resources starting from the second symbol, in each time slot or subframe of the time-frequency resources allocated for the at least one downlink channel, wherein the at least one downlink channel occupying resources starting from the first symbol or from the second symbol is explicitly indicated (for example, by using a 1-bit field in the indication information for indicating that the start symbol is the first symbol or the second symbol), or predefined.

An embodiment of the present disclosure provides a method at a UE of using a control region in downlink transmission.

The control region may be, for example, a control region (also referred to as an LTE control region) in a subframe of the existing UE mechanism. Specifically, the control region may be the first N OFDM symbols in the subframe, where N is a positive integer, whose value is configured by the base station or pre-configured. For example, the value of N may be indicated by, a startSymbotBR parameter in SIB1, a startSymbol parameter in EPDCCH configuration information, and an eutraControlRegionSize parameter in SIB1-NB. The remaining OFDM symbols in the subframe except the control region may be used to transmit data, also referred to as a data region.

Figure 17:
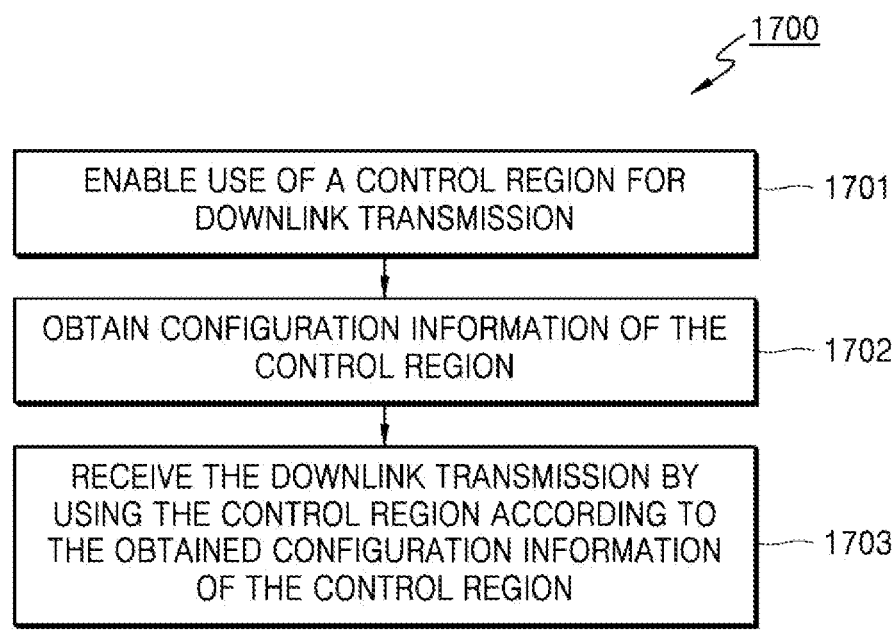
FIG. 17 schematically illustrates a flowchart of a method at a UE for downlink transmission according to an embodiment of the present disclosure.

Hereinafter, a flowchart of a method at a UE for downlink transmission according to another exemplary embodiment of the present disclosure will be described in detail with reference to FIG. 17. FIG. 17 schematically illustrates a flowchart of a method 1700 at a UE for using a control region in downlink transmission according to an exemplary embodiment of the present disclosure. As shown in FIG. 17, the method 1700 may include:

step 1701 of enabling, by the UE, use of a control region for downlink transmission;

step 1702 of obtaining, by the UE, configuration information of the control region; and step 1703 of receiving the downlink transmission by using the control region according to the obtained configuration information of the control region.

In an exemplary embodiment, step 1701 may include: enabling the use of the control region for the downlink transmission by signaling configuration.

In an exemplary embodiment, the configuration information of the control region may include at least one of:

position information for receiving the control region of the downlink transmission; for example, if a control region starting from a symbol N1 is used, a value of N1 is indicated in the configuration information of the control region.

different types of methods for using the control region.

According to an embodiment of the present disclosure, step 1702 may include: obtaining, by the UE, predefined configuration information of the control region, and/or obtaining, by the LTE, configuration information of the control region indicated by signaling.

The signaling may include at least one of: an MIB; an SIB, which includes SIB1 and other SIBs; and RRC signaling.

The configuration information obtained by the UE may be all content of the configuration information of the control region, or a part of content of the configuration information of the control region. For example, a part of the configuration information of the control region is indicated in the MIB, and the configuration information of the rest of the control region is predefined. The UE obtains the part of the configuration information of the control region from the MIB, and obtains the predefined configuration information of the remaining parts.

The obtaining the configuration information of the control region indicated by the signaling further includes: obtaining, by the UE, a predefined mode indicated by the signaling. For example, the predefined configuration information includes multiple modes, each mode being used for one or more downlink signals/channel sets, and each downlink signal/channel set corresponding to configuration information of a group of control regions. For example, the set of configuration information includes a feature of enabling use of an UE control region, and/or position information of an UE control region, and/or a different type of method of using an LTE control region. The UE obtains an index of the mode indicated in the signaling, and determines configuration information by the index.

According to an embodiment of the present disclosure, step 1702 may further include: obtaining configuration information of the control region from the NUB; and step 1703 may further include: receiving the SIB1 and other SIBs, the downlink data channel, and downlink control channel according to the obtained configuration information of the control region.

According to an embodiment of the present disclosure, the configuration information of the control region is used for a specific downlink signal/channel.

After the UE successfully receives the signal/signaling carrying the configuration information of the control region, the control region is enabled according to a validation time of the configuration information of the control region, and the downlink transmission is received according to the configuration information of the control region.

The enabling the UE control region according to the validation time of the configuration information of the control region including at least one of:

1) after successfully receiving the signal/signaling carrying the configuration information of the control region, the UE enabling the UE control region, and receiving the downlink transmission according to the configuration information of the control region;

2) the UE enabling the UE control region after N subframes after the transmission of the signal/signaling carrying the configuration information of the control region is completed, and receiving the downlink transmission according to the configuration information of the control region, where N is predefined or is configured by the base station/higher layer; and when N=0, the method has the same effect as 1);

3) the signal/signaling in which the configuration information of the control region is carried by the UE also carrying a time when the configuration information of the control region starts to be valid, and the UE enabling the UE control region since the start subframe at which the configuration information of the control region starts to be valid, and receiving the downlink transmission according to the configuration information of the control region;

The methods of using different types of control regions in the configuration information of the control region may also be receiving/demodulating/decoding methods for different types of downlink signal/channel, or different types of rate matching methods for downlink transmission, or different types of methods of mapping to resources for downlink transmission.

For example, the method of using the UE control region includes two categories as follows.

(1) The downlink signal/channel is rate matched to all resources or all of OFDM symbols in the subframe, or the downlink signal/channel is rate matched to the combination of the control region and the data region. For example, the downlink signal/channel is rate matched to all of 14 OFDM symbols in the subframe (for a conventional Cyclic Prefix (CP)) or to all of 12 OFDM symbols (for an extended CP).

(2) The downlink signal/channel is rate matched to the data region in the subframe, and resource elements (REs) or OFDM symbols of some data regions are copied to the control region. For example, with a normal CP length, the control region size is N OFDM symbols, the downlink signal/channel is rate matched to the last (14−N) OFDM symbols in the subframe, and predefined N symbols of the 14−N OFDM symbols are copied to the control region, wherein, the predefined N symbols may have one or more predefined modes, and the used predefined mode is indicated in the configuration information of the control region. For example, in a scenario where with a normal CP length, the control region size is 3 OFDM symbols, 1 bit in the configuration information is used for indicating the predefined modes of:

Mode 1, in which the last three symbols, i.e., Symbol 11/12/13, are sequentially, copied to three symbols of the control region, i.e., Symbol 0/1/2;

Mode 2, in which Symbol 4, Symbol 7, and Symbol 11 are sequentially copied to three symbols of the control region, i.e., Symbol 0/1/2.

For (2), when an OFDM symbol for copying to the control region is selected in the system design, one method is selecting an OFDM symbol with a Common Reference Signal (CRS) and/or without a Demodulation Reference Signal (DMRS) to be copied to the control region.

The use of (1) and (2) is predefined, for example, for the PDCCH in USS and PDSCH carrying unicast traffic, the downlink transmission is received according to (1); and for the PDSCH carrying multicast/groupcast/broadcast traffic, for example, the PDSCH carrying the SC-MCCH/SC-MTCH, and the PDCCH in CSS, the downlink transmission is received according to (2). The predefined configuration may avoid impact on reception of the multicast/groupcast/broadcast traffic and detection of the CSS by the existing MTC/NB-IoT UE, and the UE supporting the feature of using the UE control region may correctly use the LTE control region for receiving the downlink traffic.

According to an embodiment of the present disclosure, the use of (1) and (2) is configured by the base station or the higher layer. For example, the base station indicates in the configuration information of the control region that (1) and (2) are used for some specific downlink signals/channels, respectively.

The configuration information of the control region is used for all downlink transmissions, or for a certain type of downlink transmission, that is, a specific downlink signal/channel, wherein, all of the downlink transmissions are transmissions of all downlink signals/channels, or transmission of all downlink signals/channels supporting the feature, or transmission of a predefined set of downlink signals/channels. For example, the predefined set of downlink signals/channels includes the PDCCH and the PDSCH. When the configuration information of the control region is used for all the downlink transmissions, enabling/configuring all the downlink transmissions or predefined one or more downlink signals/channels to use the LTE control region are configured in combination, wherein the configuration information of the control region is used for some type of downlink transmission, that is, the feature of using the UE control region is respectively enabled or configured for different downlink signals/channels. The downlink signal/channel includes at least one of: PDSCH, PDSCH for unicast traffic, and PDSCH for multicast/groupcast/broadcast traffic (including PDSCH carrying SC-MCCH or SC-MTCH), PDCCH in CSS (for example, CSS for monitoring paging, SC-PTM, PDCCH for random access response (RAR), PDSCH scheduled by a control channel in a common search space (for example, PDSCH carrying paging or RAR), PDCCH in USS, PDSCH carrying SI or SIB or a subframe for transmitting the SI or SIB, MIB or a Physical Broadcast Channel (PBCH), Primary Synchronization Signal (PSS), Secondary Synchronization Signal (SSS).

A process of enabling/configuring a feature of using a control region for downlink transmission will be described below in conjunction with several specific examples.

Example (1), enabling of the feature is indicated in the MIB,

In Example (1), the UE obtains the configuration information of the control region indicated in the MIB, and further receives the subframe for transmitting the SI or SIB, the PDSCH, the PDCCH, according to the configuration information of the control region.

In Example (1), the configuration information of the control region is indicated by the MIB, and the indicated configuration information includes 1 hit for indicating that the feature is enabled; and the remaining configuration information of the control information is pre-configured.

According to an embodiment of the present disclosure, the UE obtaining the configuration information of the control region and receiving the downlink transmission according to the configuration information of the control region includes: the UE obtaining the configuration information of the control region from the MIB; after the UE successfully receives the MIB, if the feature is enabled, the UE receiving SIB1 and other SIBs, PDSCH and PDCCH according to the predefined configuration information of the control region.

According to an embodiment of the present disclosure, the UE obtaining the configuration information of the control region and receiving the downlink transmission according to the configuration information of the control region further includes: the UE receiving the downlink transmission according to the predefined configuration information of the control region as follows.

1) For the USS in the PDSCH, PDCCH carrying the unicast traffic, the PDSCH/PDCCH or the subframe in which the PDSCH/PDCCH is transmitted is rate matched to all OFDM symbols in the subframe.

2) For the CSS in PDSCH carrying the multicast traffic (for example, the PDSCH carrying the SC-MCCH or SC-MTCH), PDCCH, the PDSCH/PDCCH or the subframe in Which the PDSCH/PDCCH is transmitted is rate matched to the data region in the subframe. For example, when with a normal CP length, the control region size is N OFDM symbols, the downlink signal/channel is rate matched to the last (14−N) OFDM symbols in the subframe;

the predefined N symbols in the (14−N) OFDM symbols are copied to the control region, for example, Symbols 4, 7 and 11 are sequentially copied to three symbols of the control region, i.e., Symbol 0/1/2.

3) For the PDSCH carrying SI or SIB, or for the subframes transmitting SI or SIB:

the rate matching of the PDSCH or the subframe is the same as that in the existing mechanism, that is, the feature is not used on the PDSCH/subframe; or the rate matching of the PDSCH or the subframe reuses the existing mechanism, and the rate matched OFDM symbol of the PDSCH or the subframe is copied to the control region. For example, the UE assumes that the control domain size is 3 OFDM symbols, the PDSCH or the subframe is rate matched to the last 11 OFDM symbols in the subframe, and Symbols n1/n2/n3 are sequentially copied to the first/second/third OFDM symbols, where n1/n2/n3 are predefined values.

Example (2), enabling of the feature is indicated in the SIB.

In Example (2), the UE obtains the configuration information of the control region indicated in the SIB1 or other SIBs, and further receives the PDSCH, the PDCCH, according to the configuration information of the control region.

In Example (2), the configuration information of the control region is indicated by the SIB, including the SIB1 and other SIBs, and the indicated configuration information includes 1 bit for indicating that the feature is enabled; and the remaining configuration information of the control information is pre-configured.

According to an embodiment of the present disclosure, the UE obtaining the configuration information of the control region and receiving the downlink transmission according to the configuration information of the control region includes: the UE obtains the configuration information of the control region from the SIB; after the UE successfully receives the SIB indicating the configuration information of the control region, if the feature is enabled, the UE receiving PDSCH and PDCCH according to the predefined configuration information of the control region.

According to an embodiment of the present disclosure, the UE obtaining the configuration information of the control region and receiving the downlink transmission according to the configuration information of the control region further includes: the UE receiving the downlink transmission according to the predefined configuration information of the control region as follows.

1) For the USS in the PDSCH, PDCCH carrying the unicast traffic, the PDSCH/PDCCH or the subframe in which the PDSCH/PDCCH is transmitted is rate matched to all OFDM symbols in the subframe.

2) For the CSS iii PDSCH carrying the multicast traffic (for example, the PDSCH carrying the SC-MCCH or SC-MTCH), PDCCH, the PDSCH/PDCCH or the subframe in which the PDSCH/PDCCH is transmitted is rate matched to the data region of the subframe, the predefined N symbols in the data region are copied to the control region.

Example (3), the feature is enabled and configured in the SIB

In Example (3), the UE obtains the configuration information of the control region indicated in the SIB1 or other SIBs, and further receives the PDSCH according to the configuration information of the control region, and/or receives the PDCCH according to the configuration information of the control region.

According to an embodiment of the present disclosure, the UE obtains the configuration information of the control region indicated in the SIB1 or other SIBs, and further receives the PDSCH of the unicast traffic and USS according to the configuration information of the control region, and/or receives the PDCCH of the multicast traffic and the CSS according to the configuration information of the control region.

In Example (3), the configuration information of the control region is indicated by the SIB, including SIB1 and other SIBs.

According to an embodiment of the present disclosure, the configuration information indicated by the SIB includes 2 bits; respectively indicating:

whether the UE control region is enabled for the PDSCH;
whether the UE control region is enabled for the PDCCH.

Alternatively, the configuration information indicated by the SIB includes 2 bits, respectively indicating:

whether the UE control region is enabled for the PDSCH of the unicast traffic and the USS in the PDCCH;

whether the UE control region is enabled for the PDSCH of the multicast traffic, for example, the PDSCH carrying the SC-MCCH/SC-MTCH, and the CSS in the PDCCH.

Alternatively, the configuration information includes 2 bits for indicating the predefined modes of:

Mode 1, in which the feature is enabled for the PDSCH carrying the unicast traffic and the USS in the PDCCH;

Mode 2, in which the feature is enabled for the PDSCH carrying the unicast traffic and the USS in the PDCCH, and the PDSCH carrying the multicast traffic and the CSS in the PDCCH;

Mode 3, in which the feature is enabled for the USS in the PDCCH;

Mode 4, in which the feature is enabled for the USS and CSS in the PDCCH.

According to an embodiment of the present disclosure, the UE obtaining the configuration information of the control region and receiving the downlink transmission according to the configuration information of the control region particularly includes: the UE obtaining the configuration information of the control region from the SIB; after the UE successfully receives the SIB indicating the configuration information of the control region, if the feature is enabled, the LTE receiving PDSCH and PDCCH according to the configuration information of the control region indicated in the SIB and the predefined configuration information of the control region.

According to an embodiment of the present disclosure, the UE obtaining the configuration information of the control region and receiving the downlink transmission according to the configuration information of the control region further includes:

after the UE successfully receives the SIB indicating the configuration information of the control region, if the feature is enabled, the UE obtaining the validation time of the configuration information of the control region indicated in the SIB and/or as predefined, and enabling the feature according to the validation time.

For example, the SIB further includes a valid subframe with several bits for indicating the feature, wherein the valid subframe is an absolute SFN or a subframe number, or a delay value between the SIB transmission subframe and the valid subframe. The UE enables the feature starting from the valid subframe; after the feature is enabled, the UE receives the PDSCH and the PDCCH according to the configuration information of the control region indicated in the SIB and/or as predefined.

According to an embodiment of the present disclosure, the UE obtaining the configuration information of the control region and receiving the downlink transmission according to the configuration information of the control region further includes:

the UE receiving the downlink transmission according to the predefined configuration information of the control region as follows.

1) For the USS in the PDSCH, PDCCH carrying the unicast traffic, the PDSCH/PDCCH or the subframe in which the PDSCH/PDCCH is transmitted is rate matched to all OFDM symbols in the subframe.

2) For the CSS in the PDSCH, PDCCH carrying the multicast traffic, the PDSCH/PDCCH or the subframe in which the PDSCH/PDCCH is transmitted is rate matched to the data region of the subframe, the predefined N symbols in the data region are copied to the control region.

Example (4), in which enabling of the feature and configuration information are indicated in RRC In Example (4), the UE obtains the configuration information of the control region indicated in the RRC signaling, and further receives the USS in the PDSCH and the PDCCH of the unicast traffic according to the configuration information of the control region.

In Example (4), the configuration information of the control region is indicated by the RRC signaling.

The configuration information includes 2 bits, respectively indicating:

whether the UE control region is enabled for the PDSCH of the unicast traffic;

whether the UE control region is enabled for the USS in the PDCCH.

The configuration information also includes 1 bit for indicating that:

the PDSCH/PDCCH is rate matched to all OFDM symbols in the subframe; or, is rate matched to the data region, and one or more predefined OFDM symbols of the data region are copied to the control region, wherein when the control region size is N OFDM symbols, the data region includes the last (M−N) OFDM symbols in the subframe, where M is the total number of symbols in the subframe.

When the PDSCH/PDCCH is rate matched to the data region, and one or more predefined OFDM symbols of the data region are copied to the control region, the configuration information also indicates the mode in which the OFDM symbol is copied.

For example, there are two predefined modes for copying the OFDM symbols: 1) copying Symbols 4/7/11 sequentially to three symbols in the control region; 2) copying Symbols 8/9/10 sequentially to three symbols in the control region. Then, the configuration information further includes 1 bit for indicating two copy modes.

According to an embodiment of the present disclosure, the UE obtaining the configuration information of the control region and receiving the downlink transmission according to the configuration information of the control region includes: the UE obtaining the configuration information of the control region from the RRC signaling; after the UE successfully receives the RRC signaling carrying the configuration information of the control region, if the feature is enabled, the UE receiving PDSCH and PDCCH according to the configuration information of the control region indicated in the RRC signaling and the predefined configuration information of the control region.

According to an embodiment of the present disclosure, the UE obtaining the configuration information of the control region and receiving the downlink transmission according to the configuration information of the control region further includes: the UE receiving the downlink transmission according to configuration information as follows indicated in the RRC signaling: for the USS in the PDSCH, PDCCH carrying the unicast traffic, the PDSCH/PDCCH or the subframe in which the PDSCH/PDCCH is transmitted being rate matched to all the OFDM symbols in the subframe.

According to an embodiment of the present disclosure, the UE obtains the configuration information of the control region and receives the downlink transmission according to the configuration information of the control region. Further, the configuration information obtained by the UE further includes configuration information of the control region in the TDD special subframe, and the UE determines whether to receive the downlink transmission in the TDD special subframe according to the configuration information of the control region in the TDD special subframe. Specifically, the UE determines the number of symbols (e.g., all symbols of the control region+DwPTS) that can be used for receiving the downlink transmission in the TDD special subframe, according to the configuration information of the control information; and receives the downlink transmission in the TDD special subframe when the number of the symbols exceeds a given threshold; otherwise, does not receive the downlink transmission in the TDD special subframe; alternatively, the UE determines whether the control region in the TDD special subframe is enabled according to the configuration information of the control region, and if not enabled; determines whether to receive the downlink transmission in the TDD special subframe according to the existing mechanism; otherwise, determines whether to receive the downlink transmission in the TDD special subframe according to a new predefined criterion (for example, when the control region in the TDD special subframe is enabled, the UE receives the downlink transmission in a new predefined special subframe configuration set).

According to an embodiment of the present disclosure, when receiving the downlink transmission, the UE may drop a part of time domain resources at the start position of time domain resource of the downlink channel in the time slot or subframe. The part of time domain resources include the first N OFDM symbols, where N is greater than or equal to 0, and may be an integer or a non-integer. In one example, the UE drops the first symbol at the start position of time domain resource of the downlink channel in the time slot or subframe, according to the processing time required for re-tuning, or drops a part of the first symbol from start position (e.g., the previous m ms of the first symbol). The UE dropping the part of time domain resources at the start position of time domain resource of the downlink channel in the time slot or subframe includes: the UE assuming that the at least one downlink channel occupies resources starting from the position indicated by the indication information of the time domain resource start position of the at least one downlink channel, but the UE not receiving the downlink transmission on the part of time domain resources; and further includes: the UE assuming that the at least one downlink channel occupying resources starting from the dropped part of time domain resources.

Hereinafter, a flowchart of a method at a base station for downlink transmission according to an exemplary embodiment of the present disclosure will be described in detail with reference to FIG. 18. For the sake of brevity, details which have been previously described in the method 1600 with reference to FIG. 16 are omitted herein.

Figure 18:
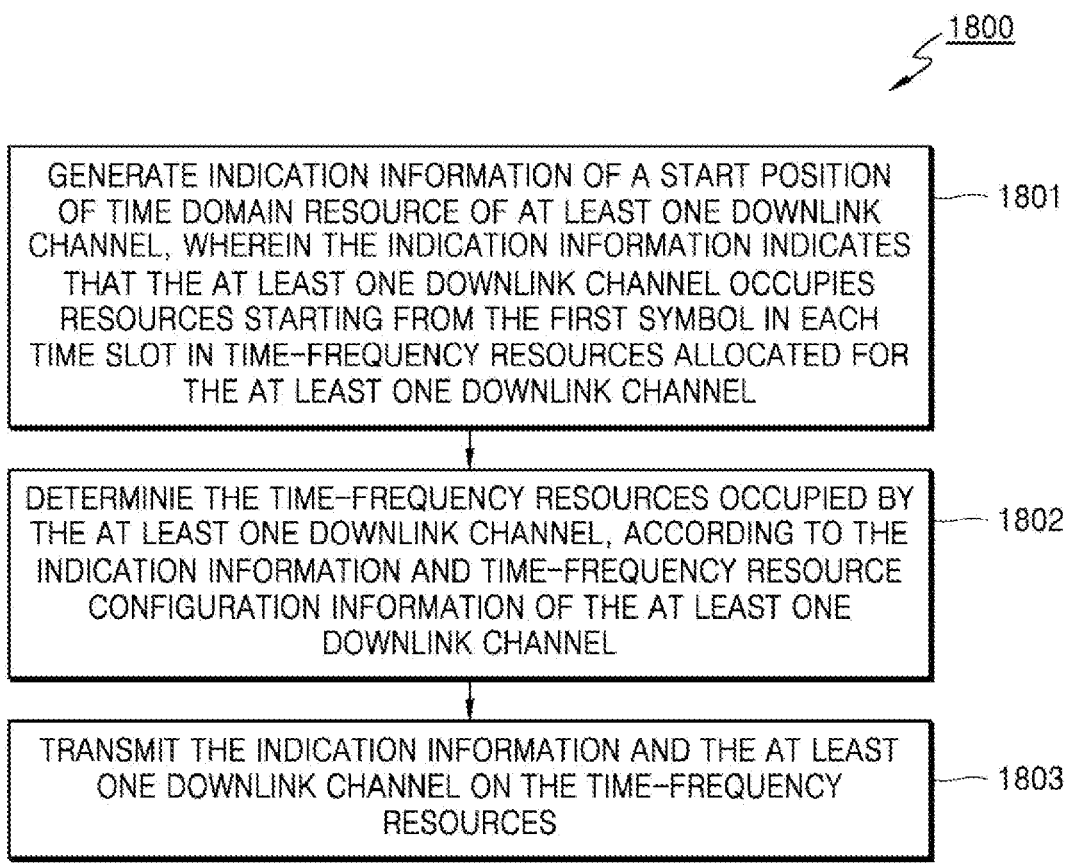
FIG. 18 schematically illustrates a flowchart of a method at a base station for downlink transmission according to an embodiment of the present disclosure.

FIG. 18 schematically illustrates a flowchart of a method 1800 at a base station for downlink transmission according to an exemplary embodiment of the present disclosure. As shown in FIG. 18, the method 1800 may include:

step 1801 of generating indication information of a start position of time domain resource of at least one downlink channel; wherein the indication information indicates that in each time slot in time-frequency resources allocated for the at least one downlink channel, the at least one downlink channel occupies resources starting from the first symbol; or the indication information indicates that in each time slot in time-frequency resources allocated for the at least one downlink channel, the at least one downlink channel occupies resources starting from the second symbol;

step 1802 of determining the time-frequency resources occupied by the at least one downlink channel, according to the indication information and time-frequency resource configuration information of the at least one downlink channel; and step 1803 of transmitting the indication information and the at least one downlink channel on the time-frequency resources.

Hereinafter, a flowchart of a method at a base station for using a control region in downlink transmission according to another exemplary embodiment of the present disclosure will be described in detail with reference to FIG. 19. For the sake of brevity, details which have been previously described in the method 1700 with reference to FIG. 17 are omitted herein.

Figure 19:
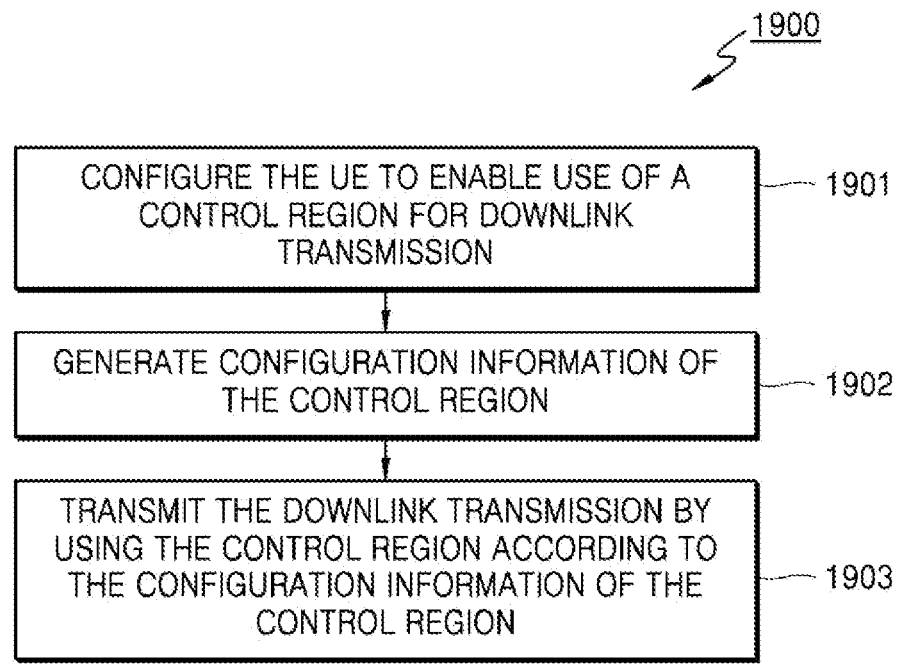
FIG. 19 schematically illustrates a flowchart of a method at a base station for downlink transmission according to an embodiment of the present disclosure.

FIG. 19 schematically illustrates a flowchart of a method 1900 at a base station for using a control region in downlink transmission according to an exemplary embodiment of the present disclosure. As shown in FIG. 19, the method 1900 may include:

step 1901 of configuring, by the base station, the UE to enable use of a control region for downlink transmission;

step 1902 of generating configuration information of the control region; and step 1903 of transmitting the downlink transmission by using the control region according to the configuration information of the control region.

According to an embodiment of the present disclosure, the method 1900 further includes: transmitting the configuration information of the control region to the UE.

Hereinafter, a flowchart of a method at a UE for receiving an NRS on a non-anchor carrier according to an exemplary embodiment of the present disclosure will be described in detail with reference to FIG. 20.

Figure 20:
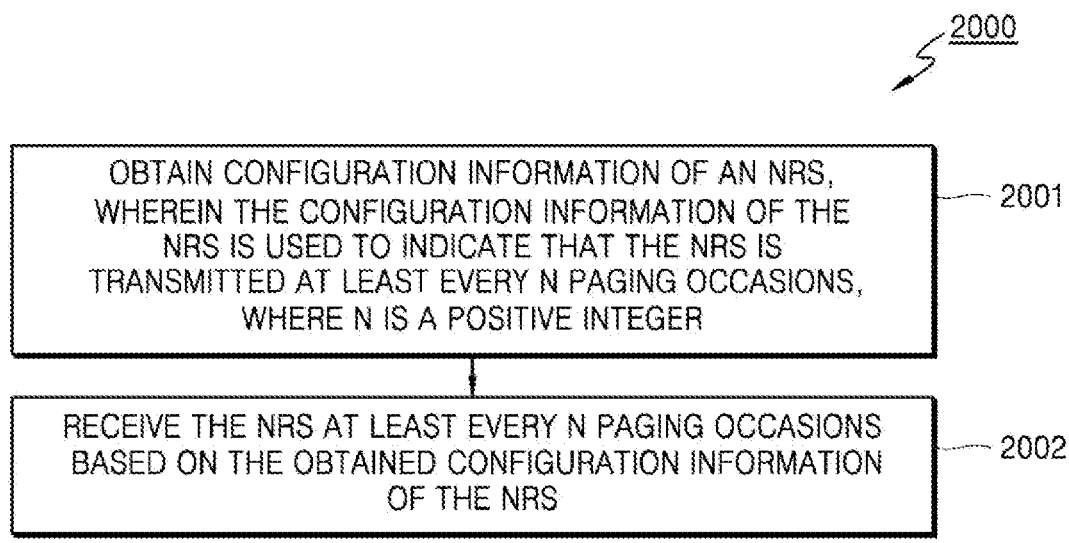
FIG. 20 schematically illustrates a flowchart of a method at a UE of receiving an NRS on a non-anchor carrier according to an embodiment of the present disclosure.

FIG. 20 schematically illustrates a flowchart of a method 2000 at a UE for signal reception according to an exemplary embodiment of the present disclosure. As shown in FIG. 20, the method 2000 may include:

step 2001 of obtaining, by the UE, configuration information of an NRS, wherein the configuration information of the NRS is used to indicate that the NRS is transmitted at least every N paging occasions, where N is a positive integer; and step 2002 of receiving the NRS at least every N paging occasions based on the obtained configuration information of the NRS.

According to an embodiment of the present disclosure, the NRS being transmitted according to the at least ever, N paging occasions and receiving the NRS at least every N paging occasions include: the NRS being transmitted in at least one subframe of a predetermined number (e.g. X) of subframes previous to and a predetermined number (e.g. Y) of subframes next to a search space corresponding to a paging occasion for transmission of the NRS, and subframes occupied by the search space, where X and Y are positive integers selected suitably; and receiving the NRS in at least one subframe of the predetermined number of subframes previous to and a predetermined number of subframes next to the search space corresponding to the paging occasion, and the subframes occupied by the search space.

The introduction of a WUS enables the UE to monitor, before a search space corresponding to each paging occasion, whether there is a WUS transmitted to the UE before monitoring the search space corresponding to each paging occasion; if the UE receives the WUS, the UE monitors the search space; otherwise, it is considered that there is no paging message transmitted to the UE in the search space, and the UE does not monitor the search space. Therefore, when the NRS is transmitted at least every N paging occasions, it may also be transmitted before and after the WUS signal corresponding to the paging occasion for transmission and/or transmitted before or after the search space. Specifically, the position of the WUS signal and the transmission positions of the NRS before and after the corresponding WUS signal may be determined based on the resource positions of the search space and the WUS configuration information (e.g., the value of the gap between the WUS and the corresponding search space).

Figure 24:
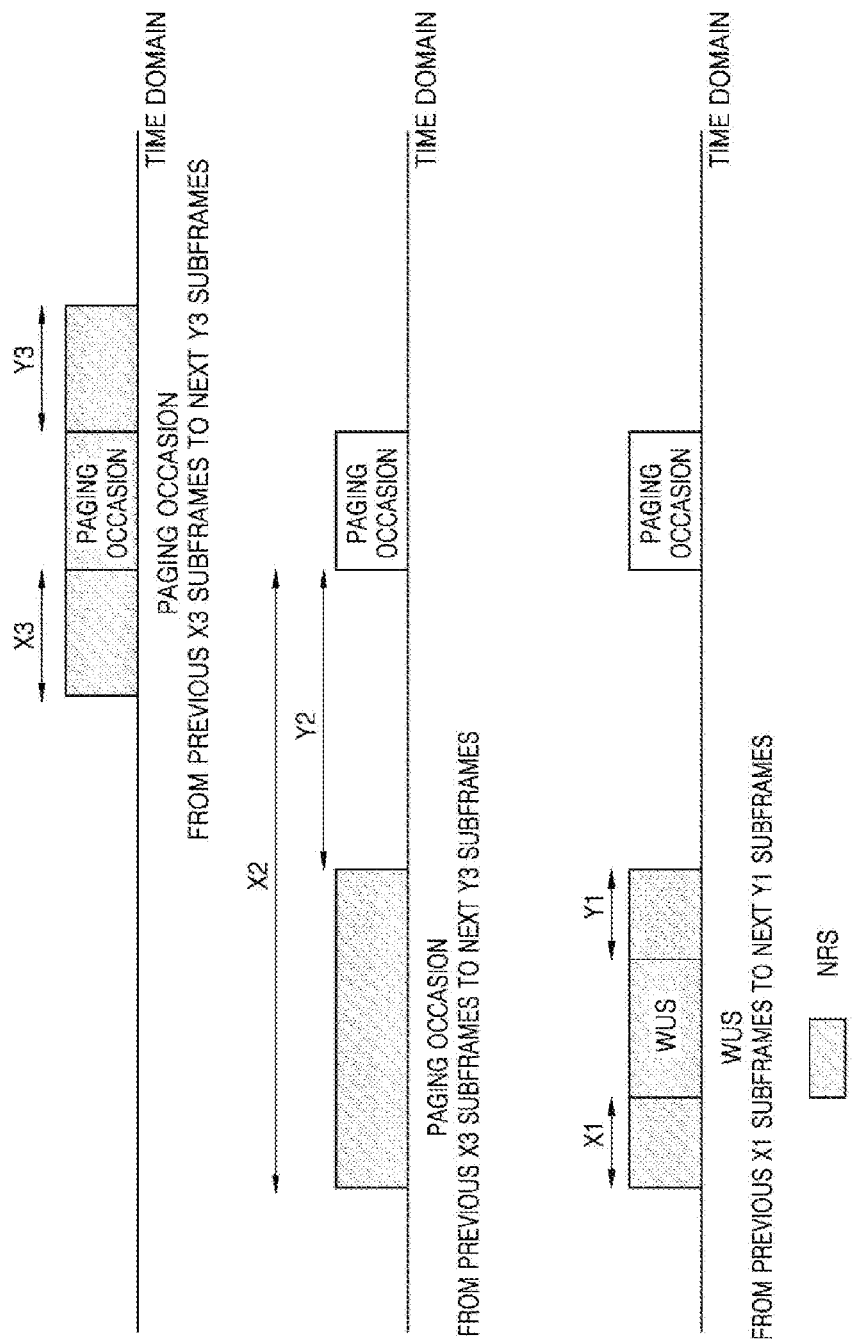
FIG. 24 schematically illustrates a diagram of receiving an NRS on a non-anchor carrier according to an embodiment of the present disclosure.

FIG. 24 shows another method of receiving an NRS on a non-anchor carrier. As shown in FIG. 24, in an exemplary embodiment, the NRS being transmitted at least every N paging occasions and receiving the NRS at least every N paging occasions include:

the NRS being transmitted in a predetermined number (e.g. X1) of subframes previous to and a predetermined number (e.g. Y1) of subframes next to a WUS corresponding to a paging occasion for transmission of the NRS, and in subframes occupied by the WUS, where X1 and Y1 are positive integers; and/or the NRS being transmitted in a predetermined range of subframes (e.g., X2 to Y2 subframes) previous to the search space corresponding to the paging occasion for transmission of the NRS, X2 and Y2 are positive integers, and further, X2 and Y2 are predefined positive integers or positive integers determined according to the configuration information of the WUS, and/or the NRS being transmitted in a predetermined number (e.g. X3) of subframes previous to and a predetermined number e.g. Y3) of subframes next to the search space corresponding to the paging occasion for transmission of the NRS, and in subframes occupied by the search space, where X3 and Y3 are positive integers; and receiving NRS in at least one subframes of:

a predetermined number of subframes previous to and a predetermined number of subframes next to the WUS corresponding to the paging occasion, subframes occupied by the WUS corresponding to the paging occasion, a predetermined range of subframes previous to the search space corresponding to the paging occasion, a predetermined number of subframes previous to and a predetermined number of subframes next to the search space corresponding to the paging occasion, and subframes occupied by the search space corresponding to the paging occasion.

According to an embodiment of the present disclosure, the configuration of the CSS is determined based on all tis that monitor the search space. Therefore, the value of the maximum number of repetitions in the configuration information of the CSS generally corresponds to a decoding success probability of the UE with the worst coverage condition among all the UEs. For the UE that monitors most of the coverage of the search space or has a relatively good link quality, the number of repetitions actually required by decoding the CSS is less than the maximum number of repetitions of the CSS. Therefore, the UE monitoring the search space may be early terminated. For example, the UE estimates the number of repetitions actually required by decoding the CSS according to the link quality, and considers that there is no control message transmitted to the UE in the search space when the difference between the number of monitored subframes and the number of repetitions actually required by decoding the CSS exceeds a given threshold, and terminates the monitoring of the search space. Therefore, for the NRS being transmitted at least every N paging occasions, the UE may also early terminate the reception of the NRS with a similar criterion.

Figure 25:
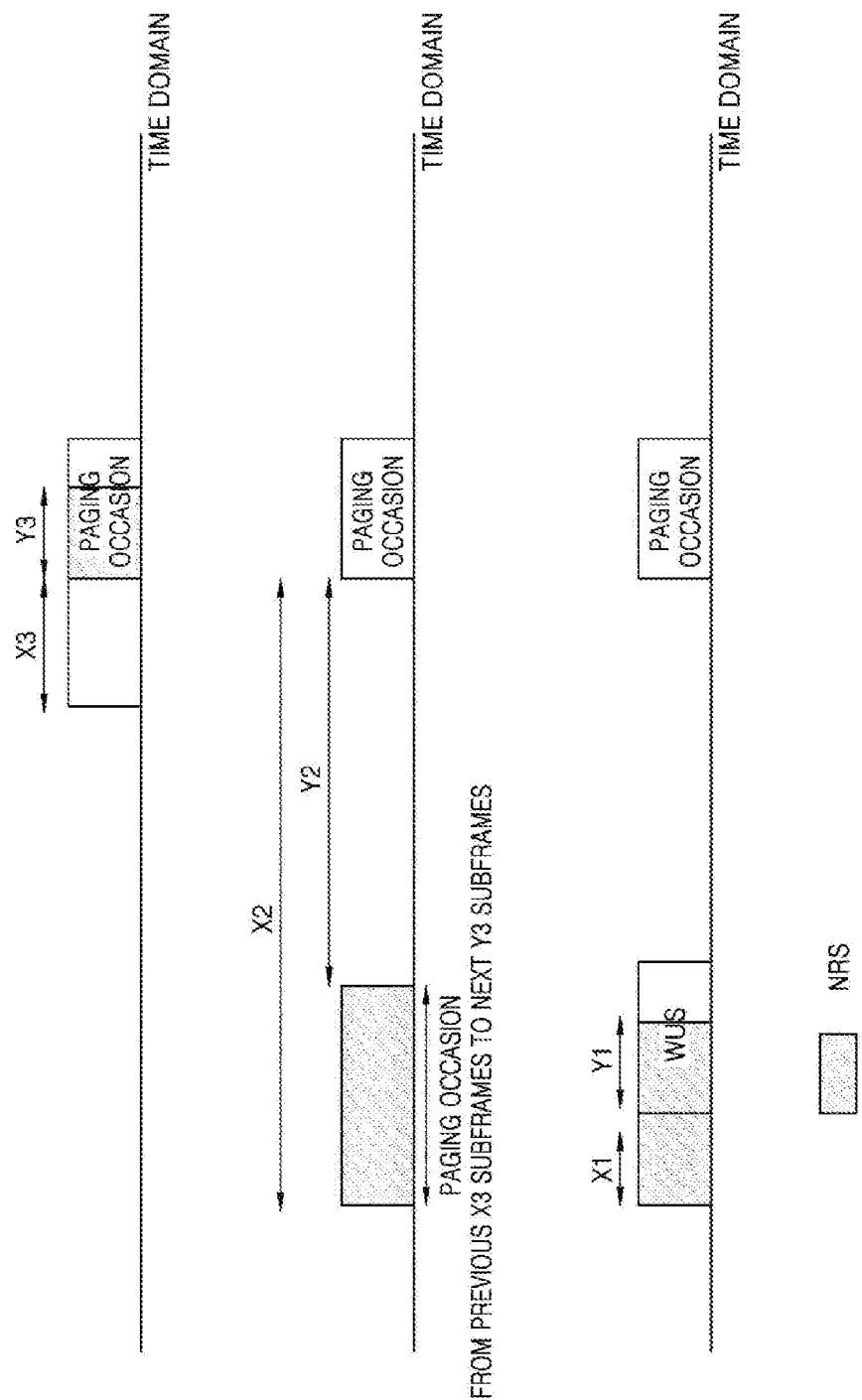
FIG. 25 schematically illustrates a diagram of receiving an NRS on a non-anchor carrier according to an embodiment of the present disclosure.

FIG. 25 shows another method of receiving an NRS on a non-anchor carrier. As shown in FIG. 25, in an exemplary embodiment, the NRS being transmitted at least every N paging occasions and receiving the NRS at least every N paging occasions include:

the NRS being transmitted in a predetermined number (e.g. X1) of subframes previous to the WUS corresponding to the paging occasion for transmission of the NRS, and in a predetermined number (e.g., Y1) of subframes from the start subframe of the WUS; and/or the NRS being transmitted in a predetermined range of subframes (e.g., X2 to Y2 subframes) previous to the search space corresponding to the paging occasion for transmission of the NRS; and/or the NRS being transmitted in a predetermined number (e.g. X3) of subframes previous to the search space corresponding to the paging occasion for transmission of the NRS, and in a predetermined number (e.g., Y3) of subframes from the start subframe of the search space;

where X1, X2, X3, Y1, Y2, and Y3 are all positive integers, X1 and X3 may also be predefined, Y1 and Y3 may also be positive integers determined based on the maximum number (Rmax) of repetitions in the configuration of the search space corresponding to the paging occasion, and X2, Y2 may also be predefined positive integers or positive integers determined according to the configuration information of WUS and/or Rmax; and receiving NRS in at least one subframes of:

a predetermined number of subframes previous to the WUS corresponding to the paging occasion, a predetermined number of subframes from the start subframe of the WUS corresponding to the paging occasion, a predetermined range of subframes previous to the search space corresponding to the paging occasion, a predetermined number of subframes previous to the search space corresponding to the paging occasion, and a predetermined number of subframes from the start subframe of the search space, wherein an example of determining Y1, Y2 and Y3 based on the maximum number (Rmax) of repetitions in the configuration information of the search space corresponding to the paging occasion is that the UE estimates a hypothetical number R of repetitions for decoding the search space based on the result of measurement or channel estimation on the predetermined number (e.g., X1 or X2 or X3) of subframes previous to the transmission of the NRS. The number R of repetitions may be an absolute value; or, the number of repetitions is calculated by multiplying Rmax by a factor, and here, it is the factor that the UE estimates; further, the factor may be selected in a predefined set, for example, {25%, 50%, 75%}, Then, Y1=Y3=R; an example of Y2 is that the UE determines the value of X2 according to the resource position of the search space and the WUS configuration information, where Y2=X2+X0+R, where X0 is a positive integer, and may be a predefined; further, the predefined value satisfies that X2+X0 is a start subframe of the WUS determined according to the WUS configuration information.

In the multiple exemplary embodiments as described above, the position of the NRS transmission is the NRS transmission position assumed by the UE, and the NRS transmission position assumed by the UE may be a subset of all the positions where the base station actually transmits the NRS.

For example, the base station actually transmits the NRS in a predetermined number (e.g., X) of subframes previous to and a subsequent predetermined number (e.g., Y) of subframes next to the search space corresponding to the paging occasion for transmission, and in the subframe occupied by the search space; for the purpose of early terminating the monitoring of the NRS, the UE may assume that the NRS is transmitted in a predetermined number (e.g., X') of subframes previous to the search space, and a predetermined number (e.g., Y') of subframes from the start subframe of the search space.

According to an embodiment of the present disclosure, said receiving the NRS at least every N paging occasions based on the obtained configuration information of the NRS includes: if the UE does not detect a downlink control channel in search spaces corresponding to (N−1) consecutive paging occasions, assuming that the NRS is transmitted at the N-th paging occasion; or determining a time domain resource position for receiving the NRS at every N paging periods based on a predefined or configured SFN and/or subframe number.

According to an embodiment of the present disclosure, the transmission of the NRS is configured by the RRC signaling, that is, the RRC signaling indicates that the NRS is transmitted once every N paging occasions, and the content indicated in the RRC signaling includes at least the value of N, and additionally includes an indication of the way of transmitting the NRS, that is, one of the above two methods.

According to an embodiment of the present disclosure, the paging occasion is a paging occasion of the UE, or a paging occasion of other UEs calculated by the UE according to the existing mechanism. The N paging occasions may be N paging occasions of some UE, or may be a total of N paging occasions of multiple UEs in a group.

In an example, if the UE does not detect the downlink control channel in the search space corresponding to (N−1) consecutive paging occasions of the UE itself, it is assumed that the NRS is transmitted at the N-th paging occasion of the UE itself. In another example, if the UE does not detect the downlink control channel in the search space corresponding to (N−1) consecutive paging occasions of the UE itself, it is assumed that the NRS is transmitted at the paging occasion of another UE in the N-th paging period, or one or more paging occasions corresponding to some UEs.

In the actual system, when the base station actually transmits the NRS, the DRX period may be used as a reference time point for the NRS transmission. For example, in each DRX period, the base station transmits one or more sets of NRSs, and the position of each group of NRSs is determined based on the paging occasion of the UE in the DRX period, and/or determined based on the starting position of the DRX period. The base station may transmit the NRS at each paging occasion in the DRX period, or may transmit the NRS at some one or more paging occasions in the DRX period.

According to an embodiment of the present disclosure, the base station transmits the NRS on a set of paging occasions in each DRX period. The set of paging occasions includes one or more paging occasions, and the one or more paging occasions are determined by the base station according to configuration information of the DRX period (for example, a DRX period start time domain position), or are all the paging occasions corresponding to all UEs of a UE set which includes one or more UEs.

In an example, the base station transmits the NRS at the first paging occasion of the DRX period. In another example, the base station transmits the NRS at all paging occasions corresponding to all the UEs of a UE set which is selected by the base station in each DRX period. In another example, the base station transmits the NRS at all paging occasions in each DRX period.

Hereinafter, a flowchart of a method at a base station for transmitting an NRS on a non-anchor carrier according to an exemplary embodiment of the present disclosure will be described in detail with reference to FIG. 21. For the sake of brevity, details already detailed in the method 2000 as previously described with reference to FIG. 20 are omitted herein.

Figure 21:
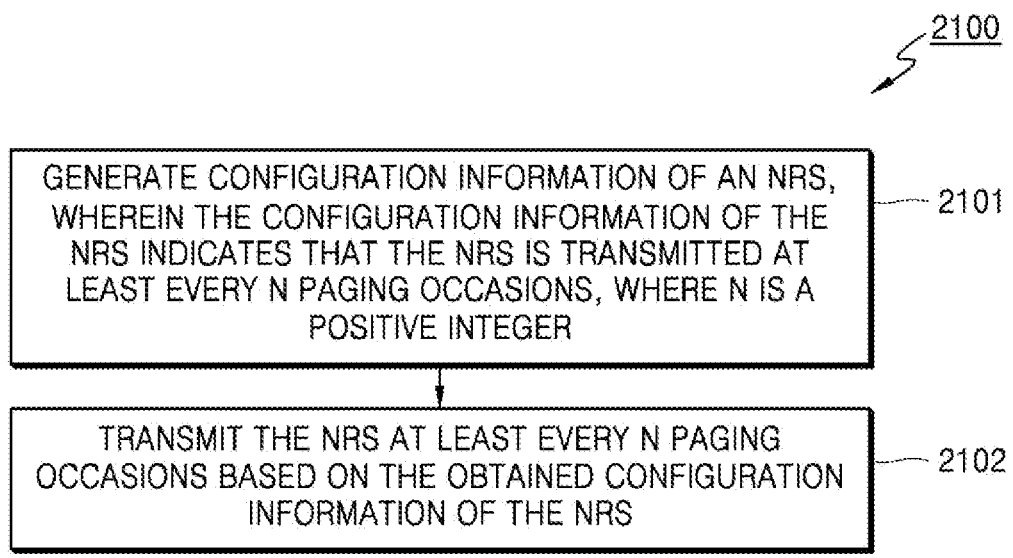
FIG. 21 schematically illustrates a flowchart of a method at a base station of transmitting an NRS on a non-anchor carrier according to an embodiment of the present disclosure.

FIG. 21 schematically illustrates a flowchart of a method 2100 at a base station of transmitting an NRS on a non-anchor carrier according to an exemplary embodiment of the present disclosure. As shown in FIG. 21, the method 2100 may include:

step 2101 of generating, by the base station, configuration information of an NRS, wherein the configuration information of the NRS indicates that the NRS is transmitted at least every N paging occasions, where N is a positive integer; and step 2102 of transmitting, by the base station, the NRS at least every N paging occasions based on the obtained configuration information of the NRS.

According to an embodiment of the present disclosure, the method 2100 further includes: transmitting the configuration information of the NRS to the UE.

According to an embodiment of the present disclosure, the NRS being transmitted at least every N paging occasions and transmitted the NRS at least every N paging occasions include: the NRS being transmitted in at least one subframe of a predetermined number (e.g. X) of subframes previous to and a predetermined number (e.g. Y) of subframes next to a search space corresponding to a paging occasion for transmission of the NRS, and subframes occupied by the search space, where X and Y are positive integers selected suitably; and transmitting the NRS in at least one subframe of the predetermined number of subframes previous to and a predetermined number of subframes next to the search space corresponding to the paging occasion, and the subframes occupied by the search space.

In the UE system, when the UE receives a TA command in Subframe n, the UE transmits, in Subframe (n+4), the HARQ-ACK feedback for the downlink shared channel PDSCH which carries the TA command, and adjusts the TA in Subframe (n+6), and resets the TA timer. Therefore, for the UE system, the transmission of the HARQ-ACK feedback is performed before the adjustment of the TA; thereby, it can be determined that the TA used for the transmission of the HARQ-ACK feedback is the old TA before the adjustment.

However, in the NB-IoT system, when the UE receives the TA command in Subframe n, the UE transmits HARQ-ACK feedback for the downlink shared channel NPDSCH carrying the TA command, and the earliest transmission time is after the end of Subframe (n+12). Moreover, after the end of Subframe n+12), corresponding TA adjustment is applied at the first available NB-IoT time slot for the NPUSCH transmission. Since the HARQ-ACK feedback in the NB-IoT system is transmitted on the uplink shared channel NPUSCH (using the NPUSCH format 2), the TA of the HARQ-ACK feedback also belongs to the range to be adjusted, and since the earliest possible time point of the HARQ-ACK feedback is the same as the time point of the TA adjustment, it is thus necessary to design a method for determining whether the HARQ-ACK feedback of the NPDSCH carrying the TA command requires the TA adjustment.

A flowchart of a method at a UE for adjusting a TA according to an exemplary embodiment of the present disclosure will be described in detail with reference to FIG. 27.

Figure 27:
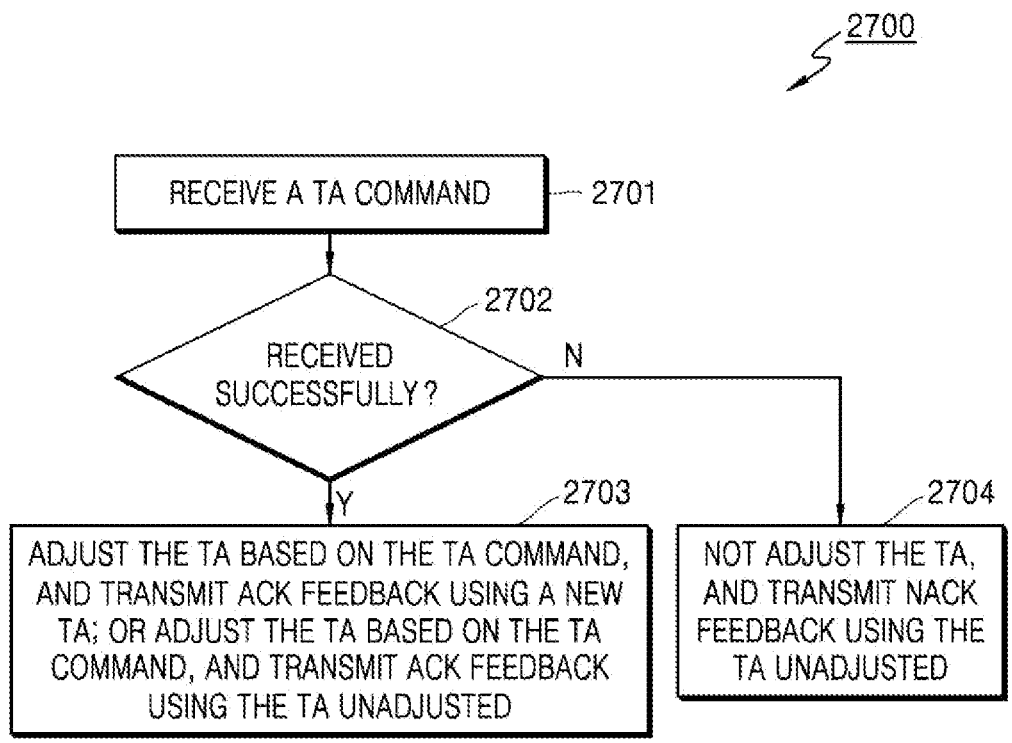
FIG. 27 schematically illustrates a flowchart of a method at a UE of adjusting a TA according to an embodiment of the present disclosure.

FIG. 27 schematically illustrates a flowchart of a method 2700 at a UE for adjusting a TA according to an exemplary embodiment of the present disclosure. As shown in FIG. 27, the method 2700 may include:

Step 2701 of receiving, by the UE, a TA command;

Step 2702 of determining, by the UE, whether the TA command is received successfully; and in a case of successfully receiving the TA command ("Yes" from Step 2702), the method proceeds to Step 2703, in which the UE adjusts the TA based on the TA command, and transmits ACK feedback using the new TA, or adjusts the TA based on the TA command, and transmits ACK feedback using the TA unadjusted;

in a case of failure in receiving the TA command ("NO" from Step 2702), the method proceeds to Step 2704, in which the UE does not adjust the TA, and transmits the TACK feedback using the TA unadjusted.

According to an embodiment of the present disclosure, said adjusting the TA based on the TA command includes: determining a resource position for adjusting the TA based on a transmission resource of the TA command and/or a transmission resource of HARQ-ACK feedback corresponding to a PDSCH that carries the TA command; and adjusting the TA at the corresponding resource position; and/or adjusting, based on a type of uplink transmission for adjusting the TA, the TA for the corresponding type of uplink transmission.

According to an embodiment of the present disclosure, the adjusting, based on the type of uplink transmission for adjusting the TA, the TA for the corresponding type of uplink transmission includes: adjusting, based on a type of an uplink channel/signal corresponding to the resource position for adjusting the TA, the TA for the uplink transmission of the corresponding channel/signal, or adjusting the TA on the corresponding type of resource.

According to an embodiment of the present disclosure, the TA command is carried on a downlink shared channel PDSCH, and the ACK feedback and/or NACK feedback is HARQ-ACK feedback on the PDSCH carrying the TA command.

According to an embodiment of the present disclosure, in the case where the TA command is received successfully and the reception of the TA command ends at Subframe n, the resource position at which the TA adjustment is performed starts from the first available uplink time slot after the end of Subframe (n+12), and the type of the uplink transmission channel/signal corresponding to the resource position for performing the TA adjustment is the PUSCH transmission and/or PUCCH transmission. Specifically, the first available uplink time slot is the first time slot of the PUSCH transmission and/or PUCCH transmission.

According to an embodiment of the present disclosure, if the UE successfully receives the TA command, and the reception of the TA command ends at Subframe n, the corresponding uplink transmission time adjustment should be started from the first available uplink time slot after the end of Subframe (n+12), and the first available uplink time slot is the first time slot of one PUSCH transmission and/or PUCCH transmission (i.e., the type of uplink transmission for TA adjustment); and the UE starts the PUSCH transmission and/or PUCCH transmission carrying the ACK response after the end of Subframe (n+k0−1) (for example using the NPUSCH format 2).

According to an embodiment of the present disclosure, regarding the first available uplink time slot is the first time slot of one PUSCH transmission and/or PUCCH transmission, the one PUSCH transmission and/or PUCCH transmission includes a PUSCH transmission and/or PUCCH transmission carrying HARQ-ACK feedback, specifically, including a PUCCH transmission and/or PUSCH transmission carrying ACK feedback (also referred to as "ACK response") in the HARQ-ACK feedback corresponding to the PDSCH of the TA command, e.g., an NPUSCH format 2 transmission carrying the ACK feedback in the HARQ-ACK feedback corresponding to the PDSCH of the TA command.

According to an embodiment of the present disclosure, the one PUSCH transmission and/or PUCCH transmission does not include the PUSCH transmission and/or PUCCH transmission carrying the HARQ-ACK feedback, for example, including the NPUSCH format 1, but not including the NPUSCH format 2.

According to an embodiment of the present disclosure, the one PUSCH transmission and/or PUCCH transmission includes a PUSCH transmission and/or PUCCH transmission carrying the HARQ-ACK feedback, but does not include a PUSCH transmission and/or PUCCH transmission carrying the ACK feedback in the HARQ-ACK feedback corresponding to the PDSCH of the TA command.

According to an embodiment of the present disclosure, the PUSCH transmission includes a PUSCH transmission that carries the ACK feedback in the HARQ-ACK feedback corresponding to the PDSCH of the TA command. When k0 is greater than or equal to 13 (for example, in the existing mechanism, the possible value of k0 is 13, 15, 17, 18, 21), the time of the PUSCH transmission carrying the ACK/NACK response corresponding to the PDSCH of the TA command is not earlier than the time when the uplink transmission time is adjusted. Therefore, the first available uplink time slot is the first time slot of the PUSCH transmission, including the case of the first available uplink time slot being the first slot of the PUSCH transmission carrying the ACK/NACK response corresponding to the PDSCH of the TA command. Thus, if the UE successfully receives the TA command, the PUSCH transmission used for the ACK response corresponding to the PDSCH of the TA command uses the new TA indicated in the TA command; otherwise, if the UE fails to successfully receive the TA command, the PUSCH transmission used for the NACK response corresponding to the PDSCH of the TA command uses the unadjusted old TA.

According to an embodiment of the present disclosure, the PUSCH transmission and/or PUCCH transmission does not include the PUSCH transmission and/or PUCCH transmission carrying the HARQ-ACK feedback, or the PUSCH transmission and/or PUCCH transmission includes the PUSCH transmission and/or PUCCH transmission carrying the HARQ-ACK feedback, but does not include the PUSCH transmission and/or PUCCH transmission carrying the ACK feedback in the HARQ-ACK feedback corresponding to the PDSCH of the TA command, Therefore, the PUSCH transmission used for the ACK/NACK response corresponding to the PDSCH of the TA command uses the unadjusted old TA.

According to an embodiment of the present disclosure, when the UE successfully receives the TA command, and the reception of the TA command ends at Subframe n, the corresponding uplink transmission time adjustment should be started from the first available uplink time slot after the end of Subframe (n+n0); and the UE starts the PUSCH transmission carrying the ACK response after the end of Subframe (n+k0−1) (for example, using the NPUSCH format 2), the PUSCH transmission carrying the ACK response using N consecutive subframes, where n0 is a positive integer, and n0>=k0−1+N, Therefore, the PUSCH transmission used for the HARQ-ACK response corresponding to the PDSCH of the TA command has been completed at the end of Subframe (n+n0), that is, the corresponding uplink transmission time adjustment is performed after the PUSCH transmission used for the HARQ-ACK response of the PDSCH command of the TA command is completed; therefore, the PUSCH transmission used for the HARQ-ACK response corresponding to the PDSCH of the TA command uses the unadjusted old TA.

According to an embodiment of the present disclosure, when the UE successfully receives the TA command, and the reception of the TA command ends at Subframe n, the UE starts the PUSCH transmission carrying the ACK response in the HARQ-ACK feedback after the end of Subframe (n+k0−1) (e.g. using the NPUSCH format 2).

And, the PUSCH transmission carrying the ACK response in the HARQ-ACK feedback starts or ends at Subframe n'.

And, the corresponding uplink transmission time adjustment should be started from the first available uplink time slot after the end of Subframe (n'+12), and the first available uplink time slot is the first time slot of one PUSCH transmission, where Subframe n' is the start subframe or end subframe of the PUSCH transmission carrying the ACK response in the HARQ-ACK feedback, and the ACK response corresponds to the PDSCH transmission carrying the TA command.

According to an embodiment of the present disclosure, the UE fails to successfully receive the TA command, and the reception ends at Subframe n; and the UE starts the PUCCH transmission and/or PUSCH transmission carrying the NACK response after the end of Subframe (n+k0−1) (e.g., using the NPUSCH format 2). Since the UE fails to successfully decode to obtain the content indicated by the TA command, the PUCCH transmission and/or PUSCH transmission carrying the NACK response uses the unadjusted old TA.

According to an embodiment of the present disclosure, the TA adjustment includes:

Step 1, in which the UE receives a TA command transmitted by the base station without additional padding (that is, the transmission block size TBS=16), and the UE starts the TA timer and sets it as a predetermined value of the TA timer; specifically, regardless of whether the TA command is received successfully or not, the UE starts the TA timer and sets it as the predetermined value of the TA timer, or starts the TA timer and sets it as the predetermined value of the TA timer only after the TA command is received successfully; the TA index indicated by the TA command is 31, and the corresponding actual TA adjustment amount is 0, that is, indicating that the TA is not adjusted;

Step 2; in which the UE detects whether to transmit HARQ-ACK feedback of the TA command in Step 1, and transmits the HARQ-ACK feedback; specifically, when the TA command is received successfully, the ACK feedback is transmitted, and the TA of the ACK feedback is an adjusted new TA, but the adjustment amount is 0, that is, the actual TA value does not change; otherwise, when the TA command is received unsuccessfully, the NACK feedback is transmitted, and the TA of the NACK feedback is unadjusted;

Step 3, in which after a period of time, the UE receives another TA command transmitted by the base station, including the MAC PDU (8 bits) of the TA and the padding of 1 byte (that is, TBS=24); the UE restarts the TA timer and sets it as a predetermined value of the TA timer; specifically, regardless of whether the TA command is received successfully or not, the UE restarts the TA timer and sets it as the predetermined value of the TA timer, or restarts the TA timer and sets it as the predetermined value of the TA timer only after the TA command is received successfully; the TA index indicated by the TA command is 63; and the corresponding actual TA adjustment amount is a positive number, that is, leading to the adjusted TA to be a new TA value;

Step 4, in which the UE detects whether to transmit the HARQ-ACK feedback of the TA command in Step 3, and transmits the HARQ-ACK feedback. Specifically, when the TA command is successfully received, the ACK feedback is transmitted, and the TA of the ACK feedback is the adjusted new TA, and the adjustment amount is the TA adjustment value corresponding to the TA index 63, that is, the adjusted TA is a new TA value; otherwise, when the TA command is received unsuccessfully, the NACK feedback is transmitted, and the TA of the NACK feedback is unadjusted;

Step 5, in which the UE detects whether to transmit an RLC status PDU for acknowledging the reception of the RLC PDU carrying the TA command in Step 3, and transmits the RLC status PDU.

Step 6, in which the UE waits for the TA tuner to expire at the UE side.

Figure 22:
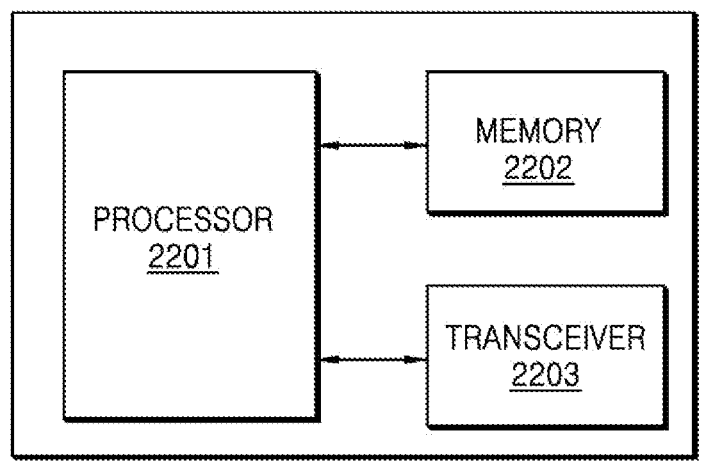
FIG. 22 schematically shows a structural block diagram of a UE according to an embodiment of the present disclosure.

Hereinafter, a structure of a UE according to an exemplary embodiment of the present disclosure will be described in detail with reference to FIG. 22. FIG. 22 schematically shows a structural block diagram 2000 of a UE according to an exemplary embodiment of the present disclosure. The UE 2200 may be used to perform the method 100 as previously described with reference to FIG. 1, the method 1600 described with reference to FIG. 16, the method 1700 described with reference to FIG. 17, the method 2000 described with reference to FIG. 20, and the method 2700 described with reference to FIG. 27.

As shown in FIG. 22, the UE 2200 includes a processor (processing unit or controller) 2201, which may be a single unit or a combination of multiple units for performing different steps of the methods of the present disclosure; a memory 2202 storing computer executable instructions, which, when executed by the processor 2201, cause the HE 2200 to perform the method of the present disclosure. Furthermore, the UE 2200 may further include a transceiver 2203. However, all of the illustrated components are not essential. The UE 2200 may be implemented by more or less components than those illustrated in FIG. 22. In addition, the processor 2201, memory 2202 and transceiver 2203 may be implemented as a single chip according to another embodiment. For the sake of brevity, only a schematic structure of the UE according to the exemplary embodiment of the present disclosure will be described herein, and details which have been described previously in the method 100 with reference to FIG. 1, the method 1600 described with reference to FIG. 16, the method 1700 described with reference to FIG. 17, and the method 2000 described with reference to FIG. 20, and the method 2700 described with reference to FIG. 27 will thus be omitted.

The aforementioned components will now be described in detail.

The processor 2201 may include one or more processors or other processing devices that control the proposed function, process, and/or method. Operation of the UE 2200 may be implemented by the processor 2201.

In an embodiment in which the instructions, when executed by the processor 2201, cause the UE 2200 to perform the method 100 of FIG. 1, the instructions cause the UE 2200 to:

receive and/or transmit a transport block according to information for scheduling multiple transport blocks.

In an exemplary embodiment, the instructions further cause the UE 2200 to transmit and/or receive ACK/NACK feedback for multiple transport blocks.

In an embodiment in which the instructions, when executed by the processor 2201, cause the UE 2200 to perform the method 1600 of FIG. 16, the instructions cause the UE 2200 to:

obtain indication information of a start position of time domain resource of at least one downlink channel, wherein the indication information indicates that in each time slot in time-frequency resources allocated for the at least one downlink channel, the at least one downlink channel occupies resources starting from the first symbol or the second symbol;

determine the time-frequency resources occupied by the at least one downlink channel, according to the indication information and time-frequency resource configuration information of the at least one downlink channel; and decode the at least one downlink channel on the time-frequency resources.

In an embodiment in which the instructions, when executed by the processor 2201, cause the UE 2200 to perform the method 1700 of FIG. 17, the instructions cause the UE 2200 to:

enable the use of use of a control region for downlink transmission;

obtain configuration information of the control region; and receiving the downlink transmission by using the control region according to the obtained configuration information of the control region.

In an embodiment in which the instructions, when executed by the processor 2201, cause the UE 2200 to perform the method 2000 of FIG. 20, the instructions cause the UE 7700 to:

obtain configuration information of a Narrowband Reference Signal 'NRS', wherein the configuration information of the NRS is used to indicate that the NRS is transmitted at least every N paging occasions, where N is a positive integer; and receive the NRS at least every N paging occasions based on the obtained configuration information of the NRS.

In an exemplary embodiment in which the instructions, when executed by the processor 2201, cause the UE 2200 to perform the method 2700 of FIG. 27, the instructions cause the UE 2200 to:

receiving a TA command; and in a case of successfully receiving the TA command, adjusting the TA based on the TA command, and transmitting ACK feedback using a new TA; or adjusting the TA based on the TA command, and transmitting ACK feedback using the TA unadjusted; and in a case of unsuccessfully receiving the TA command, not adjusting the TA, and transmitting NACK feedback using the TA unadjusted.

The memory 2202 may store the control information or the data included in a signal obtained by the UE 2200. The memory 2202 may be connected to the processor 2201 and store at least one instruction or a protocol or a parameter for the proposed function, process, and/or method. The memory 2202 may include read-only memory (ROM) and/or random access memory (RAM) and/or hard disk and/or CD-ROM and/or DVD and/or other storage devices.

The transceiver 2203 may include a RF transmitter for up-converting and amplifying a transmitted signal, and a RF receiver for down-converting a frequency of a received signal. However, according to another embodiment, the transceiver 2203 may be implemented by more or less components than those illustrated in components.

The transceiver 2203 may be connected to the processor 2201 and transmit and/or receive a signal. The signal may include control information and data. In addition, the transceiver 2203 may receive the signal through a wireless channel and output the signal to the processor 2201. The transceiver 2203 may transmit a signal output from the processor 2201 through the wireless channel.

Figure 23:
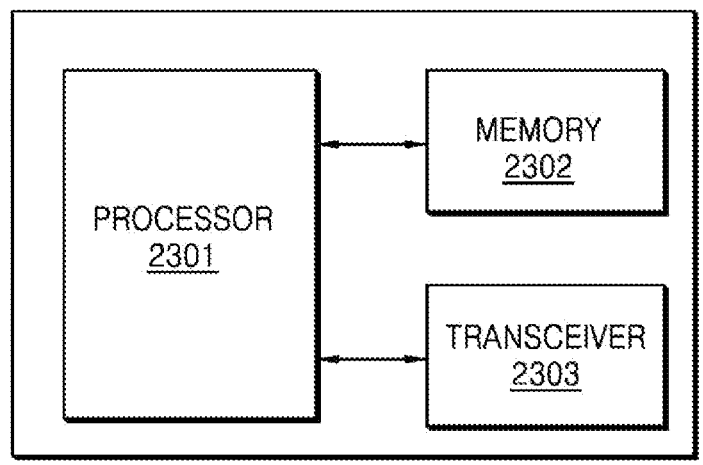
FIG. 23 schematically shows a structural block diagram of a base station according to an embodiment of the present disclosure.

Hereinafter, a structure of a base station according to an exemplary embodiment of the present disclosure will be described in detail with reference to FIG. 23, FIG. 23 schematically shows a structural block diagram of a base station 2300 according to an exemplary embodiment of the present disclosure. The base station 2300 may be used to perform the method 1500 as previously described with reference to FIG. 15, the method 1800 described with reference to FIG. 18, the method 1900 described with reference to FIG. 19, and the method 2100 described with reference to FIG. 21.

As shown in FIG. 23, the base station 2300 includes a processor (processing unit or controller) 2301, which ay be a single unit or a combination of multiple units for performing different steps of the methods of the present disclosure; a memory 2302 storing computer executable instructions, which, when executed by the processor 2301, cause the base station 2300 to perform the method of the present disclosure. Furthermore, the base station 2300 may further include a transceiver 2303. However, all of the illustrated components are not essential. The base station 2300 may be implemented by more or less components than those illustrated in FIG. 23, In addition, the processor 2301, memory 2202 and transceiver 2303 may be implemented as a single chip according to another embodiment. For the sake of brevity, only a schematic structure of the base station according to the exemplary embodiment of the present disclosure will be described herein, and details which have been described previously in the method 1500 with reference to FIG. 15, the method 1800 described with reference to FIG. 18, the method 1900 described with reference to FIG. 19, and the method 2100 described with reference to FIG. 21 will thus be omitted.

The aforementioned components will now be described in detail.

The processor 2301 may include one or more processors or other processing devices that control the proposed function, process, and/or method. Operation of the base station 2300 may be implemented by the processor 2301.

In an embodiment in which the instructions, when executed by the processor 2301, cause the base station 2300 to perform the method 1500 of FIG. 15, the instructions cause the base station 2300 to:

receive and/or transmit a transport block according to information for scheduling multiple transport blocks.

In an embodiment, the instructions further cause the base station 2300 to transmit and/or receive ACK/NACK feedback for multiple transport blocks.

In an embodiment in which the instructions, when executed by the processor 2301, cause the base station 2300 to perform the method 1800 of FIG. 18, the instructions cause the base station 2300 to:

generate indication information of a start position of time domain resource of at least one downlink channel, where the indication information indicates that in each time slot in time-frequency resources allocated for the at least one downlink channel, the at least one downlink channel occupies resources starting from the first symbol or the second symbol;

determine the time-frequency resources occupied by the at least one downlink channel, according to the indication information and time-frequency resource configuration information of the at least one downlink channel; and transmit the indication information and the at least one downlink channel on the time-frequency resources.

In an embodiment in which the instructions, when executed by the processor 2301, cause the base station 2300 to perform the method 1900 of FIG. 19, the instructions cause the base station 2300 to:

configure the UE to enable use of a control region for downlink transmission;

generate configuration information of the control region;

transmit the downlink transmission by using the control region according to the configuration information of the control region.

In an embodiment in which the instructions, when executed by the processor 2301, cause the base station 2300 to perform the method 2100 of FIG. 21, the instructions cause the base station 2300 to:

generate configuration information of an NRS, wherein the configuration information of the NRS indicates that the NRS is transmitted at least every N paging occasions, wherein N is a positive integer; and transmit the NRS at least every N paging occasions based on the obtained configuration information of the NRS.

The memory 2302 may store the control information or the data included in a signal obtained by the base station 2300. The memory 2302 may be connected to the processor 2301 and store at least one instruction or a protocol or a parameter for the proposed function, process, and/or method. The memory 2302 may include read-only memory (ROM) and/or random access memory (RAM) and/or hard disk and/or CD-ROM and/or DVD and/or other storage devices.

The transceiver 2303 may include a RF transmitter for up-converting and amplifying a transmitted signal, and a RF receiver for down-converting a frequency of a received signal. However, according to another embodiment, the transceiver 2303 may be implemented by, more or less components than those illustrated in components.

The transceiver 2303 may be connected to the processor 2301 and transmit and/or receive a signal. The signal may include control information and data. In addition, the transceiver 2303 may receive the signal through a wireless channel and output the signal to the processor 2301. The transceiver 2303 may transmit a signal output from the processor 2201 through the wireless channel.

The programs running on the device according to the present disclosure may be programs that enable the computer to implement functions of the embodiments of the present disclosure by controlling a central processing unit (CPU). The programs or information processed by the programs may be temporarily stored in a volatile memory, such as a random access memory (RAM), a hard disk drive (HDD), a non-volatile memory (e.g., flash memory), or other memory system.

The programs for realizing the functions of the embodiments of the present disclosure may be recorded on a computer-readable recording medium. Corresponding functions can be realized by making the computer system read the programs recorded on the recording medium and execute these programs. The so-called "computer system" herein may be a computer system embedded in the device, and may include an operating system or hardware, such as a peripheral device. The "computer-readable recording medium" may be a semi-conductor recording medium, an optical recording medium, a magnetic recording medium, a recording medium for a short-time dynamic storage program, or any other computer readable recording medium.

Various features or functional blocks of the device used in the above embodiments may be implemented or executed by circuitry (e.g., monolithic or multi-chip integrated circuits). The circuitry designed to perform the functions described in this specification may include general purpose processors, digital signal processors (DSPs), application specific integrated circuits (ASICs), field programmable gate arrays (FPGAs), or other programmable logic devices, discrete gate or transistor logic, discrete hardware components, or any combination of the above devices. The general purpose processor may be a microprocessor or any existing processor, controller, microcontroller, or state machine. The circuit may be a digital circuit or an analog circuit. One or more embodiments of the present disclosure may also be implemented using these new integrated circuit techniques in the event of a new integrated circuit technology that replaces existing integrated circuits due to advances in semiconductor technology.

As described above, the embodiments of the present disclosure have been described in detail with reference to the accompanying drawings. However, the specific structure is not limited to the above-described embodiments, and the present disclosure also includes any design modifications that do not depart from the spirit of the present disclosure. In addition, various modifications may be made to the present disclosure within the scope of the claims, and the embodiments obtained by appropriate combinations of the technical means disclosed in the different embodiments are also included within the technical scope of the present disclosure. In addition, the components having the same effects described in the above embodiments may be substituted for each other.

The foregoing descriptions are only preferred embodiments of the present disclosure and a description of the technical principles of the present disclosure. It should be understood by the skilled in the art that the scope of the present disclosure recited in this application is not limited to the particular combinations of the above technical features and should also cover other technical solutions formed by any combinations of the technical features described above or their equivalent features without departing from the inventive concept. For example, the technical solutions formed by the above mentioned features being interchangeable with, but not limited to, technical features having similar functions as disclosed in this application.

What is claimed is:

1. A method performed by a user equipment (UE) in a wireless communication system, the method comprising:
  receiving, from a base station (BS), downlink control information (DCI) including scheduling information with respect to multiple physical downlink shared channels (PDSCHs) related to downlink data; and
  receiving, from the BS, the multiple PDSCHs, based on the DCI,
  wherein the DCI includes a new data indicator (NDI) field, and a number of bits of the NDI field is associated with a number of the multiple PDSCHs scheduled by the DCI, and
  wherein the DCI further includes time interval information between a transmitting time for feedback information and a receiving time for the multiple PDSCHs.

2. The method of claim 1, further comprising:
  receiving a radio resource control (RRC) message including scheduling information related to time domain with respect to the multiple PDSCHs.

3. The method of claim 1, wherein the bits of the NDI field indicate NDI values of the multiple PDSCHs respectively, and
  wherein the DCI further includes a modulation and coding scheme (MCS) field indicating MCS information for all of the multiple PDSCHs.

4. The method of claim 1, further comprising:
  transmitting, to the BS, feedback information with respect to the multiple PDSCHs,
  wherein the feedback information includes HARQ-ACK information corresponding to feedback with respect to one transport block of multiple transport blocks, or bundling of feedback with respect to at least two transport blocks of the multiple transport blocks.

5. The method of claim 4, wherein the feedback information corresponds to a bit map including feedback for the multiple transport blocks based on a predetermined mapping relationship.

6. The method of claim 1, wherein the DCI further includes HARQ process identifier (ID) applied to a first PDSCH of the multiple PDSCHs, and
  wherein HARQ process IDs corresponding to the multiple PDSCHs respectively are incremented by 1 in a scheduled order based on the HARQ process ID applied to the first PDSCH.

7. A method performed by a base station (BS) in a wireless communication system, the method comprising:
  transmitting, to a user equipment (UE), downlink control information (DCI) including scheduling information with respect to multiple physical downlink shared channels (PDSCHs) related to downlink data; and
  transmitting, to the UE, the multiple PDSCHs based on the DCI,
  wherein the DCI includes a new data indicator (NDI) field, and a number of bits of the NDI field is associated with a number of the multiple PDSCHs scheduled by the DCI, and
  wherein the DCI further includes time interval information between a transmitting time for feedback information and a receiving time for the multiple PDSCHs.

8. The method of claim 7, further comprising:
  transmitting, to the UE, a radio resource control (RRC) message including scheduling information related to time domain with respect to the multiple PDSCHs.

9. The method of claim 7, wherein the bits of the NDI field indicate NDI values of the multiple PDSCHs respectively, and
  wherein the DCI further includes a modulation and coding scheme (MCS) field indicating MCS information for all of the multiple PDSCHs.

10. The method of claim 7, further comprising:
  receiving, from the UE, feedback information with respect to the multiple PDSCHs,
  wherein the feedback information includes HARQ-ACK information corresponding to feedback with respect to one transport block of multiple transport blocks, or bundling of feedback with respect to at least two transport blocks of the multiple transport blocks.

11. The method of claim 10, wherein the feedback information corresponds to a bit map including feedback for the multiple transport blocks based on a predetermined mapping relationship.

12. The method of claim 7, wherein the DCI further includes HARQ process identifier (ID) applied to a first PDSCH of the multiple PDSCHs, and wherein HARQ process IDs corresponding to the multiple PDSCHs respectively are incremented by 1 in a scheduled order based on the HARQ process ID applied to the first PDSCH.

13. A user equipment (UE) in a wireless communication system, the UE comprising:
a transceiver; and
at least one controller coupled to the transceiver and configured to:
control the transceiver to receive, from a base station (BS), downlink control information (DCI) including scheduling information with respect to multiple physical downlink shared channels (PDSCHs) related to downlink data; and
control the transceiver to receive, from the BS, the multiple PDSCHs, based on the DCI,
wherein the DCI includes a new data indicator (NDI) field, and a number of bits of the NDI field is associated with a number of the multiple PDSCHs scheduled by the DCI, and
wherein the DCI further includes time interval information between a transmitting time for feedback information and a receiving time for the multiple PDSCHs.

14. The UE of claim 13, wherein the at least one controller is further configured to:
control the transceiver to receive a radio resource control (RRC) message including scheduling information related to time domain with respect to the multiple PDSCHs.

15. The UE of claim 13, wherein the bits of the NDI field indicate NDI values of the multiple PDSCHs, respectively, and
wherein the DCI further includes a modulation and coding scheme (MCS) field indicating MCS information for all of the multiple PDSCHs.

16. The UE of claim 13, wherein the at least one controller is further configured to:
control the transceiver to transmit, to the BS, feedback information with respect to the multiple PDSCHs, and
wherein the feedback information includes HARQ-ACK information corresponding to feedback with respect to one transport block of multiple transport blocks or bundling of feedback with respect to at least two transport blocks of the multiple transport blocks.

17. The UE of claim 16, wherein the feedback information corresponds to a bit map including feedback for the multiple transport blocks based on a predetermined mapping relationship.

18. The UE of claim 13, wherein the DCI further includes a HARQ process identifier (ID) applied to a first PDSCH of the multiple PDSCHs, and
wherein HARQ process IDs corresponding to the multiple PDSCHs, respectively, are incremented by one in a scheduled order based on the HARQ process ID applied to the first PDSCH.

19. The method of claim 1, wherein the number of bits of the NDI field corresponds to the number of the multiple PDSCHs scheduled by the DCI.

20. The method of claim 7, wherein the number of bits of the NDI field corresponds to the number of the multiple PDSCHs scheduled by the DCI.

21. The UE of claim 13, wherein the number of bits of the NDI field corresponds to the number of the multiple PDSCHs scheduled by the DCI.

* * * * *